US008817585B2

(12) United States Patent
Okamoto et al.

(10) Patent No.: US 8,817,585 B2
(45) Date of Patent: Aug. 26, 2014

(54) HOLOGRAPHIC MEMORY REPRODUCTION DEVICE AND HOLOGRAPHIC MEMORY REPRODUCTION METHOD, DEMODULATION DEVICE AND DEMODULATION METHOD, AND OBSERVATION DEVICE AND OBSERVATION METHOD

(75) Inventors: Atsushi Okamoto, Hokkaido (JP); Keisuke Kunori, Hokkaido (JP); Masanori Takabayashi, Hokkaido (JP)

(73) Assignee: National University Corporation Hokkaido University, Sapporo-Shi, Hokkaido (JP)

( * ) Notice: Subject to any disclaimer, the term of this patent is extended or adjusted under 35 U.S.C. 154(b) by 0 days.

(21) Appl. No.: 13/880,203

(22) PCT Filed: Oct. 19, 2011

(86) PCT No.: PCT/JP2011/005841
§ 371 (c)(1),
(2), (4) Date: Apr. 18, 2013

(87) PCT Pub. No.: WO2012/053198
PCT Pub. Date: Apr. 26, 2012

(65) Prior Publication Data
US 2013/0215730 A1 Aug. 22, 2013

(30) Foreign Application Priority Data
Oct. 19, 2010 (JP) ................. 2010-234640

(51) Int. Cl.
*G11B 7/0065* (2006.01)
*G03H 1/22* (2006.01)
*G03H 1/04* (2006.01)

(52) U.S. Cl.
CPC ........ *G11B 7/0065* (2013.01); *G03H 2210/562* (2013.01); *G03H 1/2249* (2013.01); *G03H 2001/0441* (2013.01)
USPC .......................................................... 369/103

(58) Field of Classification Search
None
See application file for complete search history.

(56) References Cited

U.S. PATENT DOCUMENTS

| 4,224,480 A * | 9/1980 | Satoh et al. | 369/47.48 |
| 6,778,281 B2 * | 8/2004 | Ge | 356/511 |

(Continued)

FOREIGN PATENT DOCUMENTS

| CN | 101145358 A | 3/2008 |
| CN | 101252004 A | 8/2008 |

(Continued)

OTHER PUBLICATIONS

Shimada, K., et al., "High Density Recording Using Monocular Architecture for 500GB Consumer System", Hitach Ltd., ODS 2009 Optical Data Storage TuC2, 23 pages.

(Continued)

*Primary Examiner* — Brenda Bernardi
(74) *Attorney, Agent, or Firm* — Nath Goldberg & Meyer; Jerald L. Meyer

(57) ABSTRACT

The present invention relates to a reproduction device of a holographic memory capable of precisely reproducing multi-value phase information without being influenced by noise. This holographic memory reproduction device comprises: a hologram diffraction ray generation unit which irradiates a first reference ray to the holographic memory and generates a diffraction ray of the first hologram; a hologram generation unit which changes the phase of a second reference ray which may interfere with the diffraction ray of the first hologram and generates a second hologram from the diffraction ray of the first hologram and the second reference ray to which the phase has been changed; a detection unit which detects the intensity distribution of the second hologram; and a processing unit which demodulates the phase modulation signal or the space quadrature amplitude modulation signal on the basis of the intensity distribution.

15 Claims, 53 Drawing Sheets

(56) References Cited

U.S. PATENT DOCUMENTS

| | | | |
|---|---|---|---|
| 2006/0039048 A1* | 2/2006 | Carver et al. | 359/32 |
| 2008/0067321 A1 | 3/2008 | Miyamoto et al. | |
| 2008/0198432 A1 | 8/2008 | Tanaka et al. | |
| 2011/0235485 A1* | 9/2011 | Mikami | 369/44.37 |
| 2012/0026856 A1* | 2/2012 | Shimada et al. | 369/103 |

FOREIGN PATENT DOCUMENTS

| | | |
|---|---|---|
| JP | 200865961 A | 3/2008 |
| JP | 2008-203503 A | 9/2008 |
| JP | 2010-019984 A | 1/2010 |

OTHER PUBLICATIONS

Van Heerden, P.J., "Theory of Optical Information Storage in Solids", Applied Optics, vol. 2, No. 4, pp. 393-400, (Apr. 1963).

Tanaka, K., et al., "Improved Performance in Coaxial Holographic Data Recording", Optics Express, vol. 15, No. 24, pp. 16196-16209, ( 2007).

Joseph, J., et al., "Homogenized Fourier Transform Holographic Data Storage Using Phase Spatial Light Modulators and Methods for Recovery of Data from the Phase Image", Applied Optics vol. 45, No. 25, pp. 6374-6380, (Sep. 1, 2006).

Burr, G.W., et al.,"Modulation Coding for Pixel-Matched Holographic Data Storage", Optics Letters, vol. 22, No. 9, pp. 639-641, ( May 1, 1997).

Kim, J., et al., "Two-Dimensional 5:8 Modulation Code for Holographic Data Storage", Japanese Journal of Applied Physics, 48, pp. 03A031-1-03A031-4, (2009).

Burr, G.W., et al., "Gray-scale data pages for digital holographic data storage", Optics Letters, vol. 23, No. 15, pp. 1218-1220, (Aug. 1, 1998).

Koppa, Pal, "Phase-to amplitude data page conversion for holographic storage and optical encryption", Applied Optics, vol. 46, No. 17, pp. 3561-3571, (Jun. 10, 2007).

Yamaguchi, I., et al., "Phase-shifting digital holography", Optics Letters, vol. 22, No. 16, pp. 1268-1270, (Aug. 15, 1997).

Non-English Literature, Optronics, No. 12, pp. 76-80, (2008).

Awatsuji, Y., et al., "Parallel three-step phase-shifting digital holography", Applied Optics, vol. 45, No. 13, pp. 2995-3002, (May 1, 2006).

Horimai, H., et al., "Collinear Holography", Applied Optics, vol. 44, No. 13, pp. 2575-2579, (May 1, 2005).

Tanaka, J., et al.,"Development of Image-Based Simulation for Holographic Data Storage System by Fast Fourier Transform Beam-Propagation Method", Japanese Journal of Applied Physics, 48, pp. 03A028-1-03A028-5, (2009).

* cited by examiner

1      #2      #3

1      #2      #3

A(x,y)  φ(x,y)

A(x,y)    φ(x,y)

A(x,y)    φ(x,y)

HOLOGRAPHIC MEMORY REPRODUCTION DEVICE AND HOLOGRAPHIC MEMORY REPRODUCTION METHOD, DEMODULATION DEVICE AND DEMODULATION METHOD, AND OBSERVATION DEVICE AND OBSERVATION METHOD

This is a National Phase Application filed under 35 U.S.C. 371 as a national stage of PCT/JP2011/005841, filed Oct. 19, 2011, and claims priority benefit from Japanese Application No. 2010-234640, filed Oct. 19, 2010, the content of each of which is hereby incorporated by reference in its entirety.

TECHNICAL FIELD

The present invention relates to a reproduction apparatus and a reproduction method of a holographic memory. In addition, the present invention relates to a demodulation apparatus and a demodulation method of a spatial phase modulation signal or a spatial quadrature amplitude modulation signal. In addition, the present invention relates to an observation apparatus and an observation method of a light intensity distribution and a light phase distribution.

BACKGROUND ART

Hitherto, optical memories have been developed mainly in two-dimensional recording-type optical discs such as a CD or a DVD, and a Blu-ray Disc. However, two-dimensional recording-type optical memories have already reached a diffraction limit, and thus a further increase in capacity is not likely to be achieved. Consequently, in recent years, three-dimensional recording-type optical memories have been developed actively. When a three-dimensional recording type is adopted, there is the possibility of recording capacity being increased to 100 to 1,000 or more than that in a two-dimensional recording type. 100 TB-level optical disc memories can also be realized theoretically.

Three techniques leading to an increase in an optical memory include 1) a near-field optical recording system, 2) a two-photon absorption memory, and 3) a holographic memory. 1) The near-field optical recording system is a recording system in which "near-field light" having light wavelength size or less is used. The near-field optical recording system is basically a two-dimensional recording-type technique, but has the likelihood of realizing high density recording exceeding a diffraction limit by using near-field light. In addition, 2) the two-photon absorption memory is a three-dimensional recording-type optical memory capable of three-dimensional access to a recording medium by using the intensity dependence of a nonlinear effect. Comparing with these techniques, 3) the holographic memory is an optical memory capable of three-dimensional recording without multi-layering a recording medium by performing multiplex recording on a hologram produced by interference between signal light and reference light.

All the optical memories of the above 1) to 3) achieve a recording capacity of approximately 500 GB to 1 TB at this moment in time. Therefore, from the viewpoint of recording capacity, there is no large difference in superiority or inferiority between the optical memories of the above 1) to 3). However, from the viewpoint of a data transfer rate, there is a large advantage in the holographic memory having a spatially two-dimensional massively parallel type input-output function out of the optical memories of the above 1) to 3). In recent years, a spatial light modulator (hereinafter, occasionally abbreviated to a "SLM") for high-speed response exceeding a microsecond, or the like has also been developed. There is the possibility of a transfer rate exceeding 100 Gbps being realized by applying such a SLM for high-speed response to the holographic memory.

The holographic memory can realize both high density recording and a high data transfer rate, and thus is expected to be put into practical use as a next-generation optical memory. The recording capacity of the holographic memory being presently developed is approximately 600 GB to 1 TB/disc (see, for example, Non-Patent Literature 1). Since the recording capacity of one side of one platter of a HDD (having a size of 3.5 inches and a storage capacity of 2 TB) is 333 GB, the holographic memory is about 2 to 3 times superior to a magnetic recording medium which is put into practical use from the viewpoint of the recording capacity. In addition, in the holographic memory, the recording capacity thereof is considered to be further increased up to 10 to 100 times theoretically. Under such circumstances, with the purpose of increasing the recording capacity of the holographic memory, not only intensity modulation-type holographic memories having been used so far, but also phase modulation-type ones have been examined. However, there has been a problem in the phase modulation-type holographic memory in that since a phase modulation signal cannot be directly detected in a light detector, the phase modulation signal has to be converted into an intensity signal by some kind of method and then be detected.

The intensity modulation type is the most common modulation method, and many cases have been reported so far (see, for example, Non-Patent Literatures 1 to 3). In many recording systems using holography from the document (Non-Patent Literature 2) in which it was first suggested that information can be recorded using holography to the latest documents (Non-Patent Literatures 1 and 3) with a view to commercialization of products, two-valued (0 and 1) intensity modulation is used. However, there is a problem in that, the intensity modulation has an advantage of being able to construct a system through a simple optical system, whereas the exposure intensity difference between a central portion and a peripheral portion of a laser light irradiation region becomes large, and the dynamic range of a recording medium is consumed to a large extent, thereby resulting in the deterioration of recording efficiency. This problem is caused by the increasing exposure intensity difference between the central vicinity and the peripheral portion of the laser light irradiation region because the intensity in the vicinity of the center of a Fourier transform image is proportional to the sum of the amplitudes of all pixels in a general Fourier transform hologram (see, for example, Non-Patent Literature 4).

A method of alleviating such a problem of the intensity modulation type includes a method of using a modulation code in which two-valued information is dispersed into a plurality of pixels called a block and is coded, and data is represented by activating only a portion of the pixels within the block. Such a modulation code is used, thereby allowing an error due to crosstalk between pixels to be reduced. In addition, by using the modulation code, the exposure intensity difference between the central vicinity and the peripheral portion of the laser light irradiation region is reduced and the number of multiplex recordings is increased, thereby allowing effective recording to be performed (see, for example, Non-Patent Literatures 5 and 6). However, when the modulation code is used, the code rate defined by "(the number of bits recorded per block)/(the number of pixels per block)" falls short of 1. This means that the recording capacity per block in a case where the modulation code is used, in principle, falls short of the recording capacity in a case where the modulation code is not used.

In order to increase the recording capacity of the holographic memory, a method is required in which a plurality of pieces of information are recorded per pixel, that is, the code rate exceeds 1. In order to realize the code rate exceeding 1, it is required to use a multi-valued signal exceeding two values of 0 and 1. The multi-valued signal can be realized by dividing the light intensity into several levels, thereby allowing the code rate to be improved dramatically. However, in a current direct detection system, the signal-to-noise ratio of a reproduction light beam is greatly deteriorated with an increase in the multi-valued number due to the accuracy or noise of the detection system (see, for example, Non-Patent Literature 7).

In the intensity modulation system, the problem that the exposure intensity difference between the central portion and the peripheral portion of the laser light irradiation region becomes large and the dynamic range of a recording medium is consumed to a large extent can be solved even by a phase modulation system. The phase modulation system is a system that performs modulation using the phase of a light wave, and has recently attracted attention. For example, in the phase modulation system, when the phase of a light wave in a certain pixel is set to 0, information is represented by setting the phase of a light wave in another pixel to $\pi$. The numbers of pixels of 0 and $\pi$ among the pixels included in two-dimensional page data produced by the spatial light modulator (SLM) are the same as each other, the exposure intensity difference between the central vicinity and the peripheral portion of the laser light irradiation region does not occur, and thus the useless consumption of the dynamic range of a recording medium can be suppressed. This point contributes significantly to an increase in the number of multiplex recordings. However, since a photoelectric conversion device such as a CCD is sensitive only to the intensity of light, the device cannot detect phase information directly. Therefore, in order to detect the phase information, the phase has to be converted into the intensity before light detection is performed. In the phase modulation system, this point becomes a serious problem.

Several phase detection methods for realizing a phase modulation-type holographic memory have been proposed so far (see, for example, Non-Patent Literatures 4, 8, and 9).

In Non-Patent Literature 4, an edge-detection method is proposed as a phase detection method used in a holographic memory. The edge-detection method is a method in which the feature of the phase modulation-type holographic memory is used well. In the phase modulation-type holographic memory, since the central intensity (direct-current component) of a Fourier transform image is missing, reproduction is performed only on other alternating-current components. This means that the intensity of a boundary portion of pixels of 0 and $\pi$ in a reproduced image (real-space distribution) is emphasized. In other words, it means that the phases of all the pixels following the boundary of which the intensity is emphasized can be determined on the basis of a certain known pixel. There is a problem in that, this method has an advantage of being able to realize a phase modulation-type holographic memory in an optical system which is no different from an intensity modulation-type holographic memory, whereas the method is not adequate to the detection of a multi-valued phase modulation signal.

In Non-Patent Literature 8, a phase detection method using a birefringent medium is proposed. In this method, a reproduction light beam is changed to a circularly polarized light beam using a $\pi/4$ wavelength plate, and then is caused to pass through a birefringent medium. Reproduction light beams slightly shifted thereby interfere with each other, and an intensity pattern is obtained. Since the number of pixels shifted by a birefringent medium designed in advance can be determined, a determination can be made with the discarding of phase information from the obtained intensity pattern. This method is known to have a high misregistration resistance through an experiment in the document, and is a very attractive method in phase detection sensitive to a shift. However, even in this method, there is a problem in that a multi-valued signal is not easily detected, and that the higher-accuracy design of the birefringent medium is required.

In Non-Patent Literature 9, a beam phase lock-type collinear hologram is proposed as a phase modulation-type holographic memory specializing in a collinear optical system attracting attention as a one-beam recording system. This system is a system in which when a collinear hologram is reproduced, recorded holograms are simultaneously irradiated with phase-lock light of which the phase is known, in addition to normal collinear reference light, to thereby read recorded phase information as intensity information. In this system, since the phase-lock light passes through a recording hologram, the phase distribution thereof is influenced by propagation within the hologram having a phase diffraction grating. This can cause the occurrence of a phase error in a detection surface. This method is also not likely to record and reproduce the phase information with a high degree of accuracy, and the phase multi-valued number remains in two-valued to four-valued number.

CITATION LIST

Non-Patent Literature

NPL 1
Ken-ichi Shimada, Toshiki Ishii, Tatsuro Ide, Steve Hughes, Alan Hoskins, Kevin Curtis, "High density recording using Monocular architecture for 500 GB consumer system", Optical Data Storage (ODS) Topical Meeting, TuC2 (2009).
NPL 2
P. J. Van Heerden, "Theory of Optical Information Storage in Solids", Appl. Opt., Vol. 2, No. 4, pp. 393-400 (1963).
NPL 3
Kenji Tanaka, Masaaki Hara, Kazutatsu Tokuyama, Kazuyuki Hirooka, Koji Ishioka, Atsushi Fukumoto and Kenjiro Watanabe, "Improved performance in coaxial holographic data recording" Opt. Exp., Vol. 15, No. 24, pp. 16196-16209 (2007).
NPL 4
Joby Joseph and David A. Waldman, "Homogenized Fourier transform holographic data storage using phase spatial light modulators and methods for recovery of data from the phase image", Appl. Opt., Vol. 45, pp. 6374-6380 (2006).
NPL 5
Geoffrey W. Burr, Jonathan Ashley, Hans Coufal, Robert K. Grygier, John A. Hoffnagle, C. Michael Jefferson and Brian Marcus, "Modulation coding for pixel-matched holographic data storage" Opt. Lett., Vol. 22, pp. 639-641 (1997).
NPL 6
Jinyoung Kim and Jaejin Lee, "Two-Dimensional 5:8 Modulation Code for Holographic Data Storage", Jpn. J. of Appl. Phys., Vol. 48, 03A031-1-03A031-4 (2009).
NPL 7
Geoffrey W. Burr, Gabriele Barking, Hans Coufal, John A. Hoffnagle, C. Michael Jefferson and Mark A. Neifeld, "Gray-scale data pages for digital holographic data storage", Opt. Lett., Vol. 23, No. 15, pp. 1218-1220 (1998).
NPL 8
Pal Koppa, "Phase-to-amplitude data page conversion for holographic storage and optical encryption", Appl. Opt., Vol. 46, pp. 3561-3571 (2007).
NPL 9
Mitsuteru Inoue, "Light phase lock-type collinear holography (toward realization of next-generation collinear hologram memory)", OPTRONICS, No. 12, pp. 76-80 (2008).

SUMMARY OF INVENTION

Technical Problem

As stated above, an intensity modulation-type holographic memory of the related art has a problem in that since the exposure intensity difference between the central portion and the peripheral portion of a laser light irradiation region becomes large and the dynamic range of a recording medium is consumed to a large extent, the efficiency of multiplex recording deteriorates. In a system in which a modulation code is used, there is a problem in that the above-mentioned problem can be avoided, but a recording capacity is reduced due to the lowering in a code rate per block. Although it is necessary to use a multi-valued intensity signal in order to increase a code rate, the intensity modulation-type holographic memory having a large multi-valued number is not realized due to the accuracy or noise of a detection system.

The phase modulation-type holographic memory can solve these problems. However, the phase modulation-type holographic memory has a problem in that in order to detect phase information, a phase has to be converted into an intensity before light detection is performed. In addition, when an intensity signal after conversion is detected, there is a problem of the accuracy or noise of a detection system similarly to the intensity modulation-type holographic memory. As a result, the phase modulation-type holographic memory having a large multi-valued number is not realized.

An object of the present invention is to provide a reproduction apparatus of a holographic memory and a reproduction method thereof which are capable of precisely reproducing multi-valued phase information without being influenced by noise.

In addition, another object of the present invention is to provide a demodulation apparatus of a spatial phase modulation signal or a spatial quadrature amplitude modulation signal and a demodulation method thereof which are capable of precisely demodulating multi-valued phase information without being influenced by noise.

In addition, still another object of the present invention is to provide an observation apparatus of a light intensity distribution and a light phase distribution and an observation method thereof which are capable of observing, in real time, a light intensity distribution and a light phase distribution in transmitted light or reflected light from an object to be observed.

Solution to Problem

The inventor has found that a phase modulation signal recorded in a holographic memory can be demodulated with a high degree of accuracy by producing a second hologram from diffracted light of a hologram (first hologram) recorded in the holographic memory and reference light, and has completed the present invention after conducting a further examination.

That is, the present invention relates to the following holographic memory reproduction apparatus.

[1] A reproduction apparatus of a holographic memory in which a first hologram produced from reference light and signal light including a spatial phase modulation signal or a spatial quadrature amplitude modulation signal is recorded, the reproduction apparatus including: a hologram diffracted light production section that produces diffracted light of the first hologram by irradiating the holographic memory with first reference light; a hologram production section that changes a phase of second reference light capable of interfering with the diffracted light of the first hologram, and produces a second hologram from the diffracted light of the first hologram and the second reference light of which the phase is changed; a detection section that detects an intensity distribution of the second hologram; and a processing section that demodulates the spatial phase modulation signal or the spatial quadrature amplitude modulation signal on the basis of the intensity distribution.

[2] The holographic memory reproduction apparatus according to the above [1], further including: a laser light source that emits laser light; and a laser light splitting section that splits the laser light emitted from the laser light source into the first reference light and the second reference light.

[3] The holographic memory reproduction apparatus according to the above [1] or [2], wherein the hologram production section includes a variable phase shifter that changes the phase of the second reference light, and a beam splitter that has a first surface on which the diffracted light of the first hologram is incident and a second surface on which the second reference light having a phase changed by the variable phase shifter is incident.

[4] The holographic memory reproduction apparatus according to the above [2], wherein: the laser light source emits laser light of linearly polarized light; and the hologram production section includes a half-wave plate that rotates a polarization angle of the diffracted light of the first hologram by 45 degrees, a λ/4 wavelength plate that converts a polarization state of the second reference light into circularly polarized light, a beam splitter that has a first surface on which the diffracted light of the first hologram having a polarization angle changed by the half-wave plate is incident, and a second surface on which the second reference light having a polarization state changed by the λ/4 wavelength plate is incident, a first polarization beam splitter, on which a light beam of a portion of the diffracted light of the first hologram is reflected from the beam splitter and a light beam of a portion of the second reference light passing through the beam splitter are incident, and which transmits one of horizontally polarized light components and vertically polarized light components of the incident light beams and reflects the other thereof, and a second polarization beam splitter, on which a light beam of a portion of the diffracted light of the first hologram passing through the beam splitter and a light beam of a portion of the second reference light reflected from the beam splitter are incident, and which transmits one of horizontally polarized light components and vertically polarized light components of the incident light beams and reflects the other thereof.

[5] The holographic memory reproduction apparatus according to the above [2], wherein: the laser light source emits laser light of linearly polarized light; and the hologram production section includes a half-wave plate that rotates a polarization angle of the diffracted light of the first hologram by 45 degrees, a λ/4 wavelength plate that converts a polarization state of the second reference light into circularly polarized light, a beam splitter that has a first surface on which the diffracted light of the first hologram having a polarization angle changed by the half-wave plate is incident, and a second surface on which the second reference light having a polarization state changed by the λ/4 wavelength plate is incident, a polarization beam splitter that has a first surface on which a light beam of a portion of the diffracted light of the first hologram reflected from the beam splitter and a light beam of a portion of the second reference light passing through the beam splitter are incident, and a second surface on which a light beam of a portion of the diffracted light of the first hologram passing through the beam splitter and a light beam of a portion of the second reference light reflected from the beam splitter are incident, transmits one of horizontally polarized light components and vertically polarized light components of the incident light beams, and reflects the other thereof.

[6] The holographic memory reproduction apparatus according to the above [2], wherein: the laser light source emits laser light of linearly polarized light; and the hologram production section includes a half-wave plate that rotates a polarization angle of the diffracted light of the first hologram by 45 degrees, a λ/4 wavelength plate that converts a polarization state of the second reference light into circularly polarized light, a first beam splitter that has a first surface on which the diffracted light of the first hologram having a polarization angle changed by the half-wave plate is incident, and a second surface on which the second reference light having a polarization state changed by the λ/4 wavelength plate is incident, a first polarization beam splitter that transmits one of horizontally polarized light components and vertically polarized light components of a light beam of a portion of the diffracted light of the first hologram reflected from the first beam splitter and a light beam of a portion of the second reference light passing through the first beam splitter, and reflects the other thereof, a second polarization beam splitter that transmits one of horizontally polarized light components and vertically polarized light components of a light beam of a portion of the diffracted light of the first hologram passing through the first beam splitter and a light beam of a portion of the second reference light reflected from the first beam splitter, and reflects the other thereof, and a second beam splitter that has a first surface on which a light beam of a portion of the diffracted light of the first hologram reflected from the first polarization beam splitter and a light beam of a portion of the second reference light, and a light beam of a portion of the diffracted light of the first hologram passing through the first polarization beam splitter and a light beam of a portion of the second reference light are incident, and a second surface on which a light beam of a portion of the diffracted light of the first hologram reflected from the second polarization beam splitter and a light beam of a portion of the second reference light, and a light beam of a portion of the diffracted light of the first hologram passing through the second polarization beam splitter and a light beam of a portion of the second reference light are incident.

[7] The holographic memory reproduction apparatus according to the above [2], wherein: the laser light source emits laser light of linearly polarized light; and the hologram production section includes a half-wave plate that rotates a polarization angle of the diffracted light of the first hologram by 45 degrees, a λ/4 wavelength plate that converts a polarization state of the second reference light into circularly polarized light, a beam splitter that has a first surface on which the diffracted light of the first hologram having a polarization angle changed by the half-wave plate is incident, and a second surface on which the second reference light having a polarization state changed by the λ/4 wavelength plate is incident, and a polarization beam splitter, on which the diffracted light of the first hologram reflected from the beam splitter and the second reference light passing through the beam splitter are incident, and which transmits one of horizontally polarized light components and vertically polarized light components of the incident light beams and reflects the other thereof.

[8] The holographic memory reproduction apparatus according to any one of the above [1] to [7], further including: a spatial quadrature amplitude modulation signal light production section that performs spatial quadrature amplitude modulation on laser light and produces signal light including a spatial quadrature amplitude modulation signal; and a recording section that records a first hologram produced from the signal light and reference light in a holographic memory.

[9] The holographic memory reproduction apparatus according to the above [8], wherein: the spatial quadrature amplitude modulation signal light production section includes a beam splitter on which the laser light is incident, a reflection-type first spatial light modulator that modulates an amplitude of the laser light reflected from the beam splitter, and a reflection-type second spatial light modulator that modulates an amplitude of the laser light passing through the beam splitter, and an optical path length $L_I$ between the beam splitter and the first spatial light modulator and an optical path length $L_Q$ between the beam splitter and the second spatial light modulator satisfy the following equation 1.

$$L_I - L_Q = \frac{\lambda}{4} \qquad \text{[Equation 1]}$$

(where λ is a wavelength of the laser light)

In addition, the present invention relates to the following reproduction method of a holographic memory.

[10] A reproduction method of a holographic memory in which a first hologram produced from reference light and signal light including a spatial phase modulation signal or a spatial quadrature amplitude modulation signal is recorded, the reproduction method including: producing diffracted light of the first hologram by irradiating the holographic memory with first reference light; changing a phase of second reference light capable of interfering with the diffracted light of the first hologram, and producing a second hologram from the diffracted light of the first hologram and the second reference light of which the phase is changed; detecting an intensity distribution of the second hologram; and demodulating the spatial phase modulation signal or the spatial quadrature amplitude modulation signal on the basis of the intensity distribution.

[11] The reproduction method of a holographic memory according to the above [10], further comprising splitting laser light emitted from a laser light source into the first reference light and the second reference light.

In addition, the present invention relates to the following demodulation apparatus.

[12] A demodulation apparatus of a spatial phase modulation signal or a spatial quadrature amplitude modulation signal, including: an input section that receives signal light including a spatial phase modulation signal or a spatial quadrature amplitude modulation signal; a laser light source that emits laser light capable of interfering with the signal light; a hologram production section that changes a phase of the laser light and produces a hologram from the signal light and the laser light of which the phase is changed; a detection section that detects an intensity distribution of the hologram; and a processing section that demodulates the spatial phase modulation signal or the spatial quadrature amplitude modulation signal on the basis of the intensity distribution.

In addition, the present invention relates to the following demodulation method.

[13] A demodulation method of a spatial phase modulation signal or a spatial quadrature amplitude modulation signal, including: receiving signal light including a spatial phase modulation signal or a spatial quadrature amplitude modulation signal; emitting laser light capable of interfering with the signal light; changing a phase of the laser light, and producing a hologram from the signal light and the laser light of which the phase is changed; detecting an intensity distribution of the hologram; and demodulating the spatial phase modulation signal or the spatial quadrature amplitude modulation signal on the basis of the intensity distribution.

In addition, the present invention relates to the following observation apparatus.

[14] An observation apparatus of a light intensity distribution and a light phase distribution, including: an input section that inputs transmitted light or reflected light from an object to be observed; a laser light source that emits laser light capable of interfering with the transmitted light or the reflected light; a hologram production section that changes a phase of the laser light, and producing a hologram from the transmitted light or the reflected light and the laser light of which the phase is changed; a detection section that detects an intensity distribution of the hologram; and a processing section that calculates a light intensity distribution and a light phase distribution in the transmitted light or the reflected light on the basis of the intensity distribution.

In addition, the present invention relates to the following observation method.

[15] An observation method of a light intensity distribution and a light phase distribution, including: inputting transmitted light or reflected light from an object to be observed; emitting laser light capable of interfering with the transmitted light or the reflected light; changing a phase of the laser light, and producing a hologram from the transmitted light or the reflected light and the laser light of which the phase is changed; detecting an intensity distribution of the hologram; and calculating a light intensity distribution and a light phase distribution in the transmitted light or the reflected light on the basis of the intensity distribution.

Advantageous Effects of Invention

According to the holographic memory reproduction apparatus and method of the present invention, it is possible to precisely reproduce multi-valued phase information without being influenced by noise. Therefore, according to the holographic memory reproduction apparatus and method of the present invention, it is possible to reproduce a holographic memory in which a spatial phase modulation signal or a spatial quadrature amplitude modulation signal are recorded with a high degree of accuracy.

In addition, according to the demodulation apparatus and method of the present invention, it is possible to demodulate a spatial phase modulation signal or a spatial quadrature amplitude modulation signal with a high degree of accuracy without being influenced by noise.

In addition, according to the observation apparatus and method of the present invention, it is possible to observe, in real time, a light intensity distribution and a light phase distribution in transmitted light or reflected light from an object to be observed.

DESCRIPTION OF EMBODIMENTS

Figure 1:
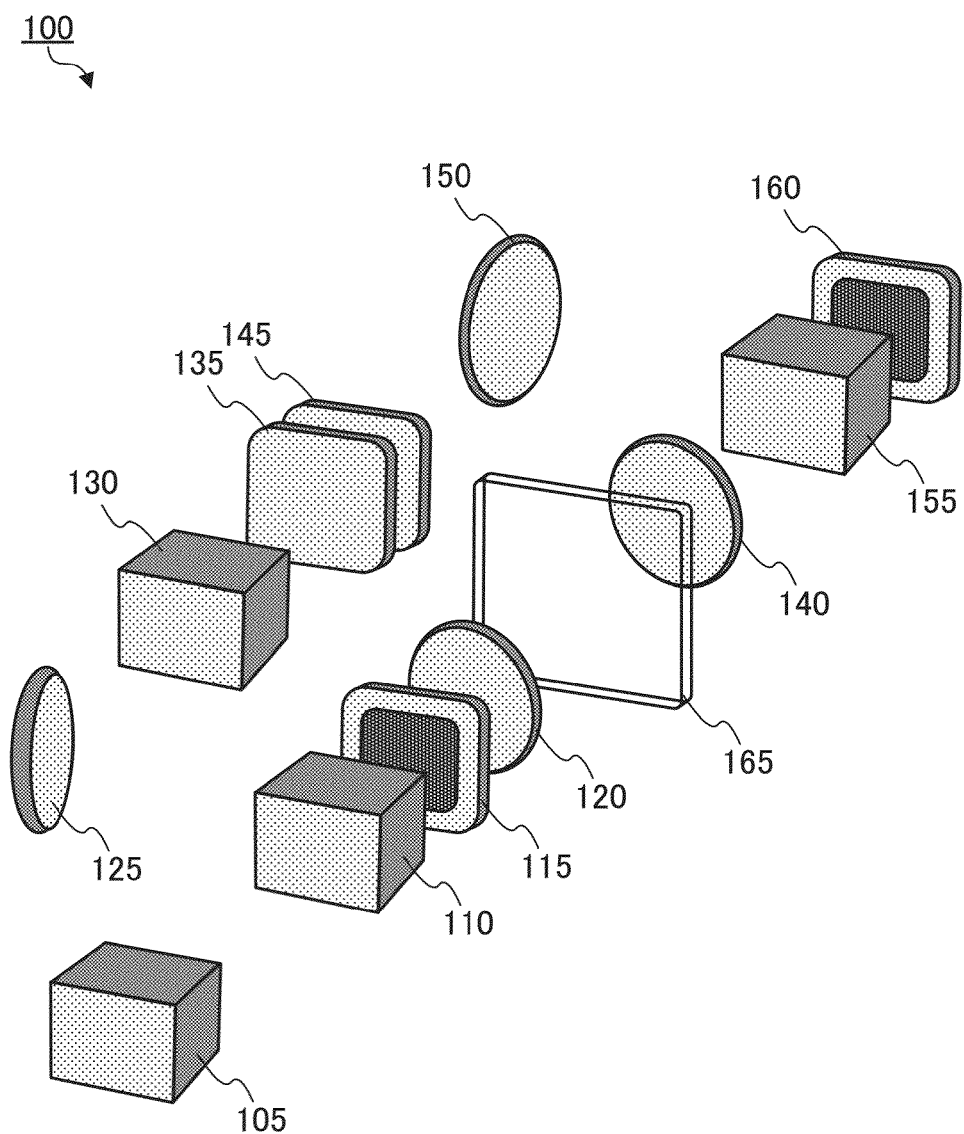
FIG. 1 is a schematic diagram illustrating a configuration of a holographic memory recording and reproduction apparatus according to Embodiment 1.

A holographic memory reproduction apparatus according to the present invention is a reproduction apparatus of a holographic memory in which a first hologram produced from reference light and signal light including a spatial phase modulation signal or a spatial quadrature amplitude modulation signal is recorded. The "spatial phase modulation signal" herein means a signal modulated by spatial phase modulation (SPM). In addition, the "spatial quadrature amplitude modulation signal" means a signal modulated by spatial quadrature amplitude modulation (SQAM).

The "phase modulation (hereinafter, abbreviated to "PM")" is a modulation scheme based on phase modulation, phase shift modulation (PSM) or phase shift keying (PSK) used in a field of communication technology such as wireless communication or optical communication. The PM transfers information by changing the phase of a carrier wave. In the holographic memory of the present invention, signal light of which the phase is changed is recorded similarly to the PM used in the field of communication technology. However, in the holographic memory, unlike communication in which a signal is modulated in the time-axis direction, a signal is modulated in the two-dimensional space-axis direction (x, y), and this signal is recorded and reproduced as a data page. Consequently, in the present specification, the modulation scheme based on the phase modulation used in the present invention is referred to as "spatial phase modulation (SPM)" in order to differentiate from the "phase modulation (PM)" used in the field of communication technology. The SPM includes the concept of phase modulation and multi-valued phase modulation used in an optical memory field.

"Quadrature amplitude modulation (hereinafter, abbreviated to "QAM")" is a modulation scheme in which amplitude modulation (AM) and phase modulation (PM) used in the field of communication technology such as wireless communication or optical communication are combined. The QAM can transfer a plurality of pieces of information at a time by changing both elements of an amplitude and a phase. In the holographic memory of the present invention, a signal of which both elements of an amplitude and a phase are changed is recorded similarly to the QAM used in the field of communication technology. However, in the holographic memory, unlike communication in which a signal is modulated in the time-axis direction, a signal is modulated in the two-dimensional space-axis direction (x, y), and this signal is recorded and reproduced as a data page. Consequently, in the present specification, the modulation scheme in which the amplitude modulation and the phase modulation used in the present invention are combined is referred to as "spatial quadrature amplitude modulation (SQAM)" in order to differentiate from the "quadrature amplitude modulation (QAM)" used in the field of communication technology.

The holographic memory reproduction apparatus of the present invention includes a laser light source, a hologram diffracted light production section, a hologram production section, a detection section and a processing section.

The laser light source is a light source of reference light (first reference light and second reference light) used when a data page is reproduced from the holographic memory.

The first reference light is reference light with which the holographic memory having the first hologram recorded therein is irradiated. The first reference light may preferably be laser light which satisfies a Bragg's condition with respect to the first hologram. For example, when irradiation is performed with light having the same wavelength as that of the reference light used at the time of recording the first hologram from the same angle, the Bragg's condition is satisfied. However, when the Bragg's condition is satisfied, the wavelength and the irradiation angle of the first reference light are not limited thereto. As described later, diffracted light of the first hologram is produced by irradiating the holographic memory with the first reference light in the hologram diffracted light production section.

The second reference light is laser light capable of interfering with the diffracted light of the first hologram. That is, the second reference light is laser light having the same wavelength as that of the first reference light. As described later, a second hologram is produced by mixing the diffracted light of the first hologram and the second reference light in the hologram production section. Generally, the holographic memory is not irradiated with the second reference light. That is, the second reference light is mixed with the diffracted light of the first hologram without passing through the holographic memory.

The laser light source of the first reference light and a laser light source of the second reference light may or may not be the same as each other. When the laser light sources of the first reference light and the second reference light are the same as each other, laser light emitted from the laser light source may preferably be split into the first reference light and the second reference light by providing a laser light splitting section (see Embodiment 1).

The hologram diffracted light production section irradiates the holographic memory with the first reference light and produces the diffracted light of the first hologram.

The hologram production section changes the phase of the second reference light. For example, the hologram production section changes the phase of the second reference light to 0, $\pi/2$, $\pi$, and $3\pi/4$. In addition, the hologram production section produces the second hologram from the diffracted light of the first hologram produced by the hologram diffracted light production section and the second reference light of which the phase is changed. For example, when the phase of the second reference light is changed four times, four second holograms are produced.

The number of times at which the phase of the second reference light is changed (the number of times at which the second hologram is produced) may be the same as the multi-valued number of the phase modulation, but is not required to be the same number. As shown in Embodiment 1 described later, the phase of the second reference light is changed at least three times regardless of the multi-valued number of the phase modulation, thereby allowing the spatial phase modulation signal or the spatial quadrature amplitude modulation signal to be demodulated. It is possible to reduce a measurement error by increasing the number of times at which the second hologram is produced.

The beam diameter of the second reference light is not particularly limited as long as it is equal to or more than the beam diameter of the diffracted light of the first hologram. When the beam diameter of the second reference light is less than the beam diameter of the diffracted light of the first hologram, a signal included in the peripheral portion of the diffracted light of the first hologram cannot be demodulated. In addition, from the viewpoint of improving the accuracy of demodulation, the second reference light is preferably a plane wave.

Means for causing the hologram production section to change the phase of the second reference light is not particularly limited. For example, the phase of the second reference light may be changed using a variable phase shifter (see Embodiment 1). In addition, the phase of the second reference light may be changed by adjusting an interval between beam splitters constituting an optical system of the hologram production section (see Embodiment 2). In addition, the phase of the second reference light may be changed using a combination of a half-wave plate, a $\lambda/4$ wavelength plate and a polarization beam splitter (see Embodiments 3 to 5).

The detection section detects intensity distributions of all the second holograms produced by the hologram production section. The detection section is, for example, a light image detector (imaging device) such as a CCD or a CMOS. The number of pixels capable of being detected at a time by the detection section is required to be equal to or more than the number of pixels of a data page (two-dimensional data) recorded in the first hologram.

The processing section demodulates the phase modulation signal or the spatial quadrature amplitude modulation signal on the basis of the intensity distribution of the second hologram detected by the detection section. For example, the processing section is a computer connected to the detection section.

As mentioned above, an existing light image detector (imaging device) can detect an intensity, but cannot detect a phase. Consequently, in the holographic memory reproduction apparatus of the present invention, phase information included in the spatial phase modulation signal or the spatial quadrature amplitude modulation signal is read out from intensity patterns (combination) of a plurality of second holograms which are obtained by changing the phase of the second reference light.

For example, regarding a certain specific pixel within the data page, when the second hologram is produced from the diffracted light of the first hologram in which information of phase $\phi$ is recorded and the second reference light, the phase of the second reference light is set to 0, $\pi/2$, $\pi$, and $3\pi/2$, and four second holograms are produced. The intensities of the second holograms obtained are, for example, as follows: first one=large, second one=medium, third one=small, and fourth one=medium. Similarly, regarding a certain specific pixel within the data page, when the second holograms are produced from diffracted light of another first hologram in which information of phase φ' (different from phase φ) is recorded and the second reference light, the phase of the second reference light is set to 0, π/2, π, and 3π/2, and four second holograms are produced. The intensities of the second holograms obtained are, for example, as follows: first one=medium, second one=small, third one=medium, and fourth one=large. Phase information included in the diffracted light of the first hologram can be read out from differences in such patterns. A method of demodulating the spatial phase modulation signal or the spatial quadrature amplitude modulation signal from the intensity distribution of the second hologram will be described in detail in each embodiment described later.

In the above-mentioned example, only four-valued phases can be differentiated from each other, but a greater number of phase values can be differentiated from each other by changing the phase of the second reference light more minutely, or setting a detection step of the intensity more minutely in the detection section.

As shown in Embodiment 1 described later, the holographic memory reproduction apparatus of the present invention may be a holographic memory recording and reproduction apparatus further including a spatial phase modulation signal light production section or a spatial quadrature amplitude modulation signal light production section, and a recording section.

The spatial phase modulation signal light production section produces signal light including a phase modulation signal by performing spatial phase modulation on laser light. Similarly, the spatial quadrature amplitude modulation signal light production section produces signal light including a spatial quadrature amplitude modulation signal by performing spatial quadrature amplitude modulation on laser light. For example, the spatial quadrature amplitude modulation signal light production section performs spatial quadrature amplitude modulation using a spatial light modulator that performs amplitude modulation and a spatial light modulator that performs phase modulation.

In addition, the spatial quadrature amplitude modulation signal light production section can perform the spatial quadrature amplitude modulation even when only the spatial light modulator that performs the amplitude modulation is used. In this case, the spatial quadrature amplitude modulation signal light production section includes a beam splitter on which the laser light is incident, a reflection-type first spatial light modulator that modulates the amplitude of the laser light reflected from the beam splitter, and a reflection-type second spatial light modulator that modulates the amplitude of the laser light passing through the beam splitter, and an optical path length $L_I$ between the beam splitter and the first spatial light modulator and an optical path length $L_Q$ between the beam splitter and the second spatial light modulator are adjusted so as to satisfy predetermined conditions (see Embodiment 1).

The recording section records the signal light produced by the spatial phase modulation signal light production section or the spatial quadrature amplitude modulation signal light production section and the first hologram produced from the reference light, in the holographic memory.

Next, a description will be made of a procedure in which the holographic memory is reproduced by the holographic memory reproduction apparatus of the present invention.

First, the laser light source emits laser light. When the light sources of the first reference light and the second reference light are different from each other, the first laser light source emits the first reference light, and the second laser light source emits the second reference light. On the other hand, when the light sources of the first reference light and the second reference light are the same as each other, the laser light emitted from the laser light source is split into the first reference light and the second reference light in the laser light splitting section. In the hologram diffracted light production section, the holographic memory is irradiated with the first reference light. Thereby, the diffracted light of the first hologram is produced from the holographic memory. Processes so far are the same as those in a method of reproducing a holographic memory in the related art, except that the second reference light is split in the laser light splitting section.

The diffracted light of the first hologram is mixed with the second reference light in the hologram production section. At this time, the hologram production section changes the phase of the second reference light according to the multi-valued number of phase modulation. Thereby, the second hologram having a number according to the multi-valued number of phase modulation is produced. The detection section detects the intensity distribution of the second hologram, and transmits the detected intensity distribution to the processing section.

The processing section demodulates the phase modulation signal or the spatial quadrature amplitude modulation signal on the basis of the intensity distribution of the second hologram sent from the detection section.

As stated above, in the hologram production section, the holographic memory reproduction apparatus of the present invention produces the second hologram from the diffracted light of the hologram (first hologram) recorded in the holographic memory and the second reference light, and demodulates the phase modulation signal using the intensity distribution of the second hologram.

The holographic memory reproduction apparatus of the present invention can demodulate a two-valued or multi-valued amplitude modulation signal, a two-valued or multi-valued phase modulation signal, and a spatial quadrature amplitude modulation signal obtained by combining the amplitude modulation and the phase modulation.

Meanwhile, in the above, a description is given of an aspect in which the intensity distribution of the second hologram produced in the hologram production section is detected immediately in the detection section. However, in the reproduction apparatus and the reproduction method of the holographic memory according to the present invention, the intensity distribution of the second hologram is not necessarily required to be detected immediately, but an optical hologram may be formed as the second hologram for the time being. In this case, the second hologram which is an optical hologram is reproduced, and the intensity distribution of a hologram (which is the same as the second hologram) produced from the obtained diffracted light and the second reference light is detected by the detection section. In this manner, when the optical hologram is formed as the second hologram, a hologram recording system appropriate to an increase in capacity may be selected for the first hologram, and a hologram recording system capable of high-accuracy detection, even though not being appropriate to an increase in capacity, may be selected for the second hologram.

In addition, when the hologram production section, the detection section and the processing section are used, the spatial phase modulation signal or the spatial quadrature amplitude modulation signal can be demodulated. That is, the apparatus including the hologram production section, the detection section and the processing section can be used as a demodulation apparatus of the spatial phase modulation signal or the spatial quadrature amplitude modulation signal (see Example 4).

For example, the demodulation apparatus of the present invention includes an input section that receives signal light including a spatial phase modulation signal or a spatial quadrature amplitude modulation signal, a laser light source that emits laser light capable of interfering with the signal light, a hologram production section that changes a phase of the laser light and produces a hologram from the signal light and the laser light of which the phase is changed, a detection section that detects an intensity distribution of the hologram, and a processing section that demodulates the spatial phase modulation signal or the spatial quadrature amplitude modulation signal on the basis of the intensity distribution.

The demodulation apparatus of the present invention can demodulate the spatial phase modulation signal and the spatial quadrature amplitude modulation signal in accordance with the same procedure as that in the holographic memory reproduction apparatus of the present invention.

In addition, when the hologram production section, the detection section and the processing section are used, it is possible to observe the two-dimensional distribution of the intensity and the phase in transmitted light or reflected light from an object to be observed. That is, the apparatus including the hologram production section, the detection section and the processing section can be used as an observation apparatus of a light intensity distribution and a light phase distribution in the transmitted light or the reflected light from the object to be observed (see Examples 5 and 6). The type of the object to be observed is not particularly limited, but is, for example, a biological sample.

For example, the observation apparatus of the present invention includes an input section that inputs transmitted light or reflected light from an object to be observed, a laser light source that emits laser light capable of interfering with the transmitted light or the reflected light, a hologram production section that changes a phase of the laser light and produces a hologram from the transmitted light or the reflected light and the laser light of which the phase is changed, a detection section that detects an intensity distribution of the hologram, and a processing section that calculates a light intensity distribution and a light phase distribution in the transmitted light or the reflected light on the basis of the intensity distribution.

The observation apparatus of the present invention inputs the transmitted light or the reflected light from the object to be observed instead of the diffracted light of the first hologram. That is, the observation apparatus of the present invention irradiates the object to be observed instead of the holographic memory with light (equivalent to the first reference light), and processes the transmitted light or the reflected light from the object to be observed as the above-mentioned "spatial quadrature amplitude modulation signal", to thereby calculate a light intensity distribution and a light phase distribution in the transmitted light or the reflected light.

Embodiments of the present invention will be described below with reference to the accompanying drawings, but the scope of the present invention is not limited thereto.

Embodiment 1

In Embodiment 1, a description will be made of a holographic memory recording and reproduction apparatus which is capable of recording a data page (two-dimensional data) in a holographic memory using signal light (spatial quadrature amplitude modulation signal light) produced with a combination of amplitude modulation and phase modulation, and reproducing the recorded data page from the holographic memory.

FIG. 1 is a schematic diagram illustrating a configuration of a holographic memory recording and reproduction apparatus according to Embodiment 1. As shown in FIG. 1, holographic memory recording and reproduction apparatus 100 according to Embodiment 1 includes laser light source 105, first beam splitter 110, spatial quadrature amplitude modulation signal light production section 115, first lens 120, first mirror 125, second beam splitter 130, optical shutter 135, second lens 140, variable phase shifter 145, second mirror 150, third beam splitter 155, CCD 160 and a processing section (not shown).

Holographic memory recording and reproduction apparatus 100 records a data page (first hologram) in holographic memory (recording medium) 165 disposed between first lens 120 and second lens 140, and reproduces the data page from holographic memory 165. Holographic memory 165 can be removed from holographic memory recording and reproduction apparatus 100, and can be used as a removable memory like a CD, a DVD or the like.

Laser light source 105 is a light source of signal light and reference light (first reference light) used at the time of recording the data page (first hologram) in the holographic memory, and reference light (first reference light and second reference light) used at the time of reproducing the data page from the holographic memory.

First beam splitter 110 splits the laser light emitted from laser light source 105 into the signal light and the reference light (first reference light and second reference light).

Spatial quadrature amplitude modulation signal light production section 115 changes the amplitude (intensity) and the phase of the signal light split by first beam splitter 110 at the time of recording the data page in the holographic memory, and produces a spatial quadrature amplitude modulation signal. That is, spatial quadrature amplitude modulation signal light production section 115 carries the data page (two-dimensional data) in the signal light through spatial quadrature amplitude modulation (SQAM).

In the spatial quadrature amplitude modulation (SQAM), when an in-phase component of signals to be modulated is set to I, and a quadrature component is set to Q, these signals can be expressed as follows:

$$I = A(x,y) \cos \phi(x,y)$$

$$Q = A(x,y) \sin \phi(x,y) \qquad \text{[Equation 1]}$$

Herein, when the frequency of a light wave is set to ω, the time is set to t, the wave number is set to k, and the space variable is set to r, the follow relation is established by the addition theorem of trigonometric functions.

$$A(x,y)\cos(\omega t - \vec{k}\cdot\vec{r} + \phi(x,y)) = I\cos(\omega t - \vec{k}\cdot\vec{r}) - Q\sin(\omega t - \vec{k}\cdot\vec{r}) \qquad \text{[Equation 2]}$$

That is, modulation of in-phase component I and quadrature component Q of the signals is equivalent to modulation of amplitude A and phase φ of the light wave.

Figure 2:
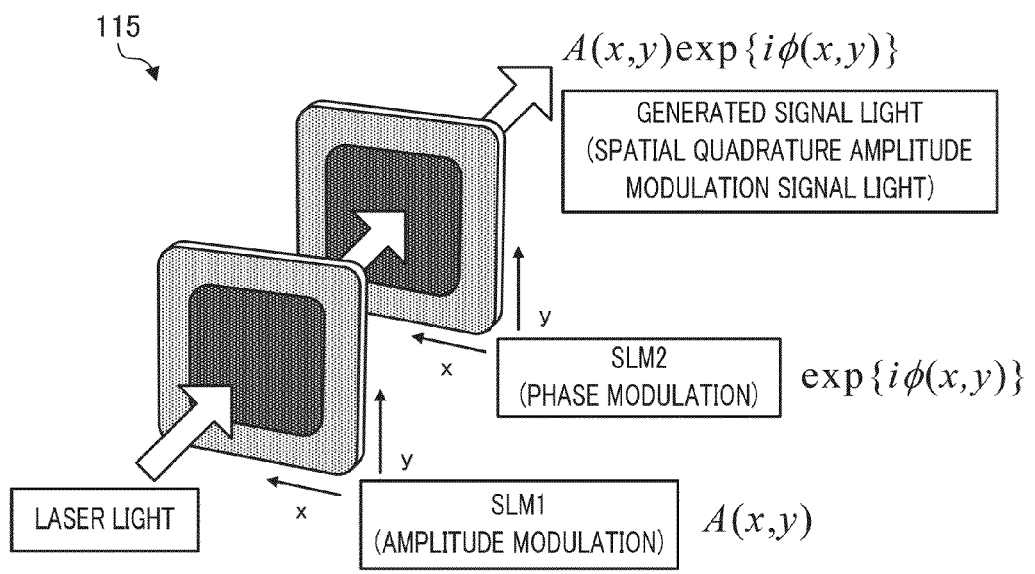
FIG. 2 is a schematic diagram illustrating an example of a configuration of a spatial quadrature amplitude modulation signal light production section.

For example, as shown in FIG. 2, spatial quadrature amplitude modulation signal light production section 115 is constituted by spatial light modulator (SLM1) that performs amplitude modulation and spatial light modulator (SLM2) that performs phase modulation. The spatial light modulator can electrically control the spatial distribution of amplitude A (x, y) and phase exp{iφ(x, y)} of a two-dimensional optical signal (such as an image). Examples of the spatial light modulator include an LCD (transmission-type liquid crystal), an LCOS (transmission-type liquid crystal), a DMD (digital mirror device) and the like. Meanwhile, when only the amplitude modulation or the phase modulation is performed, one spatial light modulator (SLM) may preferably be used.

Figure 3:
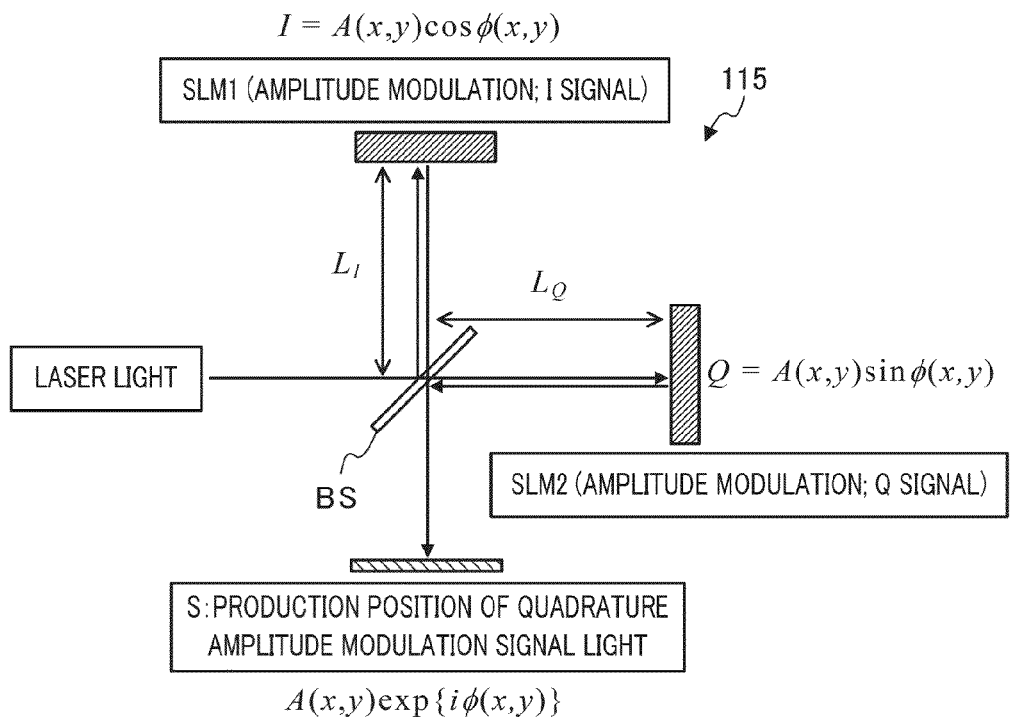
FIG. 3 is a schematic diagram illustrating another example of the configuration of the spatial quadrature amplitude modulation signal light production section.

In addition, as shown in FIG. 3, spatial quadrature amplitude modulation signal light production section 115 may have a configuration in which an I signal and a Q signal are intensity-modulated independently (parallel) and then are mixed, using a Michelson interferometer. The I signal and the Q signal are intensity signals expressed as equation 1. Both two spatial light modulators (SLM1 and SLM2) shown in FIG. 3 are reflection-type spatial light modulators that perform amplitude modulation. The I signal is amplitude-modulated by first spatial light modulator (SLM1). The Q signal is amplitude-modulated by second spatial light modulator (SLM2). In an aspect shown in FIG. 3, the optical path length $L_I$ between SLM1 and beam splitter (BS) and the optical path length $L_Q$ between SLM2 and BS are set so as to be "$L_I - L_Q = \lambda/4$" ($\lambda$: wavelength of a light wave). In this manner, the phase difference between the I signal and the Q signal in production position S of quadrature amplitude modulation signal light becomes $\pi/2$. Therefore, as shown in the following, an equivalent signal to that of the aspect shown in FIG. 2 can be obtained.

$$S(x, y) = I\exp\left(i\frac{\pi}{2}\right) + Q = A(x, y)\sin\phi(x, y)\exp\left(i\frac{\pi}{2}\right) + A(x, y)\cos\phi(x, y) =$$
$$iA(x, y)\sin\phi(x, y) + A(x, y)\cos\phi(x, y) = A(x, y)\exp\{i\phi(x, y)\}$$

First lens 120 is a lens for Fourier-transforming signal light (spatial quadrature amplitude modulation signal light) modulated by spatial quadrature amplitude modulation signal light production section 115, and convergently irradiating a desired position of holographic memory 165 with the signal light.

First mirror 125 is a mirror for causing the reference light (first reference light and second reference light) split by first beam splitter 110 to be incident on second beam splitter 130.

Second beam splitter 130 splits the reference light split by first beam splitter 110 into the first reference light and the second reference light. That is, second beam splitter 130 functions as a "laser light splitting section".

Optical shutter 135 blocks the second reference light split by second beam splitter 130.

Second lens 140 is an equivalent lens to first lens 120, and performs inverse Fourier transform on the diffracted light of the hologram (first hologram) recorded in holographic memory 165.

Variable phase shifter 145 changes the phase of the second reference light split by second beam splitter 110. Examples of variable phase shifter 145 include a liquid crystal device, a piezoelectric device or the like.

Second mirror 150 is a mirror for causing the second reference light of which the phase is changed by variable phase shifter 145 to be incident on third beam splitter 155.

Third beam splitter 155 produces a second hologram from the diffracted light of the first hologram on which inverse Fourier transform is performed by second lens 140 and the second reference light of which the phase is changed by variable phase shifter 145. Variable phase shifter 145, second mirror 150 and third beam splitter 155 function as a "hologram production section".

CCD 160 detects the intensity distribution of the second hologram. The detected intensity distribution is photoelectrically converted and is sent to the processing section. CCD 160 functions as a "detection section".

The processing section (not shown) processes information of the intensity distribution of the second hologram photoelectrically converted, and demodulates the spatial quadrature amplitude modulation signal.

Next, a description will be made of a procedure of recording a data page (two-dimensional data) in holographic memory 165 using holographic memory recording and reproduction apparatus 100 of the present embodiment.

Figure 4:
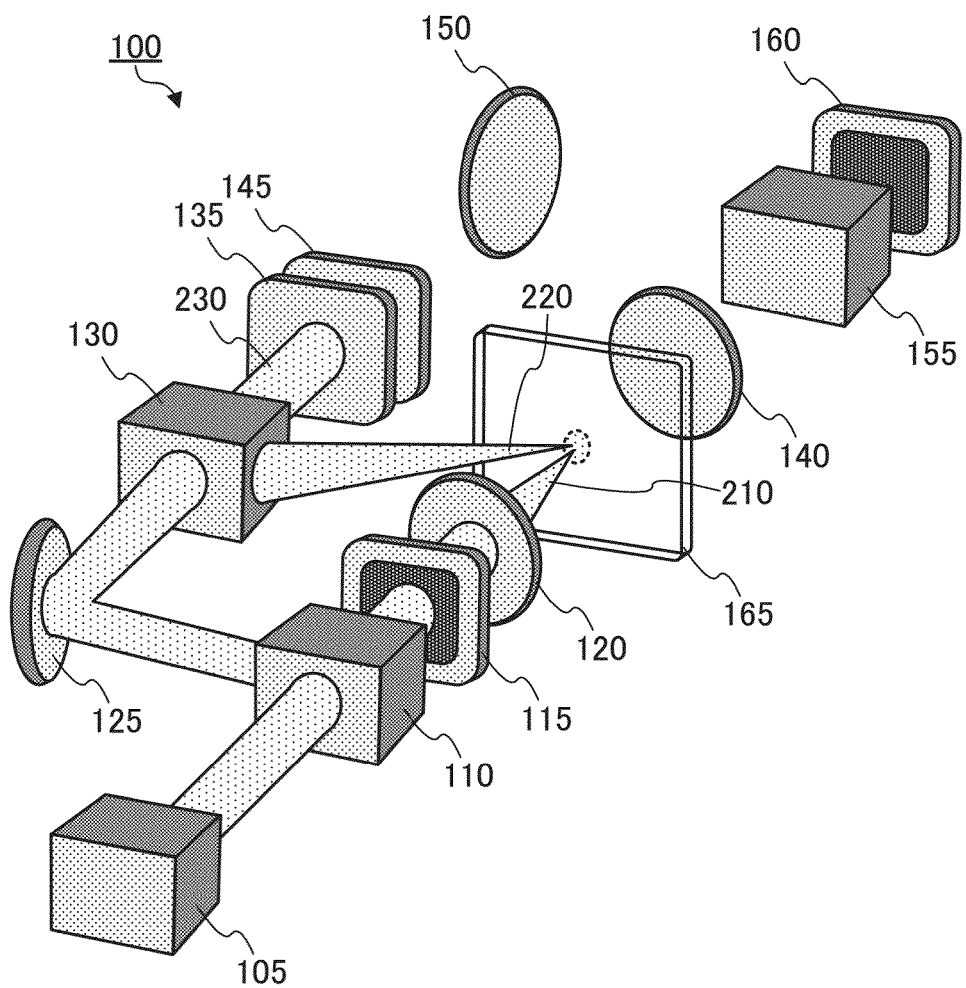
FIG. 4 is a schematic diagram illustrating a state in which a data page is recorded in a holographic memory using the holographic memory recording and reproduction apparatus according to Embodiment 1.

FIG. 4 is a schematic diagram illustrating a state in which the data page (first hologram) is recorded in holographic memory 165 using holographic memory recording and reproduction apparatus 100.

As shown in FIG. 4, when the data page is recorded in holographic memory 165, second reference light 230 is blocked by optical shutter 135. In this state, a predetermined position of holographic memory 165 is convergently irradiated with signal light 210 (spatial quadrature amplitude modulation signal light) produced by spatial quadrature amplitude modulation signal light production section 115 and first reference light 220 split by second beam splitter 110, to thereby record the hologram (first hologram). At this time, a plurality of holograms or data pages can of course be multiply recorded in the same position of holographic memory 165. Multiplex recording methods include angle multiplex recording for performing multiplex recording by changing the incidence angle of first reference light 220, phase code multiplex recording for performing multiplex recording by changing the phase of first reference light 220, or the like.

Next, a description will be made of a procedure of restoring the data page of the first hologram recorded in holographic memory 165 using holographic memory recording and reproduction apparatus 100 of the present embodiment.

Figure 5:
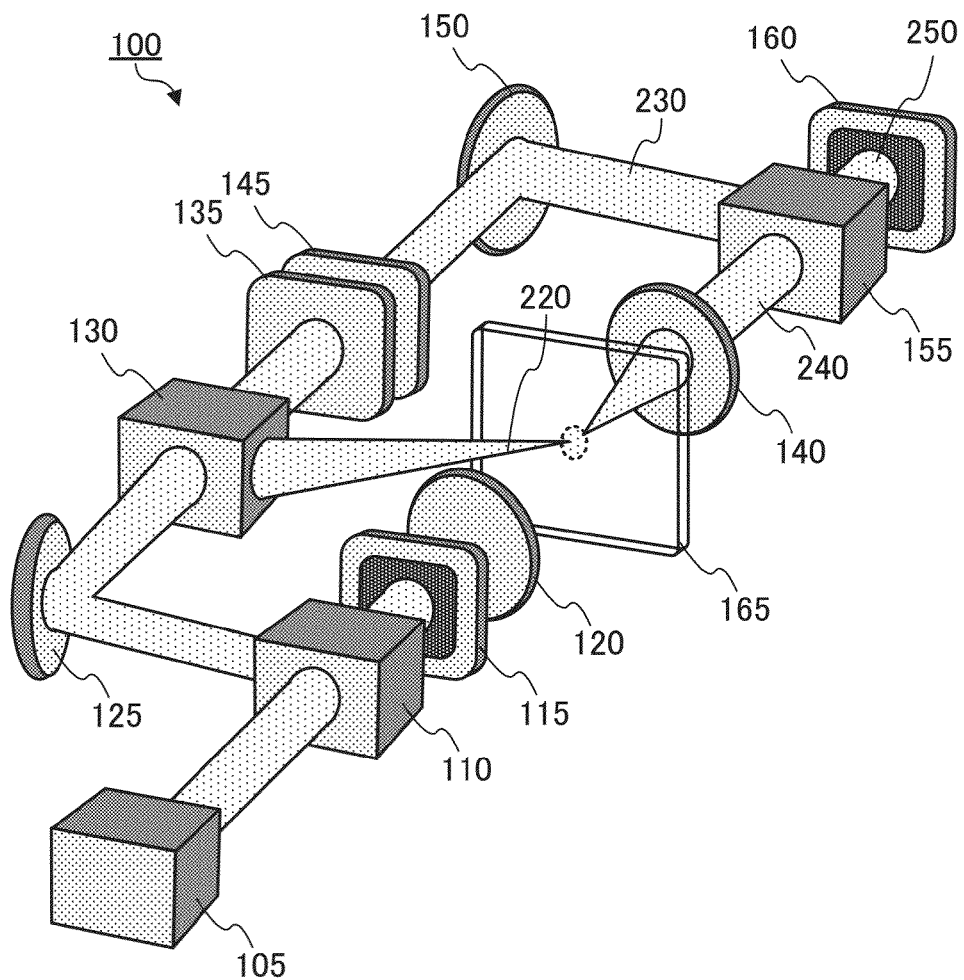
FIG. 5 is a schematic diagram illustrating a state in which a data page is read out from the holographic memory using the holographic memory recording and reproduction apparatus according to Embodiment 1.

FIG. 5 is a schematic diagram illustrating a state in which the data page is read out from holographic memory 165 using holographic memory recording and reproduction apparatus 100.

As shown in FIG. 5, when the data page is read out from holographic memory 165, signal light 210 is blocked by spatial light modulator (SLM) of spatial quadrature amplitude modulation signal light production section 115. Signal light 210 may be blocked by installing an optical shutter, instead of the spatial light modulator, on the optical path of signal light 210. On the other hand, optical shutter 135 on the optical path of second reference light 230 is opened. In this state, a predetermined position of holographic memory 165 is convergently irradiated with first reference light 220, to thereby generate diffracted light 240 of the first hologram. Second hologram 250 is then produced by causing diffracted light 240 of the first hologram and second reference light 230 to interfere with each other. CCD 160 photoelectrically converts the intensity distribution I(x, y) of second hologram 250, and restores two-dimensional information. At this time, the phase of second reference light 230 is changed by variable phase shifter 145 to produce a plurality of second holograms, and a plurality of two-dimensional signal data items obtained by photoelectric conversion are electrically processed, thereby allowing the spatial quadrature amplitude modulation signal recorded in the holographic memory to be demodulated with a high degree of accuracy.

Here, a description will be made of two methods (first method and second method) of demodulating spatial quadrature amplitude modulation signal A (x, y) exp{i$\phi$(x, y)} recorded in the first hologram from the intensity distribution detected by CCD 160. Here, that recorded N-valued phase information is either of $\phi_n$ (n=1, 2, . . . , N) is assumed.

1) First Method

In the first method, the phase of second reference light 230 is changed to $\phi_1, \phi_2, \ldots \phi_N$, and second holograms having different characteristics are produced N times. At this time, the phase of the second reference light when the intensity of a reproduction light beam of the second hologram is highest is set to be phase information recorded in the first hologram. Regarding amplitude information, optical shutter 135 shown in FIG. 5 is closed, and only diffracted light 240 of the first hologram is observed by CCD 160 without producing the second hologram. Thereby, since a phase component is automatically removed by photoelectric conversion, amplitude information A (x, y) can be demodulated.

In this method, a load of digital signal processing is small, but the multi-valued number N in a modulation signal and the number of times of production of the second hologram required for demodulation are equal to each other. Therefore, when the multi-valued number N becomes larger, the number of times of production of the hologram required for demodulation of the phase information also increases.

2) Second Method

When the complex amplitude of first reference light 220 at the time of recording the spatial quadrature amplitude modulation signal light $A(x, y) \exp\{i\phi(x, y)\}$ in the first hologram is set to R, the intensity distribution occurring on a first hologram plane is expressed as follows:

$$I(x, y) = |A(x, y)\exp\{i\phi(x, y)\} + R|^2 = \{A(x, y)\}^2 + |R|^2 + A(x, y)\exp\{i\phi(x, y)\}R^* + A(x, y)\exp\{-i\phi(x, y)\}R \quad \text{[Equation 3]}$$

When the intensity distribution of equation 3 is optically recorded in the first hologram, the amplitude transmittance distribution thereof is recorded in the following form:

$$T_A = T_0 t_1 I(x,y) \quad \text{[Equation 4]}$$

where $T_0$ and $t_1$ are constants determined by the type or the recording system of a photosensitive material constituting the first hologram.

In a demodulation process of the spatial quadrature amplitude modulation signal, first, the light wave obtained when the first hologram is reproduced by first reference light 220 is expressed as the following equation on the basis of Equations (3) and (4).

$$T_A R = T_0 R + t_1 R I(x, y) = T_0 R + t_1 R\{A(x, y)\}^2 + t_1 R|R|^2 + t_1 A(x, y)\exp\{i\phi(x, y)\}|R|^2 + t_1 A(x, y)\exp\{-i\phi(x, y)\}R^2 \quad \text{[Equation 5]}$$

In equation 5, the signal component of diffracted light occurring at the time of the reproduction of the first hologram is included in the fourth term of the left-hand side. Light of other components can be easily removed by a spatial filter or the like due to a different propagation direction. Therefore, recording light S of the second hologram obtained by reproducing the first hologram is proportional to the following equation:

$$S = \eta A(x,y)\exp\{i\phi(x,y)\} + A_N \quad \text{[Equation 6]}$$

where $\eta$ is the diffraction efficiency of the first hologram, and the relation of $\eta = t_1 |R|^2$ is established. In addition, $A_N$ is the unnecessary diffracted light component and the noise component mixed into recording light of the second hologram which are not able to be removed by a spatial filter.

The spatial quadrature amplitude modulation signal which is first recorded in the first hologram is transferred to the second hologram produced on a CCD by recording light 240 (signal component of diffracted light of the first hologram) of the second hologram in equation 6 and second reference light 230 (complex amplitude R'). At this time, second reference light 230 is added with the following phase shift by variable phase shifter 145.

$$R' = R_0 \exp\{im\Delta\Psi\} \quad \text{[Equation 7]}$$

where $R_0$ is the amplitude of the complex amplitude R', and $im\Delta\Psi$ is the phase thereof. In addition, m is an integer (m=1, 2, ..., M). M is the number of times at which the phase of second reference light 230 is shifted, and is equivalent to the number of second holograms produced.

That is, M different second holograms are produced by changing m from 1 to M, in other words, changing the phase of second reference light 230, and the reproduction thereof is performed simultaneously. At this time, the intensity distribution of the m-th second hologram occurring on the plane of CCD 160 is expressed as follows:

$$I_m(x,y) = |S + R'|^2 = |\eta A \exp(i\phi) + R_0\exp(im\Delta\Psi) + A_N|^2 \quad \text{[Equation 8]}$$

The term proportional to $A_N$ which is a noise component does not contribute to the hologram distribution due to lack of coherence with second reference light 230. However, when the component of $(A_N)^2$ becomes noise, and the relation of $I_N = (A_N)^2$ is established, equation 8 is expressed as follows:

$$I_m(x,y) = \eta^2 A^2 + R_0^2 + I_N + \beta A_N + 2\eta A R_0 \cos(\phi - m\Delta\Psi) \quad \text{[Equation 9]}$$

Here, when the relation of $I_0 = \eta^2 A^2 + R_0^2$ is established, the following equation is established.

$$I_m = I_0 + I_N + \beta A_N 2\eta A R_0 \cos\phi \cos m\Delta\Psi + 2\eta A R_0 \sin\phi \sin m\Delta\Psi \quad \text{[Equation 9']}$$

When the photoelectric conversion efficiency of CCD 160 is substantially constant relative to the light intensity, and the conversion efficiency thereof is set to q, electrical signal intensity $V_m(x, y) = qI_m$ which is output from CCD 160 with respect to the m-th hologram intensity distribution is expressed as follows:

$$V_m = q(I_0 + I_N) + V_N + 2q\eta A R_0 \cos\phi \cos m\Delta\Psi + 2q\eta A R_0 \sin\phi \sin m\Delta\Psi \quad \text{[Equation 10]}$$

$V_N$ in the above equation is a noise component occurring in photoelectric conversion. Here, when three parameters a, b, and c are established as follows:

$$a = q(+I_0 + I_N) + V_N, b = 2q\eta A R_0 \cos\phi, c = 2q\eta A R_0 \sin\phi \quad \text{[Equation 11]}$$

the following equation is established.

$$V_m = a + b\cos m\Delta\Psi + c\sin m\Delta\Psi \quad \text{[Equation 12]}$$

When the actual measured value of $V_m$ is assumed to be set to $V_m'$ at the time of detecting the intensity distribution of the second hologram, information known to a measurer is $V_m'$ and $m\Delta\Psi$. Consequently, unknown parameters a, b, and c may preferably be determined using a computer so as to satisfy the following equation:

$$\sum_{m=1}^{M}(V_m' - V_m)^2 = \sum_{m=1}^{M}(V_m' - a - b\cos m\Delta\Psi - c\sin m\Delta\Psi)^2 \to \min. \quad \text{[Equation 13]}$$

where min. denotes a minimum value. When the parameters a, b, and c calculated in this way are used, the following equation is obtained on the basis of equation 11

$$\phi(x,y)=\tan^{-1} c/b \quad \text{[Equation 14]}$$

and phase information of spatial quadrature amplitude signal light can be demodulated. In addition, the following equation is obtained on the basis of equation 11 likewise $$b^2+c^2=4q^2\eta^2 A^2 R_0^2 \quad \text{[Equation 15]}$$

and the amplitude information of the spatial quadrature amplitude signal light can be demodulated. The following equation is established.

$$A(x,y) = \frac{\sqrt{b^2+c^2}}{2q\eta R_0} \quad \text{[Equation 16]}$$

When the intensity $R_0$ of the reference light is constant in all (M) of the second holograms, the following equation is established.

$$A(x,y) \propto \sqrt{b^2+c^2} \quad \text{[Equation 17]}$$

The characteristic point in the above processes is that the number of unknown parameters is three of a, b, and c regardless of the multi-valued number N of the phase and the amplitude. Therefore, the quadrature amplitude modulation signal light can be demodulated by producing the second hologram three times as a minimum (M=3). This has an advantage over the first method in which the number of times of production of the second hologram is M=N, when reproducing the holographic memory using the large multi-valued number N. In addition, there is an advantage that signals can be demodulated depending on the parameters b and c by maintaining the intensity of second reference light 230 constant in the production of the second hologram, and that the influence of noise components (noise components $I_N$ and $V_N$ included in the parameter a) occurring in detection is not caused.

Next, a procedure of calculating the parameters a, b, and c will be described. First, in equation 13, when the relation of $\alpha=m\Delta\Psi$ is established, and a partial differentiation is performed by each of the parameters a, b, and c being set to 0, the following equation is obtained.

$$\begin{pmatrix} \sum V'_m \cos\alpha \\ \sum V'_m \sin\alpha \\ \sum V'_m \end{pmatrix} = \begin{pmatrix} \sum \cos\alpha & \sum \cos^2\alpha & \sum \sin\alpha\cos\alpha \\ \sum \sin\alpha & \sum \sin\alpha\cos\alpha & \sum \sin^2\alpha \\ M & \sum \cos\alpha & \sum \sin\alpha \end{pmatrix} \begin{pmatrix} a \\ b \\ c \end{pmatrix} \quad \text{[Equation 18]}$$

Here, when a step of the phase shift given to second reference light 230 is set to be $\Delta\Psi=2\pi/M$, the following equation is established.

$$\Sigma \sin\alpha = \Sigma \cos\alpha = \Sigma \sin\alpha \cos\alpha = 0 \; \Sigma \sin^2\alpha = \Sigma \cos^2\alpha = M/2 \quad \text{[Equation 19]}$$

Therefore, the calculation is considerably facilitated, and each of the parameters is obtained as follows:

$$a=M\Sigma V'_m \; b=\Sigma V'_m \cos\alpha \; c=\Sigma V'_m \sin\alpha \quad \text{[Equation 20]}$$

By substituting this result into equation 14 and equation 17, the following equation is established $$\phi(x,y) = \tan^{-1} \frac{\sum V'_n \sin\alpha}{\sum V'_n \cos\alpha} \quad \text{[Equation 21]}$$

and the phase information of the spatial quadrature amplitude modulation signal is obtained. The amplitude information is obtained on the basis of the following equation:

$$A(x,y) \propto \sqrt{b^2+c^2} = \sqrt{(\Sigma V'_n \sin\alpha)^2 + (\Sigma V'_n \cos\alpha)^2} \quad \text{[Equation 22]}$$

As stated above, the holographic memory recording and reproduction apparatus of Embodiment 1 can record the data page (two-dimensional data) in the holographic memory using the signal light (spatial quadrature amplitude modulation signal light) produced with a combination of the phase modulation and the amplitude modulation, and can reproduce the data page from the holographic memory with a high degree of accuracy.

Embodiment 2

In Embodiment 1, the phase of the second reference light is changed using the variable phase shifter at the time of producing M second holograms. In Embodiment 2, a description will be made of a holographic memory recording and reproduction apparatus that simultaneously produces M second holograms without using the variable phase shifter by using a special interferometer.

In the holographic memory recording and reproduction apparatus of Embodiment 2, each component except for the hologram production section and the detection section is the same as that of the holographic memory recording and reproduction apparatus of Embodiment 1. Consequently, only the hologram production section and detection section will be described. Herein, the configurations of the hologram production section and the detection section of the holographic memory recording and reproduction apparatus of Embodiment 2 when the following equation is established as an example are shown in FIG. 6.

$$M=4, \Delta\Psi=\pi/2 \quad \text{[Equation 23]}$$

Figure 6:
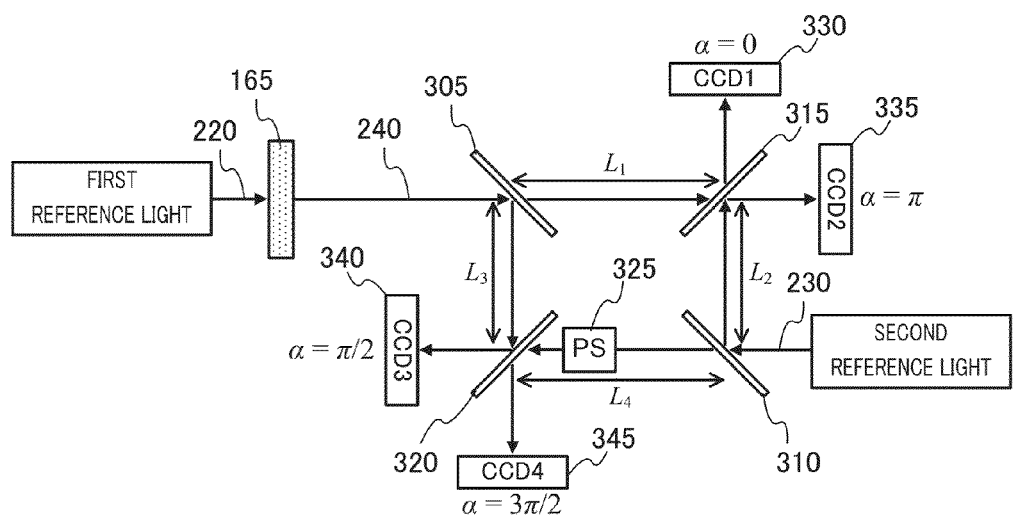
FIG. 6 is a schematic diagram illustrating a configuration of a hologram production section and a detection section of a holographic memory recording and reproduction apparatus according to Embodiment 2.

As shown in FIG. 6, the hologram production section and the detection section include first beam splitter 305, second beam splitter 310, third beam splitter 315, fourth beam splitter 320, phase shifter 325, first CCD 330, second CCD 335, third CCD 340, and fourth CCD 345. First beam splitter 305, second beam splitter 310, third beam splitter 315, fourth beam splitter 320 and phase shifter 325 function as the "hologram production section". In addition, first CCD 330, second CCD 335, third CCD 340 and fourth CCD 345 function as the "detection section". In FIG. 6, first reference light 220 and second reference light 230 are laser light having mutual coherence arising from the same laser light source.

First beam splitter 305, second beam splitter 310, third beam splitter 315 and fourth beam splitter 320 split each incident light flux into two light fluxes. First beam splitter 305, second beam splitter 310, third beam splitter 315 and fourth beam splitter 320 are disposed to have a positional relation shown in FIG. 6.

As shown in FIG. 6, diffracted light 240 of the first hologram is incident on first beam splitter 305. A portion of the incident diffracted light of the first hologram is transmitted and directed to third beam splitter 315. The remainder thereof is reflected and directed to fourth beam splitter 320. Similarly, second reference light 230 is incident on second beam splitter 310. A portion of incident second reference light 230 is reflected and directed to third beam splitter 315. The remainder thereof is transmitted and directed to fourth beam splitter 320.

Diffracted light 240 of the first hologram passing through first beam splitter 305 is incident on a first surface of third beam splitter 315. A portion of incident diffracted light 240 of the first hologram is reflected and directed to first CCD 330. The remainder thereof is transmitted and directed to second CCD 335. On the other hand, second reference light 230 reflected from second beam splitter 310 is incident on a second surface of third beam splitter 315. A portion of incident second reference light 230 is transmitted and directed to first CCD 330. The remainder thereof is reflected and directed to second CCD 335.

Diffracted light 240 of the first hologram reflected from first beam splitter 305 is incident on a first surface of fourth beam splitter 320. A portion of incident diffracted light 240 of the first hologram is reflected and directed to third CCD 340. The remainder thereof is transmitted and directed to fourth CCD 345. On the other hand, second reference light 230 passing through second beam splitter 310 is incident on a second surface of fourth beam splitter 320. A portion of incident second reference light 230 is transmitted and directed to third CCD 340. The remainder thereof is reflected and directed to fourth CCD 345.

As shown in FIG. 6, phase shifter 325 is disposed between second beam splitter 310 and fourth beam splitter 320. Phase shifter 325 changes the phase of the second reference light split by second beam splitter 310.

First CCD 330, second CCD 335, third CCD 340 and fourth CCD 345 are disposed to have a positional relation shown in FIG. 6. First CCD 330 detects the intensity distribution of the second hologram which is produced by diffracted light 240 of the first hologram reflected from the third beam splitter 315 and second reference light 230 passing through third beam splitter 315. Second CCD 335 detects the intensity distribution of the second hologram which is produced by diffracted light 240 of the first hologram passing through third beam splitter 315 and second reference light 230 reflected from third beam splitter 315. Third CCD 340 detects the intensity distribution of the second hologram which is produced by diffracted light 240 of the first hologram reflected from fourth beam splitter 320 and second reference light 230 passing through fourth beam splitter 320. Fourth CCD 345 detects the intensity distribution of the second hologram which is produced by diffracted light 240 of the first hologram passing through fourth beam splitter 320 and second reference light 230 reflected from fourth beam splitter 320.

An optical system shown in FIG. 6 is adjusted so that optical path length $L_1$ between first beam splitter 305 and third beam splitter 315, optical path length $L_2$ between second beam splitter 310 and third beam splitter 315, optical path length $L_3$ between first beam splitter 305 and fourth beam splitter 320, and optical path length $L_4$ between second beam splitter 310 and fourth beam splitter 320 satisfy the following equation 24.

$$L_4 - L_3 = L_2 - L_1 + \frac{\lambda}{4} + \lambda l \quad \text{[Equation 24]}$$

($l$ is a constant)

In the adjustment of the optical system, the reference signal light is given instead of hologram diffracted light 240, and thus a position of each of beam splitters 305 to 320 may preferably be adjusted so that the light intensity on first CCD 330 at that time becomes maximum. In this manner, the second hologram when the phase of second reference light 230 satisfies $\alpha=0$ is produced on first CCD 330. In addition, when the light intensity on the first CCD becomes maximum in a specific signal position (x, y) on the basis of the Stokes' relational expression and the energy conservation law, the light intensity on second CCD 335 becomes minimum in the same signal position (x, y). Therefore, the second hologram when the phase of second reference light 230 is $\alpha=\pi$ is produced on second CCD 335.

Figure 7:
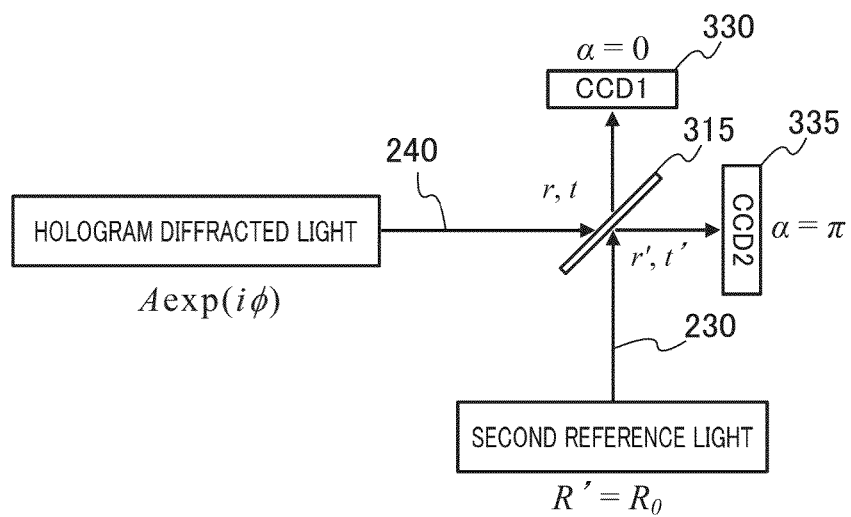
FIG. 7 is an enlarged schematic diagram illustrating a peripheral portion of a third beam splitter of FIG. 6.

A reason for being able to simultaneously produce the second holograms using the configuration shown in FIG. 6 will be described with reference to FIG. 7. FIG. 7 is an enlarged schematic diagram of a peripheral portion of third beam splitter 315 in FIG. 6.

As shown in FIG. 7, diffracted light $A\exp(i\phi)$ of the first hologram is incident on third beam splitter 315 from the left side of the drawing. The amplitude transmittance of third beam splitter 315 for the light from this direction (direction toward the right side from the left side of the drawing) is set to t (component toward second CCD 335), and the amplitude reflectance thereof is set to r (component toward first CCD 330). In addition, second reference light 230 expressed as $R_0$ is incident on third beam splitter 315 from the lower side of the drawing. The amplitude transmittance of third beam splitter 315 for the light from this direction (direction toward the upper side from the lower side of the drawing) is set to t' (component toward first CCD 330), and the amplitude reflectance thereof is set to r' (component toward second CCD 335). In this case, the Stokes' relational expression $$t^*t'+r^*r=1, t^*r'+r^*t=0 \quad \text{[Equation 25]}$$

and the energy conservation law $$t=t' \quad \text{[Equation 26]}$$

are generally established (sign * denotes a complex conjugate).

Herein, the hologram amplitude occurring on first CCD 330 is expressed as the following equation in the substantially same procedure as that of equation 8 when equation 26 is used.

$$\begin{aligned} I_{CCD1}(x, y) &= |rA\exp(i\phi) + t'R_0|^2 \quad \text{[Equation 27]} \\ &= |rA\exp(i\phi) + tR_0|^2 \\ &= |r|^2 A^2 + |t|^2 R_0^2 + AR_0 \\ &\quad \{rt^*\exp(i\phi) + r^*t\exp(-i\phi)\} \\ &= |r|^2 A^2 + |t|^2 R_0^2 + 2AR_0|rt^*| \\ &\quad \cos(\phi + \gamma) \end{aligned}$$

where $\gamma$ is the phase angle of product $rt^*$ of reflectance and transmittance, and the following relation is established.

$$rt^* = |rt^*|\exp(i\gamma)$$

Similarly, the hologram amplitude occurring on second CCD 335 is expressed as follows:

$$I_{CCD2}(x, y) = |tA\exp(i\phi) + r'R_0|^2 = \quad \text{[Equation 28]}$$
$$|t|^2 A^2 + |r'|^2 R_0^2 + AR_0\{tr'^*\exp(i\phi) + r't^*\exp(-i\phi)\}$$

Herein, when equation 25 is used, the following relation is established $$tr'^* = -rt^*r't^* = -r^*t$$

and thus equation 28 is expressed as follows:

$$I_{CCD2}(x, y) = |tA\exp(i\phi) + r'R_0|^2 = \quad \text{[Equation 29]}$$
$$|t|^2 A^2 + |r'|^2 R_0^2 - AR_0\{rt^*\exp(i\phi) + r^*t\exp(-i\phi)\} =$$
$$|r|^2 A^2 + |r'|^2 R_0^2 - 2AR_0|rt^*|\cos(\phi + \gamma) =$$
$$|r|^2 A^2 + |r'|^2 R_0^2 + 2AR_0|rt^*|\cos(\phi + \gamma - \pi)$$

In equation 27, when reference signal light is given instead of the hologram diffracted light, and the optical system is adjusted so that the light intensity on first CCD 330 at that time becomes maximum ($I_{CCD1}$ is maximum in $\phi+\gamma=0$), this is equivalent to a case where the value in the parentheses of the cos( ) function representing a change of the light intensity becomes 0 in equation 9, and thus is equal to optical conditions in which the second hologram when m=0, that is, the phase of second reference light 230 is $\alpha=0$ is obtained. In addition, comparing equation 27 with equation 29, it is known that the sign of the interference fringe is inverted, that is, the phase of the interference fringe in the third term of the left-hand side is shifted by $\pi$ ($-\pi$ is included in the parentheses of the cos( ) function representing a change of the light intensity). Therefore, equation 29 is equal to optical conditions where the second hologram is obtained in which m=2, that is, the phase of second reference light 230 is equivalent to $\alpha=\pi$ in equation 9. Herein, although values of the first term and the second term of the left-hand side are different from each other in equation 27 and equation 29, these values can be set to the same value by using a beam splitter (half mirror) having a standard light intensity branching ratio of 1:1 which satisfies the following relation.

$$|r|^2 = |r'|^2 = |t|^2 = 0.5$$

From the above, it is known that the second hologram when the phase of second reference light 230 is $\alpha=0$ is produced on first CCD 330, and that the second hologram when the phase of second reference light 230 is $\alpha=\pi$ is produced on second CCD 335.

Next, signal light having a phase difference of $\pi/2$ with respect to the reference signal light is given instead of the hologram diffracted light, and phase shifter 325 is adjusted so that the light intensity on third CCD 340 at that time becomes maximum. Meanwhile, this adjustment may preferably be performed once for the first time, unlike an operation in the variable phase shifter of the holographic memory reproduction apparatus of Embodiment 1.

Here, when the amplitude transmittance and the amplitude reflectance of fourth beam splitter 320 are the same as those of third beam splitter 315, the hologram amplitudes occurring on third CCD 340 and fourth CCD 345 are expressed as follows:

$$I_{CCD3}(x, y) = \left|rA\exp\left(i\phi - i\frac{\pi}{2}\right) + t'R_0\right|^2 \quad \text{[Equation 30]}$$
$$= \left|rA\exp\left(i\phi - i\frac{\pi}{2}\right) + tR_0\right|^2$$
$$= |r|^2 A^2 + |t|^2 R_0^2 + 2AR_0|rt^*|\cos\left(\phi + \gamma - \frac{\pi}{2}\right)$$

$$I_{CCD4}(x, y) = \left|tA\exp\left(i\phi - i\frac{\pi}{2}\right) + r'R_0\right|^2 \quad \text{[Equation 31]}$$
$$= |t|^2 A^2 + |r'|^2 R_0^2 - 2AR_0|rt^*|\cos\left(\phi + \gamma - \frac{\pi}{2}\right)$$
$$= |t|^2 A^2 + |r'|^2 R_0^2 + 2AR_0|rt^*|\cos\left(\phi + \gamma - \frac{3\pi}{2}\right)$$

Equation 30 is equal to optical conditions where the second hologram when m=1, that is, the phase of second reference light 230 is $\alpha=\pi/2$ in equation 9 is obtained. In addition, equation 31 is equal to optical conditions where the second hologram when m=3, that is, the phase of second reference light 230 is $\alpha=3\pi/2$ in equation 8 is obtained.

When the optical system is adjusted as stated above, and then diffracted light 240 (spatial quadrature amplitude modulation signal light) of the first hologram and second reference light 230 are introduced into the optical system, the phase of second reference light 230 is not changed, but the second hologram equal to that in a case where the phase of second reference light 230 is changed to $\alpha=0$, $\pi/2$, $\pi$, and $3\pi/2$ is simultaneously produced on first CCD 330, second CCD 335, third CCD 340 and fourth CCD 345. A procedure of demodulating a signal through electronic processing from four second holograms simultaneously obtained in this manner is the same as the second method described in Embodiment 1 (see equation 18 to equation 22).

As stated above, the holographic memory recording and reproduction apparatus of Embodiment 2 simultaneously produces M second holograms without using the variable phase shifter by using a special interferometer, thereby allowing the spatial quadrature amplitude modulation signal light to be demodulated.

Embodiment 3

In Embodiment 2, it is necessary to adjust the optical path length between each of the beam splitters. In Embodiment 3, a description will be made of a holographic memory recording and reproduction apparatus that simultaneously produces M second holograms without adjusting the optical path length between each of the beam splitters.

In the holographic memory recording and reproduction apparatus of Embodiment 3, each component except for the hologram production section and the detection section is the same as that of the holographic memory recording and reproduction apparatus of Embodiment 1. Consequently, only the hologram production section and detection section will be described.

Figure 8:
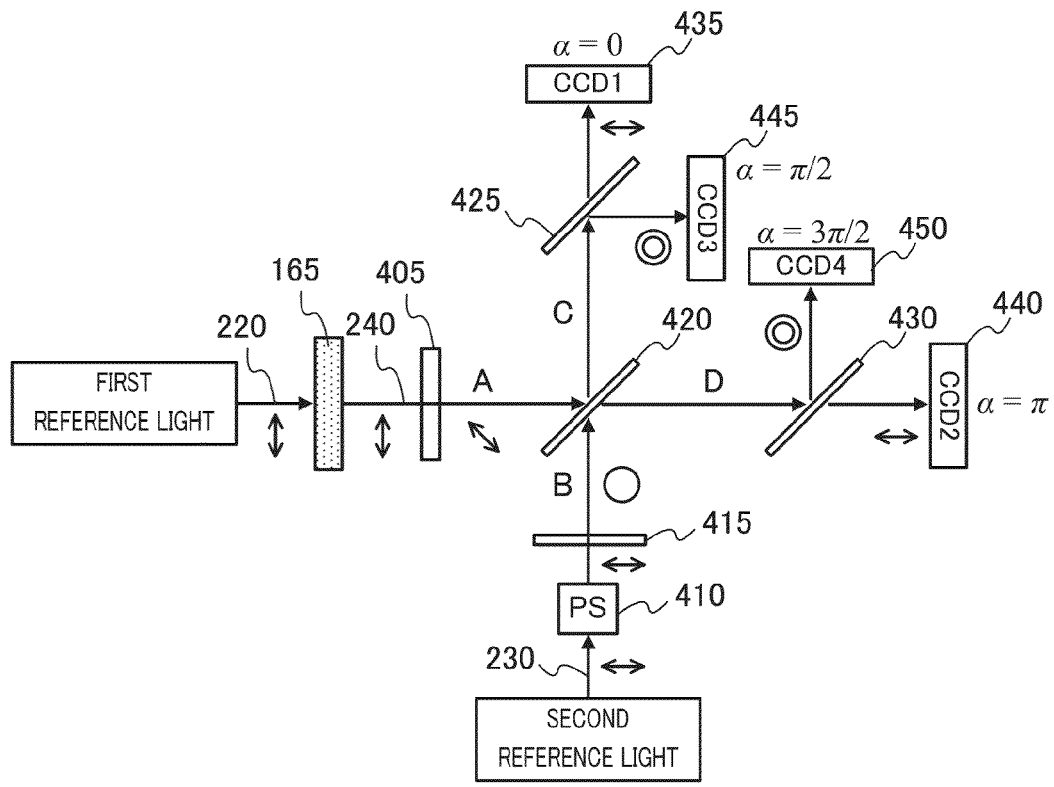
FIG. 8 is a schematic diagram illustrating a configuration of a hologram production section and a detection section of a holographic memory recording and reproduction apparatus according to Embodiment 3.

FIG. 8 is a schematic diagram illustrating a configuration of the hologram production section and the detection section of the holographic memory recording and reproduction apparatus according to Embodiment 3.

As shown in FIG. 8, the hologram production section and detection section includes half-wave plate 405, variable phase shifter 410, $\lambda/4$ wavelength plate 415, beam splitter 420, first polarization beam splitter 425, second polarization beam splitter 430, first CCD 435, second CCD 440, third CCD 445, and fourth CCD 450. Half-wave plate 405, variable phase shifter 410, $\lambda/4$ wavelength plate 415, beam splitter 420, first polarization beam splitter 425 and the second polarization beam splitter 430 function as a "hologram production section". In addition, first CCD 435, second CCD 440, third CCD 445 and the fourth CCD 450 function as a "detection section". In FIG. 8, first reference light 220 and second reference light 230 are laser light of linearly polarized light (horizontally polarized light; in-plane direction in the drawing) arising from the same laser light source.

Half-wave plate 405 is disposed on the optical path of diffracted light 240 of the first hologram, and rotates the polarization angle of diffracted light 240 of the first hologram by 45 degrees.

Variable phase shifter 410 is disposed on the optical path of second reference light 230. Meanwhile, variable phase shifter 410 is not required in a case where M=4, that is, the number of second holograms shown in equation 23 is equal to or less than 4.

In addition, $\lambda/4$ wavelength plate 415 is disposed on the optical path of second reference light 230, and converts the polarization state of second reference light 230 into circularly polarized light. The circularly polarized light herein means a polarization state in which the phase difference between a horizontally polarized light component and a vertically polarized light component is $\pi/2$.

Beam splitter 420 is a beam splitter which does not have polarization dependency. Diffracted light 240 of the first hologram of which the polarization angle is changed by half-wave plate 405 is incident on a first surface of beam splitter 420. A portion of incident diffracted light 240 of the first hologram is reflected and directed to first polarization beam splitter 425. The remainder thereof is transmitted and directed to second polarization beam splitter 430. In addition, second reference light 230 of which the polarization state is changed by $\lambda/4$ wavelength plate 415 is incident on a second surface of beam splitter 420. A portion of incident second reference light 230 is transmitted and directed to first polarization beam splitter 425. The remainder thereof is reflected and directed to second polarization beam splitter 430.

First polarization beam splitter 425 and second polarization beam splitter 430 are beam splitters having polarization dependency. That is, first polarization beam splitter 425 and second polarization beam splitter 430 transmit the horizontally polarized light, and reflect the vertically polarized light. First polarization beam splitter 425 and second polarization beam splitter 430 are disposed to have a positional relation shown in FIG. 8.

As shown in FIG. 8, diffracted light 240 of the first hologram reflected from beam splitter 420 and second reference light 230 passing through beam splitter 420 are incident on first polarization beam splitter 425. The horizontally polarized light component of diffracted light 240 of the first hologram and the horizontally polarized light component of second reference light 230 pass through first polarization beam splitter 425 and are directed to first CCD 435. On the other hand, the vertically polarized light component of diffracted light 240 of the first hologram and the vertically polarized light component of second reference light 230 are reflected from first polarization beam splitter 425 and are directed to third CCD 445.

Similarly, diffracted light 240 of the first hologram passing through beam splitter 420 and second reference light 230 reflected from beam splitter 420 are incident on second polarization beam splitter 430. The horizontally polarized light component of diffracted light 240 of the first hologram and the horizontally polarized light component of second reference light 230 pass through second polarization beam splitter 430 and are directed to second CCD 440. On the other hand, the vertically polarized light component of diffracted light 240 of the first hologram and the vertically polarized light component of second reference light 230 are reflected from second polarization beam splitter 430 and are directed to fourth CCD 450.

First CCD 435, second CCD 440, third CCD 445 and fourth CCD 450 detect the intensity distributions of the second hologram different from each other, respectively. First CCD 435, second CCD 440, third CCD 445 and fourth CCD 450 are disposed to have a positional relation shown in FIG. 8. First CCD 435 detects the intensity distribution of the second hologram produced by the horizontally polarized light component of diffracted light 240 of the first hologram and the horizontally polarized light component of second reference light 230 which pass through first polarization beam splitter 425. Second CCD 440 detects the intensity distribution of the second hologram produced by the horizontally polarized light component of diffracted light 240 of the first hologram and the horizontally polarized light component of second reference light 230 which pass through second polarization beam splitter 430. Third CCD 445 detects the intensity distribution of the second hologram produced by the vertically polarized light component of diffracted light 240 of the first hologram and the vertically polarized light component of second reference light 230 which are reflected from first polarization beam splitter 425. Fourth CCD 450 detects the intensity distribution of the second hologram produced by the vertically polarized light component of diffracted light 240 of the first hologram and the vertically polarized light component of second reference light 230 which are reflected from second polarization beam splitter 430.

A reason for being able to simultaneously produce the second holograms using the configuration shown in FIG. 8 will be described with reference to FIG. 8.

As shown in FIG. 8, half-wave plate 405 rotates by 45 degrees the polarization angle of diffracted light 240 (spatial quadrature amplitude modulation signal light) of the first hologram produced by first reference light 220. Therefore, diffracted light 240 of the first hologram passing through half-wave plate 405 has one half each of the horizontally polarized light components (shown by the in-plane direction in the drawing and the arrows in the drawing) and the vertically polarized light components (shown by the vertical direction in the drawing and the double circles in the drawing) of which the phases are the same as each other at a position A in the drawing.

On the other hand, $\lambda/4$ wavelength plate 415 converts the polarization state of second reference light 230 into the circularly polarized light. Therefore, second reference light 230 passing through $\lambda/4$ wavelength plate 415 becomes the circularly polarized light at position B in the drawing (shown by a circle in the drawing). As mentioned above, the circularly polarized light means to be in the polarization state where the phase difference between the horizontally polarized light component and the vertically polarized light component is $\pi/2$.

Diffracted light 240 of the first hologram of 45-degree linearly polarized light and second reference light 230 of the circularly polarized light which are obtained in this way are incident on beam splitter 420. As described in Embodiment 2, the second hologram when the phase of second reference light 230 is $\alpha=0$ and the second hologram when the phase of second reference light 230 is $\alpha=\pi$ can be simultaneously produced by beam splitter 420. Therefore, the second hologram of which the phase is shifted by $\pi$ is produced in the light wave traveling in the direction of C in the drawing and the light wave traveling in the direction of D in the drawing.

First, a description will be made of two beams of light, that is, diffracted light 240 of the first hologram and second reference light 230, which are incident on beam splitter 420, and then travel in the direction (direction of C in the drawing) of first polarization beam splitter 425 from beam splitter 420.

As shown in FIG. 8, diffracted light Aexp (iφ) of the first hologram is incident on beam splitter 420 from the left side in the drawing. The amplitude transmittance of beam splitter 420 to the light from this direction (direction toward the right side from the left side in the drawing) is set to t (component toward second CCD 440 and fourth CCD 450), and the amplitude reflectance thereof is set to r (component toward first CCD 435 and third CCD 445). In addition, second reference light $R_0$ is incident on beam splitter 405 from the lower side in the drawing. The amplitude transmittance of beam splitter 420 to the light from this direction (direction toward the upper side from the lower side in the drawing) is set to t' (component toward first CCD 435 and third CCD 445), and the amplitude reflectance thereof is set to r' (component toward second CCD 440 and fourth CCD 450).

First, the horizontally polarized light component of diffracted light 240 of the first hologram and the horizontally polarized light component of second reference light 230 of the circularly polarized light go straight to (pass through) first polarization beam splitter 425. When equation 25 and equation 26 are used on the basis of the same consideration as equation 27, the following equation is established.

$$I_{CCD1}(x, y) = |rA\exp(i\phi) + t'R_0|^2 \quad \text{[Equation 32]}$$
$$= |r|^2 A^2 + |t'|^2 R_0^2 + 2AR_0|rt^*|\cos(\phi + \gamma)$$

The second hologram when the phase of second reference light 230 is α=0 is produced on first CCD 435.

Simultaneously, the vertically polarized light component of diffracted light 240 of the first hologram and the vertically polarized light component of second reference light 230 of the circularly polarized light are reflected from first polarization beam splitter 425, and travel to third CCD 445 side. At this time, since the second reference light 230 of the circularly polarized light has a phase difference of π/2 between the horizontally polarized light component and the vertically polarized light component, a hologram occurring on third CCD 445 is expressed as follows:

$$I_{CCD3}(x, y) = \left|rA\exp(i\phi) + t'R_0\exp\left(i\frac{\pi}{2}\right)\right|^2 \quad \text{[Equation 33]}$$
$$= |r|^2 A^2 + |t'|^2 R_0^2 + 2AR_0|rt^*|\cos\left(\phi + \gamma - \frac{\pi}{2}\right)$$

The second hologram when the phase of second reference light 230 is α=π/2 is produced.

Next, a description will be made of two beams of light, that is, diffracted light 240 of the first hologram and second reference light 230, which are incident on beam splitter 420, and then travel in the direction (direction of D in the drawing) of second polarization beam splitter 430 from beam splitter 420.

First, the horizontally polarized light component of diffracted light 240 of the first hologram and the horizontally polarized light component of second reference light 230 of the circularly polarized light go straight to (pass through) second polarization beam splitter 430. The following expression is established on the basis of the same consideration as equation 29.

$$I_{CCD2}(x, y) = |tA\exp(i\phi) + r'R_0|^2 \quad \text{[Equation 34]}$$
$$= |t|^2 A^2 + |r'|^2 R_0^2 - 2AR_0|rt^*|\cos(\phi + \gamma)$$
$$= |t|^2 A^2 + |r'|^2 R_0^2 + 2AR_0|rt^*|\cos(\phi + \gamma - \pi)$$

The second hologram when the phase of second reference light 230 is α=π is produced on second CCD 440.

Simultaneously, the vertically polarized light component of diffracted light 240 of the first hologram and the vertically polarized light component of second reference light 230 of the circularly polarized light are reflected from second polarization beam splitter 430, and travel to fourth CCD 450 side. At this time, since second reference light 230 of the circularly polarized light has a phase difference of π/2 between the horizontally polarized light component and the vertically polarized light component, a hologram occurring on fourth CCD 450 is expressed as follows:

$$I_{CCD4}(x, y) = \left|tA\exp(i\phi) + r'R_0\exp\left(i\frac{\pi}{2}\right)\right|^2 \quad \text{[Equation 35]}$$
$$= |t|^2 A^2 + |r'|^2 R_0^2 - 2AR_0|rt^*|\cos\left(\phi - \frac{\pi}{2}\right)$$
$$= |t|^2 A^2 + |r'|^2 R_0^2 + 2AR_0|rt^*|\cos\left(\phi - \frac{3\pi}{2}\right)$$

The second hologram when the phase of second reference light 230 is α=3π/2 is produced.

When diffracted light 240 (spatial quadrature amplitude modulation signal light) of the first hologram and second reference light 230 are introduced on the basis of such an operation principle, the second hologram equal to that in a case where the phase of second reference light 230 is changed to α=0, π/2, π, and 3π/2 without adjusting the optical path length is simultaneously produced on first CCD 435, second CCD 440, third CCD 445 and fourth CCD 450. A procedure of demodulating a signal through electronic processing from four second holograms simultaneously obtained in this manner is the same as the second method described in Embodiment 1 (see equation 18 to equation 22).

In addition, when the second hologram having a larger number than M=4 is produced in order to improve the demodulation accuracy of a signal, variable phase shifter 410 may preferably be used. First, the phase difference of variable phase shifter 410 is set to 0, and four second holograms equivalent to those in a case where the phase of second reference light 230 is changed to α=0, π/2, π, and 3π/2 are produced. Thereafter, the phase difference of π/4 is given to second reference light 230 by variable phase shifter 410, so that four second holograms equivalent to those in a case where the phase of second reference light 230 is changed to α=π/4, 3π/4, 5π/4, and 7π/4 are produced. The spatial quadrature amplitude modulation signal can be precisely demodulated using equation 18 to equation 22 from a total of eight second holograms produced in this manner.

Embodiment 4

In the optical system of Embodiment 3, four CCDs are required in order to detect four second holograms at a time. In Embodiment 4, a description will be made of a holographic memory recording and reproduction apparatus that detects four second holograms at a time using two CCDs.

In the holographic memory recording and reproduction apparatus of Embodiment 4, each component except for the hologram production section and the detection section is the same as that of the holographic memory recording and reproduction apparatus of Embodiment 1. Consequently, only the hologram production section and detection section will be described.

Figure 9:
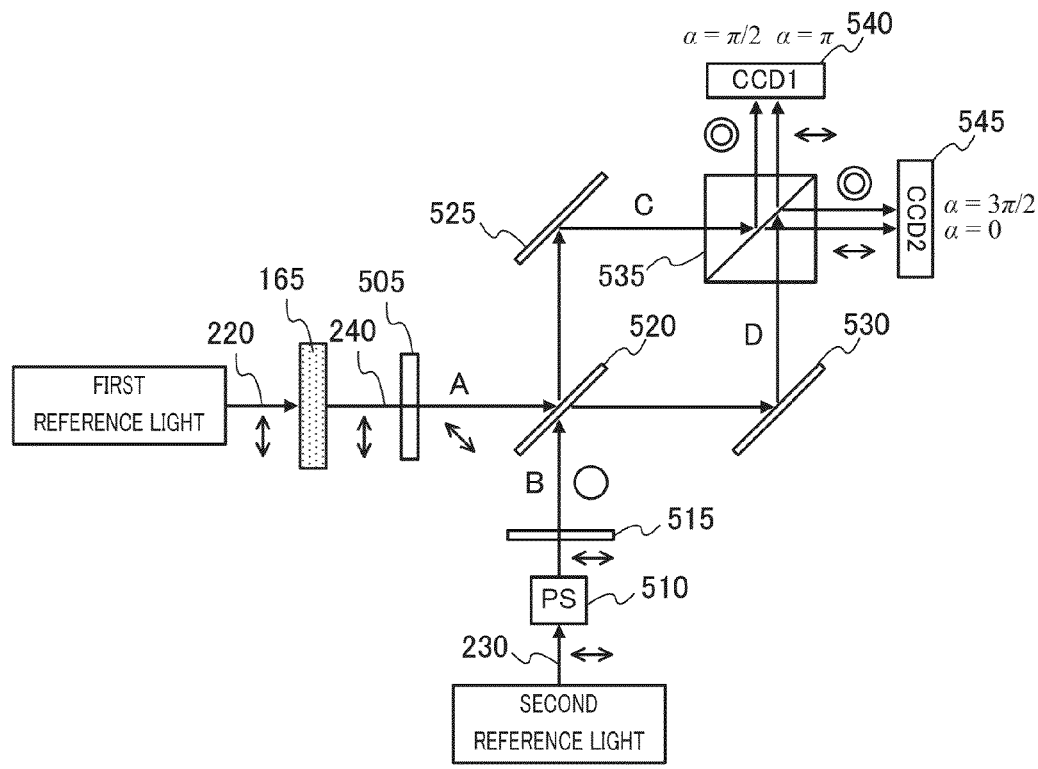
FIG. 9 is a schematic diagram illustrating a configuration of a hologram production section and a detection section of a holographic memory recording and reproduction apparatus according to Embodiment 4.

FIG. 9 is a schematic diagram illustrating a configuration of the hologram production section and the detection section of the holographic memory recording and reproduction apparatus according to Embodiment 4.

As shown in FIG. 9, the hologram production section and the detection section include half-wave plate 505, variable phase shifter 510, λ/4 wavelength plate 515, beam splitter 520, first mirror 525, second mirror 530, polarization beam splitter 535, first CCD 540, and second CCD 545. Half-wave plate 505, variable phase shifter 510, λ/4 wavelength plate 515, beam splitter 520, first mirror 525, second mirror 530 and polarization beam splitter 535 function as a "hologram production section". In addition, first CCD 540 and second CCD 545 function as a "detection section". In FIG. 9, first reference light 220 and second reference light 230 are laser light of linearly polarized light (horizontally polarized light; in-plane direction in the drawing) arising from the same laser light source.

Half-wave plate 505, variable phase shifter 510 and λ/4 wavelength plate 515 are the same as those of Embodiment 3.

Beam splitter 520 is a beam splitter which does not have polarization dependency. Diffracted light 240 of the first hologram of which the polarization angle is changed by half-wave plate 505 is incident on a first surface of beam splitter 520. A portion of incident diffracted light 240 of the first hologram is reflected and directed to first mirror 525. The remainder thereof is transmitted and directed to second mirror 530. In addition, second reference light 230 of which the polarization state is changed by λ/4 wavelength plate 515 is incident on a second surface of beam splitter 520. A portion of incident second reference light 230 is transmitted and directed to first mirror 525. The remainder thereof is reflected and directed to second mirror 530.

First mirror 525 is a mirror for causing diffracted light 240 of the first hologram reflected from beam splitter 520 and second reference light 230 passing through beam splitter 520 to be incident on a first surface of polarization beam splitter 535.

Second mirror 530 is a mirror for causing diffracted light 240 of the first hologram passing through beam splitter 520 and second reference light 230 reflected from beam splitter 520 to be incident on a second surface of polarization beam splitter 535.

Polarization beam splitter 535 is a beam splitter which has polarization dependency. That is, polarization beam splitter 535 transmits horizontally polarized light, and reflects vertically polarized light. Polarization beam splitter 535 is disposed to have a positional relation shown in FIG. 9.

As shown in FIG. 9, diffracted light 240 of the first hologram reflected from beam splitter 520 and second reference light 230 passing through beam splitter 520 are incident on the first surface of polarization beam splitter 535. The vertically polarized light component of diffracted light 240 of the first hologram and the vertically polarized light component of second reference light 230 are reflected from polarization beam splitter 535 and are directed to first CCD 540. On the other hand, the horizontally polarized light component of diffracted light 240 of the first hologram and the horizontally polarized light component of second reference light 230 pass through polarization beam splitter 535 and are directed to second CCD 545.

Diffracted light 240 of the first hologram passing through beam splitter 520 and second reference light 230 reflected from beam splitter 520 are incident on the second surface of polarization beam splitter 535. The horizontally polarized light component of diffracted light 240 of the first hologram and the horizontally polarized light component of second reference light 230 pass through polarization beam splitter 535 and are directed to first CCD 540. On the other hand, the vertically polarized light component of diffracted light 240 of the first hologram and the vertically polarized light component of second reference light 230 are reflected from polarization beam splitter 535 and are directed to second CCD 545.

The light from first mirror 525 side is incident on the first surface of polarization beam splitter 535, and the light from second mirror 530 side is incident on the second surface thereof. That is, the light is simultaneously incident on the surface and the rear surface of polarization beam splitter 535. At this time, first mirror 525 and second mirror 530 are disposed so that the optical axis of the light from first mirror 525 side and the optical axis of the light from second mirror 530 side are shifted (see FIG. 9).

First CCD 540 and second CCD 545 are disposed to have a positional relation shown in FIG. 9. First CCD 540 and second CCD 545 produce two second holograms, respectively. That is, first CCD 540 detects the intensity distribution of the second hologram produced by the light (the vertically polarized light component of diffracted light 240 of the first hologram and the vertically polarized light component of second reference light 230) reflected from the first surface of polarization beam splitter 535, and the intensity distribution of the second hologram produced by the light (the horizontally polarized light component of diffracted light 240 of the first hologram and the horizontally polarized light component of second reference light 230) passing through the second surface of polarization beam splitter 535. On the other hand, second CCD 545 detects the intensity distribution of the second hologram produced by the light (the horizontally polarized light component of diffracted light 240 of the first hologram and the horizontally polarized light component of second reference light 230) passing through the first surface of polarization beam splitter 535, and the intensity distribution of the second hologram produced by the light (the vertically polarized light component of diffracted light 240 of the first hologram and the vertically polarized light component of second reference light 230) reflected by the second surface of polarization beam splitter 535.

A reason to be able to simultaneously producing the second hologram using the configuration shown in FIG. 9 will be described with reference to FIG. 9.

As shown in FIG. 9, half-wave plate 505 rotates by 45 degrees the polarization angle of diffracted light 240 (spatial quadrature amplitude modulation signal light) of the first hologram produced by first reference light 220. Therefore, diffracted light 240 of the first hologram passing through half-wave plate 505 has one half each of the horizontally polarized light components (shown by the in-plane direction in the drawing and the arrows in the drawing) and the vertically polarized light components (shown by the vertical direction in the drawing and the double circles in the drawing) of which the phases are the same as each other at position A in the drawing.

On the other hand, λ/4 wavelength plate 515 converts the polarization state of second reference light 230 into the circularly polarized light. Therefore, second reference light 230 passing through λ/4 wavelength plate 515 becomes the circularly polarized light at position B in the drawing (shown by a circle in the drawing).

Diffracted light 240 of the first hologram of 45-degree linearly polarized light and second reference light 230 of the circularly polarized light which are obtained in this way are incident on beam splitter 520. As described in Embodiment 2, the second hologram when the phase of second reference light 230 is α=0 and the second hologram when the phase of second reference light 230 is α=π can be simultaneously produced by beam splitter 520. Therefore, the second hologram of which the phase is shifted by π is produced in the light wave traveling in the direction of C in the drawing and the light wave traveling in the direction of D in the drawing.

After diffracted light 240 of the first hologram and second reference light 230 are incident on beam splitter 520, the two beams of light traveling in the direction (direction of C in the drawing) of first mirror 525 from beam splitter 520 is incident on polarization beam splitter 535 from the left side in the drawing. On the other hand, the two beams of light traveling in the direction (direction of D in the drawing) of second mirror 530 from beam splitter 520 is incident on polarization beam splitter 535 from the lower side in the drawing. That is, the light traveling in the direction of C in the drawing and the light traveling in the direction of D in the drawing are incident on the same polarization beam splitter 535 from different directions.

In this case, a position at which the light incident from first mirror 525 side is incident on polarization beam splitter 535 and a position at which the light incident from second mirror 530 side is incident on polarization beam splitter 535 are slightly shifted. In this manner, the second hologram when the phase of the second reference light is α=π/2 is produced in the left half-plane of first CCD 540, and simultaneously with this, the second hologram when the phase of the second reference light is α=π is produced in the right half-plane of first CCD 540. In addition, the second hologram when the phase of the second reference light is α=0 is produced in the lower half-plane of second CCD 545, and simultaneously with this, the second hologram when the phase of the second reference light is α=3π/2 is produced in the upper half-plane of second CCD 545.

In the holographic memory recording and reproduction apparatus of the present embodiment, an imaging region of one CCD is used by division into two parts. At present, since imaging devices having tens of millions of pixels are easily available, this point has no restriction on technique. On the contrary, since the number of imaging devices such as a CCD is small, there is a large advantage of being able to construct an inexpensive system.

Figure 10:
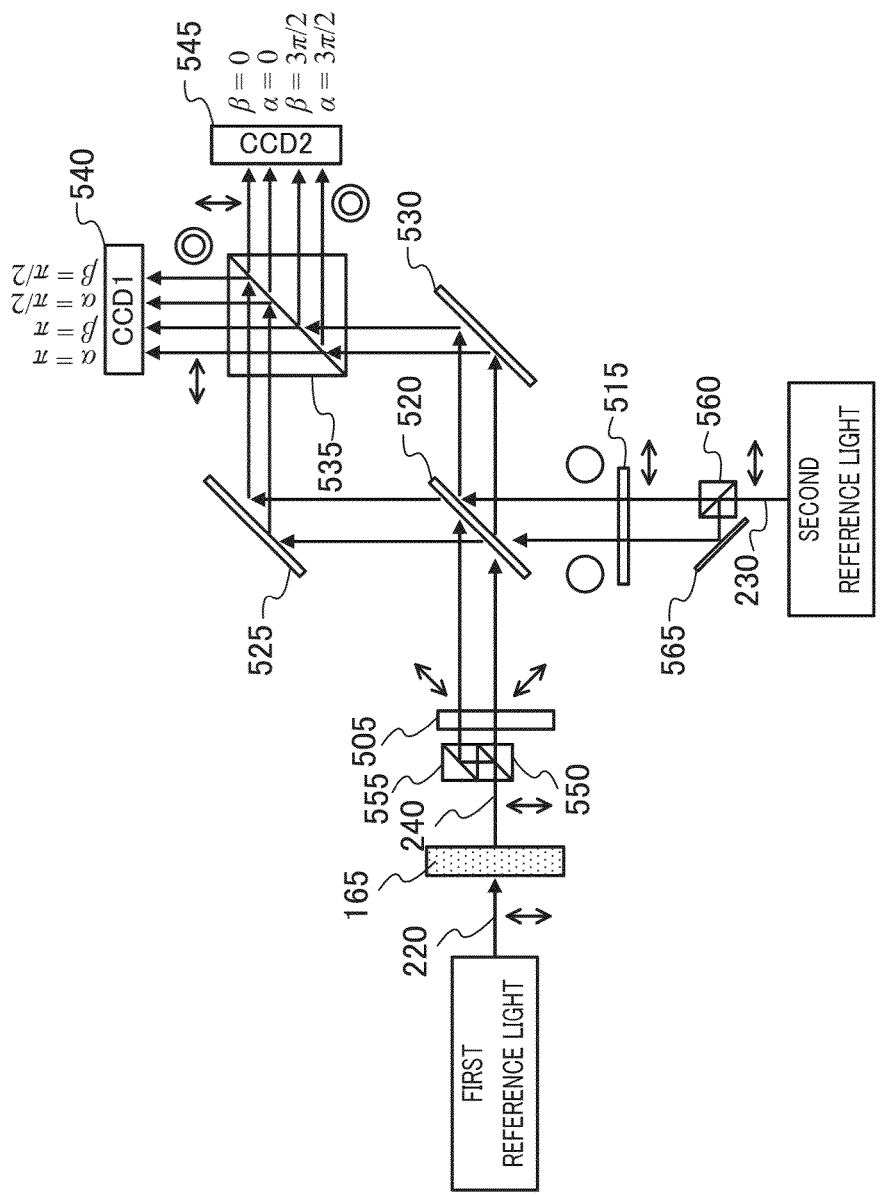
FIG. 10 is a schematic diagram illustrating another configuration of the hologram production section and the detection section of the holographic memory recording and reproduction apparatus according to Embodiment 4.

FIG. 10 is a schematic diagram illustrating another configuration of the hologram production section and detection section. The configuration shown in FIG. 10 is different from the configuration shown in FIG. 9, in that a set of polarization beam splitters (second polarization beam splitter 550 and third polarization beam splitter 555) are disposed before half-wave plate 505, and that second beam splitter 560 and third mirror 565 are disposed before λ/4 wavelength plate 515. In the manner, it is possible to simultaneously produce both the second hologram for the vertically polarized light component (α component) of diffracted light 240 (spatial quadrature amplitude modulation signal light) of the first hologram and the second hologram for the horizontally polarized light component (β component) thereof.

As shown in FIG. 10, diffracted light 240 (spatial quadrature amplitude modulation signal light) of the first hologram produced by first reference light 220 is divided into two parts using a set of polarization beam splitters (second polarization beam splitter 550 and third polarization beam splitter 555). In addition, second reference light 230 is divided into two parts using second beam splitter 560 and third mirror 565. Thereby, eight second holograms including four second holograms for the vertically polarized light component (α component) of diffracted light 240 (spatial quadrature amplitude modulation signal light) of the first hologram and four second holograms for the horizontally polarized light component (β component) thereof can be simultaneously produced on each different region of the detection planes of first CCD 540 and second CCD 545.

When the hologram recorded in holographic memory 165 is a polarization-type hologram in which both the vertically polarized light component and the horizontally polarized light component are produced, particularly, when the hologram is a polarization-type hologram in which separate values (amplitude and phase) are recorded in each of the vertically polarized light component and the horizontally polarized light component, the hologram production section and the detection section shown in FIG. 10 can simultaneously demodulate the vertically polarized light component and the horizontally polarized light component of diffracted light 240 of the first hologram. In addition, when the hologram production section and the detection section shown in FIG. 10 are used as an observation apparatus, this observation apparatus can simultaneously observe the vertically polarized light component and the horizontally polarized light component which are generated from a sample having a birefringent property of a crystal or the like.

Embodiment 5

In the optical system of Embodiment 4, two CCDs are required in order to detect four second holograms at a time. In Embodiment 5, a description will be made of a holographic memory recording and reproduction apparatus that detects four second holograms at a time using one CCD.

In the holographic memory recording and reproduction apparatus of Embodiment 5, each component except for the hologram production section and the detection section is the same as that of the holographic memory recording and reproduction apparatus of Embodiment 1. Consequently, only the hologram production section and detection section will be described.

Figure 11:
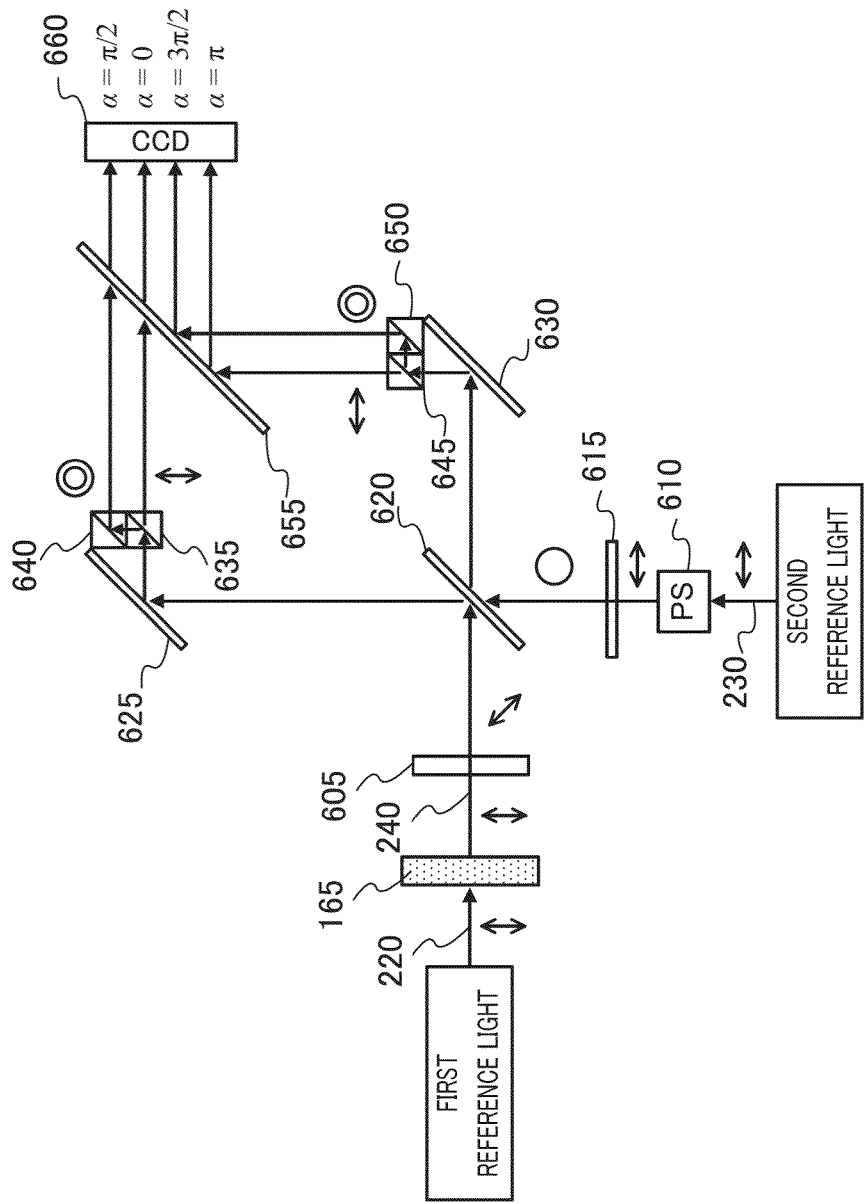
FIG. 11 is a schematic diagram illustrating a configuration of a hologram production section and a detection section of a holographic memory recording and reproduction apparatus according to Embodiment 5.

FIG. 11 is a schematic diagram illustrating a configuration of a hologram production section and a detection section of a holographic memory recording and reproduction apparatus according to Embodiment 5.

As shown in FIG. 11, the hologram production section and detection section includes half-wave plate 605, variable phase shifter 610, λ/4 wavelength plate 615, first beam splitter 620, first mirror 625, second mirror 630, first polarization beam splitter 635, second polarization beam splitter 640, third polarization beam splitter 645, fourth polarization beam splitter 650, second beam splitter 655, and CCD 660. Half-wave plate 605, variable phase shifter 610, λ/4 wavelength plate 615, first beam splitter 620, first mirror 625, second mirror 630, first polarization beam splitter 635, second polarization beam splitter 640, third polarization beam splitter 645, fourth polarization beam splitter 650 and second beam splitter 655 function as a "hologram production section". In addition, CCD 660 functions as a "detection section". In FIG. 11, first reference light 220 and second reference light 230 are laser light of linearly polarized light (horizontally polarized light; in-plane direction in the drawing) arising from the same laser light source.

Half-wave plate 605, variable phase shifter 610, λ/4 wavelength plate 615, first beam splitter 620, first mirror 625 and second mirror 630 are the same as those of Embodiment 4.

First polarization beam splitter 635, second polarization beam splitter 640, third polarization beam splitter 645 and fourth polarization beam splitter 650 are beam splitters having polarization dependency. That is, first polarization beam splitter 635, second polarization beam splitter 640, third polarization beam splitter 645 and fourth polarization beam splitter 650 transmit horizontally polarized light, and reflect vertically polarized light. As shown in FIG. 11, first polarization beam splitter 635 and second polarization beam splitter 640 are disposed by a combination with each other. Similarly, third polarization beam splitter 645 and fourth polarization beam splitter 650 are also disposed by a combination with each other.

As shown in FIG. 11, diffracted light 240 of the first hologram reflected from first beam splitter 620 and second reference light 230 passing through first beam splitter 620 are incident on first polarization beam splitter 635. The vertically polarized light component of diffracted light 240 of the first hologram and the vertically polarized light component of second reference light 230 are reflected from first polarization beam splitter 635 and are directed to second polarization beam splitter 640. On the other hand, the horizontally polarized light component of diffracted light 240 of the first hologram and the horizontally polarized light component of second reference light 230 pass through first polarization beam splitter 635 and are directed to second beam splitter 655.

The vertically polarized light component of diffracted light 240 of the first hologram and the vertically polarized light component of second reference light 230 which are reflected from first polarization beam splitter 635 are incident on second polarization beam splitter 640. The incident vertically polarized light component of diffracted light 240 of the first hologram and the incident vertically polarized light component of second reference light 230 are reflected from second polarization beam splitter 640 and are directed to second beam splitter 655.

Diffracted light 240 of the first hologram passing through first beam splitter 620 and second reference light 230 reflected from first beam splitter 620 are incident on third polarization beam splitter 645. The vertically polarized light component of diffracted light 240 of the first hologram and the vertically polarized light component of second reference light 230 are reflected from third polarization beam splitter 645 and are directed to fourth polarization beam splitter 650. On the other hand, the horizontally polarized light component of diffracted light 240 of the first hologram and the horizontally polarized light component of second reference light 230 pass through third polarization beam splitter 645 and are directed to second beam splitter 655.

The vertically polarized light component of diffracted light 240 of the first hologram and the vertically polarized light component of second reference light 230 which are reflected by third polarization beam splitter 645 are incident on fourth polarization beam splitter 650. The incident vertically polarized light component of diffracted light 240 of the first hologram and the incident vertically polarized light component of second reference light 230 are reflected from fourth polarization beam splitter 640 and are directed to second beam splitter 655.

Meanwhile, a trapezoidal polarizing prism may be used instead of a combination of first polarization beam splitter 635 and second polarization beam splitter 640. Similarly, a trapezoidal polarizing prism may be used instead of a combination of third polarization beam splitter 645 and fourth polarization beam splitter 650.

Second beam splitter 655 is a beam splitter which does not have polarization dependency. The horizontally polarized light component of diffracted light 240 of the first hologram and the horizontally polarized light component of second reference light 230 which pass through first polarization beam splitter 635, and the horizontally polarized light component of diffracted light 240 of the first hologram and the vertically polarized light component of second reference light 230 which are reflected from second polarization beam splitter 640 are incident on a first surface of second beam splitter 655. First polarization beam splitter 635 and second polarization beam splitter 640 are disposed so that the optical axes of the horizontally polarized light component and the vertically polarized light component are shifted with each other (see FIG. 11). The horizontally polarized light component and the vertically polarized light component pass through second beam splitter 655 and are directed to CCD 660.

The horizontally polarized light component of diffracted light 240 of the first hologram and the horizontally polarized light component of second reference light 230 which pass through third polarization beam splitter 645, and the vertically polarized light component of diffracted light 240 of the first hologram and the vertically polarized light component of second reference light 230 which are reflected from fourth polarization beam splitter 650 are incident on a second surface of second beam splitter 655. Third polarization beam splitter 645 and fourth polarization beam splitter 650 are disposed so that the optical axes of the horizontally polarized light component and the vertically polarized light component are shifted with each other (see FIG. 11). The horizontally polarized light component and the vertically polarized light component are reflected from second beam splitter 655 and are directed to CCD 660.

The light from first polarization beam splitter 635 and second polarization beam splitter 640 side is incident on the first surface of second beam splitter 655, and the light from third polarization beam splitter 645 and fourth polarization beam splitter 650 side is incident on the second surface thereof. That is, the light is simultaneously incident on the surface and the rear surface of second beam splitter 655. At this time, first polarization beam splitter 635, second polarization beam splitter 640, third polarization beam splitter 645 and fourth polarization beam splitter 650 are disposed so that the optical axis of the light from first polarization beam splitter 635, the optical axis of the light from second polarization beam splitter 640, the optical axis of the light from third polarization beam splitter 645, and the optical axis of the light from fourth polarization beam splitter 650 are shifted with each other (see FIG. 11).

CCD 660 detects the intensity distributions of four second holograms. That is, CCD 660 detects the intensity distribution of the second hologram produced by the light (the horizontally polarized light component of diffracted light 240 of the first hologram and the horizontally polarized light component of second reference light 230) passing through first polarization beam splitter 635, the intensity distribution of the second hologram produced by the light (the vertically polarized light component of diffracted light 240 of the first hologram and the vertically polarized light component of second reference light 230) reflected from second polarization beam splitter 640, the intensity distribution of the second hologram produced by the light (the horizontally polarized light component of diffracted light 240 of the first hologram and the horizontally polarized light component of second reference light 230) passing through third polarization beam splitter 645, and the intensity distribution of the second hologram produced by the light (the vertically polarized light component of diffracted light 240 of the first hologram and the vertically polarized light component of second reference light 230) reflected from fourth polarization beam splitter 650.

The hologram production section and the detection section having the configuration shown in FIG. 11 can simultaneously produce four second holograms on the basis of the same reason as that of the hologram production section and the detection section having the configuration shown in FIG. 9. Meanwhile, in the example shown in FIG. 11, two polarization beam splitters are disposed in a horizontal direction with respect to the plane of paper, but two polarization beam splitters may be disposed in a vertical direction with respect to the plane of paper. In this manner, four second hologram can be disposed in two columns by two rows on the detection plane of one CCD.

Figure 12:
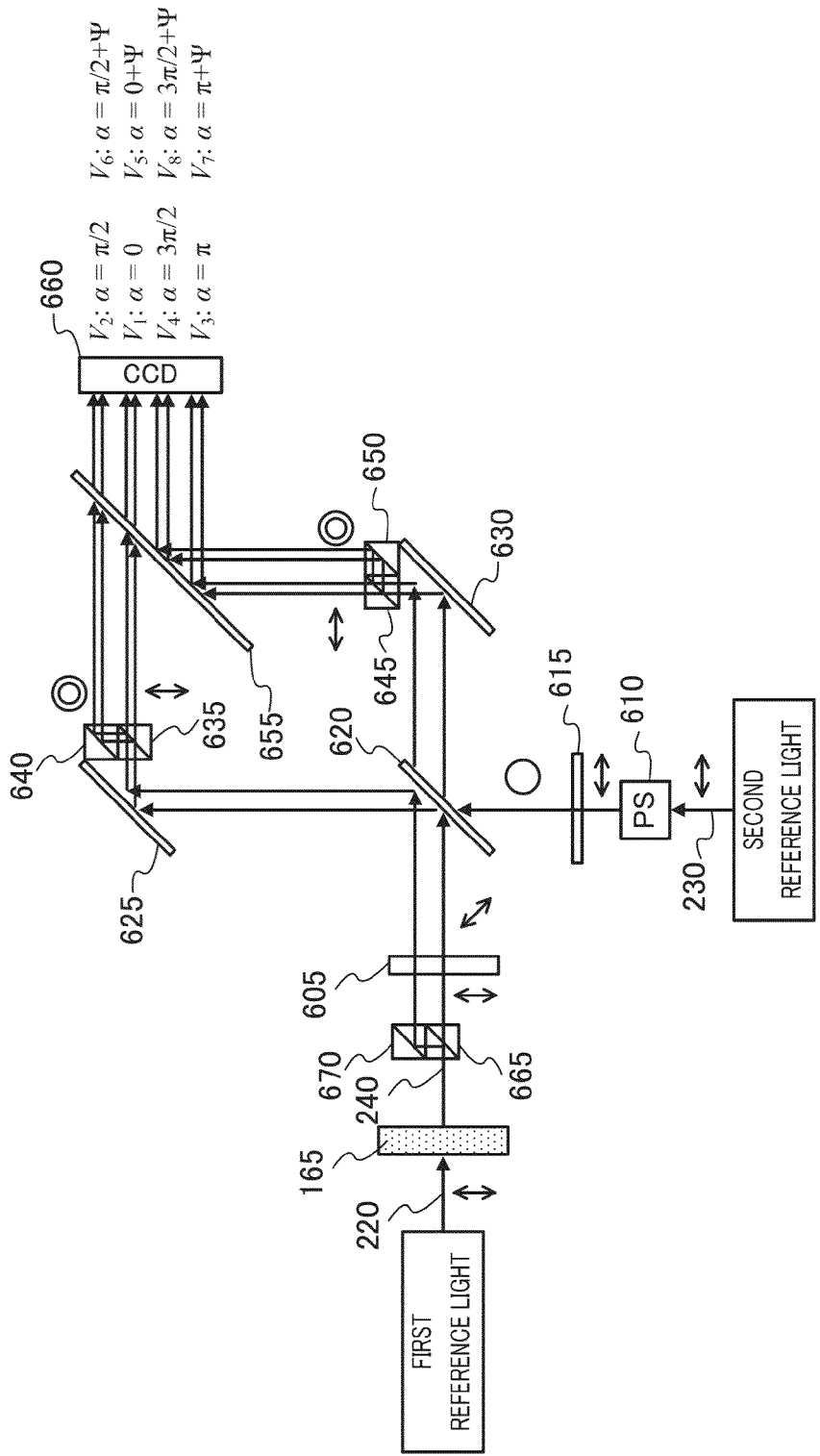
FIG. 12 is a schematic diagram illustrating another configuration of the hologram production section and the detection section of the holographic memory recording and reproduction apparatus according to Embodiment 5.

FIG. 12 is a schematic diagram illustrating another configuration of the hologram production section and the detection section. The configuration shown in FIG. 12 is different from the configuration shown in FIG. 11, in that a set of beam splitters (third beam splitter 665 and fourth beam splitter 670) are disposed before half-wave plate 605.

As shown in FIG. 12, diffracted light 240 (spatial quadrature amplitude modulation signal light) of the first hologram produced by first reference light 220 is divided into two parts using a set of beam splitters (third beam splitter 665 and fourth beam splitter 670). Thereby, eight second holograms can be simultaneously produced on each different region of the detection plane of one CCD.

When the intensity distributions of eight second holograms are set to $V_1, V_2, \ldots, V_8$, respectively, the phase of diffracted light 240 (spatial quadrature amplitude modulation signal light) of the first hologram is set to $\phi(x, y)$, and the phase difference due to a set of beam splitters (third beam splitter 665 and fourth beam splitter 670) is set to $\Psi(x, y)$, from the following equations:

$$\phi(x, y) = \tan^{-1} \frac{V_2(x, y) - V_4(x, y)}{V_1(x, y) - V_3(x, y)} \quad \text{[Equation 36]}$$

and $$\phi(x, y) + \Psi(x, y) = \tan^{-1} \frac{V_6(x, y) - V_8(x, y)}{V_5(x, y) - V_7(x, y)} \quad \text{[Equation 37]}$$

the following equation is obtained.

$$\Psi(x, y) = \tan^{-1} \frac{V_6(x, y) - V_8(x, y)}{V_5(x, y) - V_7(x, y)} - \tan^{-1} \frac{V_2(x, y) - V_4(x, y)}{V_1(x, y) - V_3(x, y)} \quad \text{[Equation 38]}$$

By using the value of $\Psi$, it is possible to observe eight different interference intensities of $\alpha_1=0$, $\alpha_2=\Psi$, $\alpha_3=\pi/2$, $\alpha_4=/2+\Psi$, $\alpha_5=\pi$, $\alpha_6=\pi+\Psi$, $\alpha_7=3/2\pi$, and $\alpha_8=3/2\pi+\Psi$.

In this case, phase $\phi(x, y)$ of diffracted light 240 (spatial quadrature amplitude modulation signal light) of the first hologram is calculated by the following equation:

$$\phi(x, y) = \tan^{-1} \frac{\sum V_n(x, y) \sin\alpha_n}{\sum V_n(x, y) \cos\alpha_n} \quad \text{[Equation 39]}$$

In this manner, diffracted light 240 (spatial quadrature amplitude modulation signal light) of the first hologram is branched into two parts, thereby allowing the number of second holograms capable of being detected at a time to be increased. When the number of branches of diffracted light 240 of the first hologram is further increased, it is also possible to further increase the number of second holograms capable of being detected at a time. For example, when diffracted light 240 of the first hologram is branched into three parts, the intensity distributions of twelve second holograms can be measured at a time.

Figure 13:
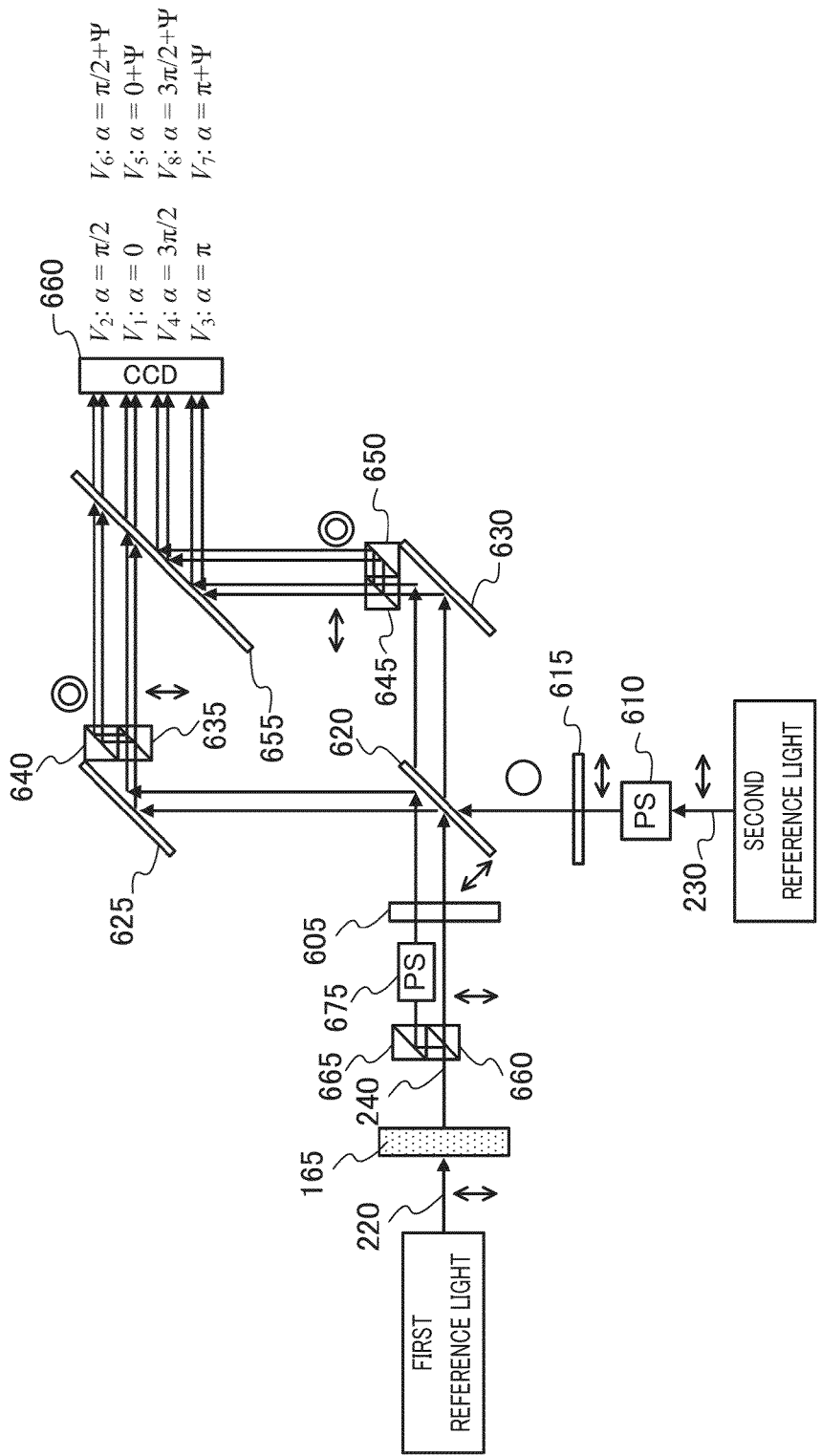
FIG. 13 is a schematic diagram illustrating still another configuration of the hologram production section and the detection section of the holographic memory recording and reproduction apparatus according to Embodiment 5.

In addition, as shown in FIG. 13, the above-mentioned phase difference $\Psi$ can also be previously set to a specific value by phase shifter 675. For example, when the relation of $\Psi_1=\pi/4$ is set, it is possible to observe eight different interference intensities at $\alpha_1=0$, $\alpha_2=\pi/4$, $\alpha_3=\pi/2$, $\alpha_4=3\pi/4$, $\alpha_5=\pi$, $\alpha_6=5\pi/4$, $\alpha_7=3/2\pi$, and $\alpha_8=7\pi/4$.

Embodiment 6

In the optical system of each embodiment mentioned above, it is necessary to provide four imaging regions ($\alpha=0$, $\alpha=\pi/4$, $\alpha=\pi/2$, and $\alpha=3\pi/4$). In Embodiment 6, a description will be made of a holographic memory recording and reproduction apparatus capable of demodulating a spatial quadrature amplitude modulation signal using only two imaging regions ($\alpha=0$ and $\alpha=\pi/2$).

In the holographic memory recording and reproduction apparatus of Embodiment 6, each component except for the hologram production section and the detection section is the same as that of the holographic memory recording and reproduction apparatus of Embodiment 1. Consequently, only the hologram production section and detection section will be described.

Figure 14:
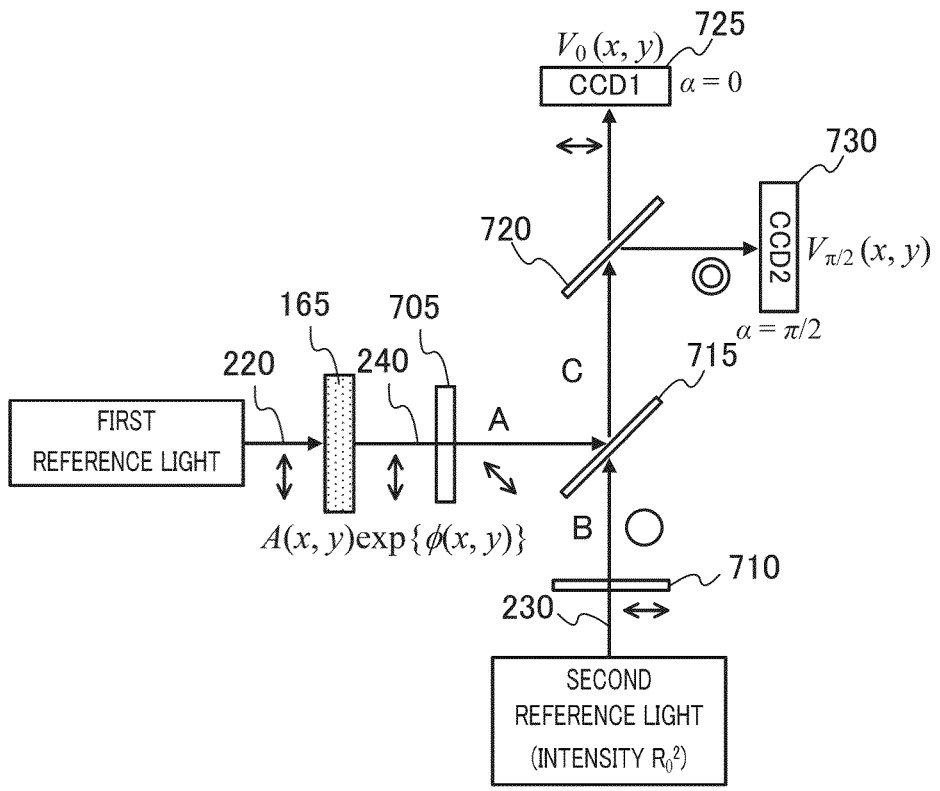
FIG. 14 is a schematic diagram illustrating a configuration of a hologram production section and a detection section of a holographic memory recording and reproduction apparatus according to Embodiment 6.

FIG. 14 is a schematic diagram illustrating a configuration of a hologram production section and a detection section of a holographic memory recording and reproduction apparatus according to Embodiment 6.

As shown in FIG. 14, a hologram production section and a detection section include half-wave plate 705, $\lambda/4$ wavelength plate 710, beam splitter 715, polarization beam splitter 720, first CCD 725 and second CCD 730. Half-wave plate 705, $\lambda/4$ wavelength plate 710, beam splitter 715 and polarization beam splitter 725 function as a "hologram production section". In addition, first CCD 725 and second CCD 730 function as a "detection section". In FIG. 14, first reference light 220 and second reference light 230 are laser light of linearly polarized light (horizontally polarized light; in-plane direction in the drawing) arising from the same laser light source. In addition, intensity $R_0^2$ of second reference light 230 is assumed to be a known value.

The optical system shown in FIG. 14 is the same configuration as that obtained by removing constituent members (second polarization beam splitter 430, second CCD 440 and fourth CCD 450) associated with a ray of light D from the optical system of Embodiment 3 shown in FIG. 8. As described in Embodiment 3, the second hologram when the phase of second reference light 230 is $\alpha=0$ is produced on first CCD 725, and the second hologram when the phase of the second reference light 230 is $\alpha=\pi/2$ is produced on second CCD 730. Meanwhile, in optical system shown in FIG. 14, beam splitter 715 may be removed, and diffracted light 240 of the first hologram of which the polarization angle is changed by half-wave plate 705 may be caused to be directly incident on polarization beam splitter 720. In this case, the diffracted light 240 of the first hologram of which the polarization angle is changed by half-wave plate 705 is incident on a first surface of polarization beam splitter 720, and second reference light 230 of which the polarization state is changed by λ/4 wavelength plate 710 is incident on a second surface of polarization beam splitter 720.

Here, in the above-mentioned equation 9 as follows:

$$I_m(x,y) = \eta^2 A^2 + R_0^2 + I_N + \beta A_N + 2\eta A R_0 \cos(\phi - m\Delta\Psi) \quad \text{[Equation 9]}$$

noise components $I_N$ and $A_N$ are assumed to be sufficiently small, the following equation is established.

$$I_m(x,y) = \eta^2 A^2 + R_0^2 + 2\eta A R_0 \cos(\phi - m\Delta\psi) \quad \text{[Equation 40]}$$

The relation of $\eta = q = 1$ is set the purpose of the simplification of calculation, and the measured values of the light intensity distributions measured by first CCD 725 and second CCD 730 are set to $V_0(x, y)$ and $V_{\pi/2}(x, y)$, respectively. At this time, the following equations are established.

$$V_0(x,y) = A^2(x,y) + R_0^2 + 2A(x,y)R_0 \cos\{\phi(x,y)\} \quad \text{[Equation 41]}$$

and $$V_{\pi/2}(x, y) = A^2(x, y) + R_0^2 + 2A(x, y)R_0\cos \quad \text{[Equation 42]}$$
$$\{\phi(x, y) - \pi/2\}$$
$$= A^2(x, y) + R_0^2 + 2A(x, y)R_0\sin\{\phi(x, y)\}$$

Here, when the following equation is set $$I_0 = A^2 + R_0^2 \quad \text{[Equation 43]}$$

from equation 41 and equation 42, the following equations are established.

$$A\cos\phi = \frac{V_0 - I_0}{2R_0} \quad \text{[Equation 44]}$$

and $$A\sin\phi = \frac{V_{\pi/2} - I_0}{2R_0} \quad \text{[Equation 45]}$$

When the formula of a trigonometric function $$\sin^2\phi + \cos^2\phi = 1 \quad \text{[Equation 46]}$$

is used, the following equation is obtained.

$$2I_0^2 - 2(V_0 + V_{\pi/2} + 2R_0^2)I_0 + V_0^2 + V_{\pi/2}^2 + 4R_0^4 = 0 \quad \text{[Equation 47]}$$

Solving equation 47 for $I_0$, and finding solutions satisfying equation 43 to equation 45, the following equation is established at each point of (x, y).

$$I_0 = \frac{V_0 + V_{\pi/2} + 2R_0^2 - \sqrt{(V_0 + V_{\pi/2} + 2R_0^2)^2 - 2(V_0^2 + V_{\pi/2}^2 + 4R_0^4)}}{2} \quad \text{[Equation 48]}$$

By substituting this result into equation 44 and equation 45, light complex amplitude $A(x, y)\exp\{\phi(x, y)\}$ can be obtained from the following equation 49.

$$A(x, y)\exp\{i\phi(x, y)\} = A(x, y)\cos\phi(x, y) + \quad \text{[Equation 49]}$$
$$iA(x, y)\sin\phi(x, y)$$

$$= \frac{V_0(x, y) - I_0(x, y)}{2R_0} +$$
$$i\frac{V_{\pi/2}(x, y) - I_0(x, y)}{2R_0}$$

As stated above, when the noise of the detection system is small, light complex amplitude $A(x, y)\exp\{\phi(x, y)\}$ can be measured through single measurement by the simple optical system shown in FIG. 14.

Figure 15:
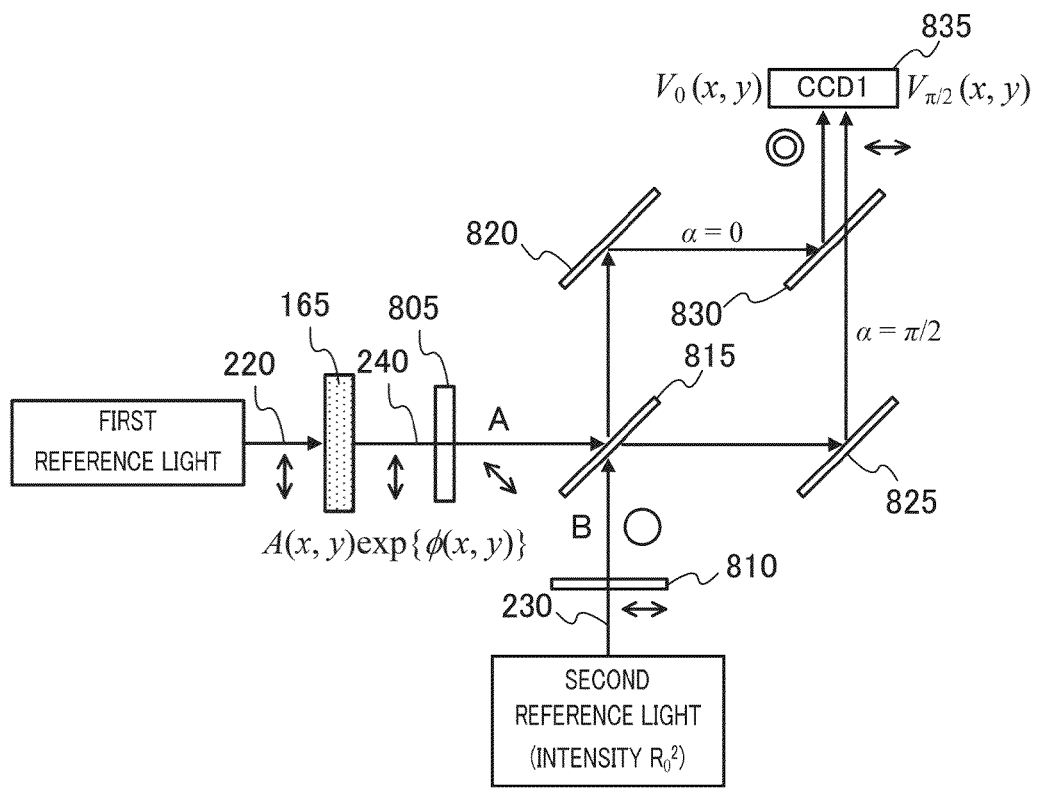
FIG. 15 is a schematic diagram illustrating another configuration of the hologram production section and the detection section of the holographic memory recording and reproduction apparatus according to Embodiment 6.

FIG. 15 is a schematic diagram illustrating another configuration of the hologram production section and the detection section. The configuration shown in FIG. 15 is different from the configuration shown in FIG. 14, in that two imaging regions are formed on one CCD 835.

As shown in FIG. 15, the hologram production section and the detection section include half-wave plate 805, λ/4 wavelength plate 810, polarization beam splitter 815, first mirror 820, second mirror 825, beam splitter 830 and CCD 835. Light complex amplitude $A(x, y)\exp\{\phi(x, y)\}$ can also be measured through single measurement by a simple optical system shown in FIG. 15.

Effects of Embodiment 3 to 6

In the measurement of a spatial phase of signal light (including the measurement of a light complex amplitude and the measurement of a spatial quadrature amplitude modulation signal), a phase is required to be converted into an intensity by causing signal light and another light to interfere with each other. In order to precisely measure the phase of an object to be observed, a phase shift interferometric method of using interference light having a different phase is known.

The phase shift interferometric method is classified broadly into a sequential scheme and a parallel phase shift scheme. In the sequential scheme, the phase of interference light is changed by the variable phase shifter and multiple times of measurement are performed (Ichirou Yamaguchi and Tong Zhang, "Phase-shifting digital holography", Opt. Lett., Vol. 22, pp. 1268-1270 (1997).). On the other hand, in the parallel phase shift scheme, single measurement is performed using signal light passing through a spatial phase array (Yasuhiro Awatsuji, Atsushi Fujii, Toshihiro Kubota, and Osamu Matoba, "Parallel three-step phase-shifting digital holography", Appl. Opt. Vol. 45, pp. 2995-3002 (2006).).

In sequential scheme, in order to perform multiple times of measurement, the phase difference is given to a signal of separate time and the phase is measured. For this reason, in the sequential scheme, there is a problem in that a large measurement error occurs with respect to the temporal fluctuation of an object to be observed (for example, motion of a microorganism which is an object to be observed, or the like). On the other hand, in the parallel phase shift scheme, three to four signals passing through a set of spatial phase arrays are signals occurring from a different position of the object to be observed. In the parallel phase shift scheme, an original signal is calculated on the basis of a set of signals passing through the spatial phase array. For this reason, in the parallel phase shift scheme, there is a problem in that when the spatial fluctuation in the phase value of the object to be observed is large (for example, when the shape of the object to be observed is complicated), a large measurement error occurs.

On the other hand, there are the following advantages in the systems of Embodiments 3 to 6. First, since multiple times of measurement required for the sequential scheme can be performed once, a temporal error does not occur, and the stability and rapidity of the system are maintained. In addition, since an original signal located at the same position can be observed using a plurality of CCDs without using a phase array required for the parallel phase shift scheme, a spatial error does not occur. For example, a signal received in pixels, located at the same position, of four CCDs of FIG. 8 is produced while the phase difference is given to a signal occurring from the same time and the same position by a half mirror (or beam splitter) and a polarization beam splitter (the same is true in FIG. 6 and FIGS. 9 to 15). That is, the measurement schemes of Embodiments 3 to 6 have no defect of either the sequential scheme or the parallel phase shift scheme, and have advantages of both the sequential scheme and the parallel phase shift scheme.

In addition, in the sequential scheme, since a piezoelectric device is used as the variable phase shifter, a complicated apparatus (optical system) is required in order to secure the accuracy and stability thereof. On the other hand, in the measurement schemes of Embodiments 3 to 6, precise phase adjustment using the variable phase shifter is not required. In addition, in the measurement schemes of Embodiments 3 to 6, a new high-accuracy device (for example, tiny spatial phase array or the like) required for the parallel phase shift scheme does not also need to be developed. That is, the measurement schemes of Embodiments 3 to 6 have a large advantage for industrialization, price reduction and prevalence capable of being realized using inexpensive polarizing elements and CCD cameras which are present from the past.

Meanwhile, the hologram production sections and the detection sections shown in FIG. 6 and FIGS. 8 to 15 can also be used as an observation apparatus that observes the two-dimensional distribution of the intensity and the phase in transmitted light or reflected light from an object to be observed (see Examples 5 and 6). In this case, an object to be observed (for example, biological sample) is placed instead of holographic memory 165. In addition, the second hologram is produced using the transmitted light or the reflected light (spatial quadrature amplitude modulation signal light) from the object to be observed instead of diffracted light 240 of the first hologram.

Meanwhile, in each of the above-mentioned embodiments, examples in which recording is performed using the two-beam interference method have been described, but the recording method of a hologram is not limited thereto. For example, recording may be performed using a collinear system (see examples).

Figure 16:
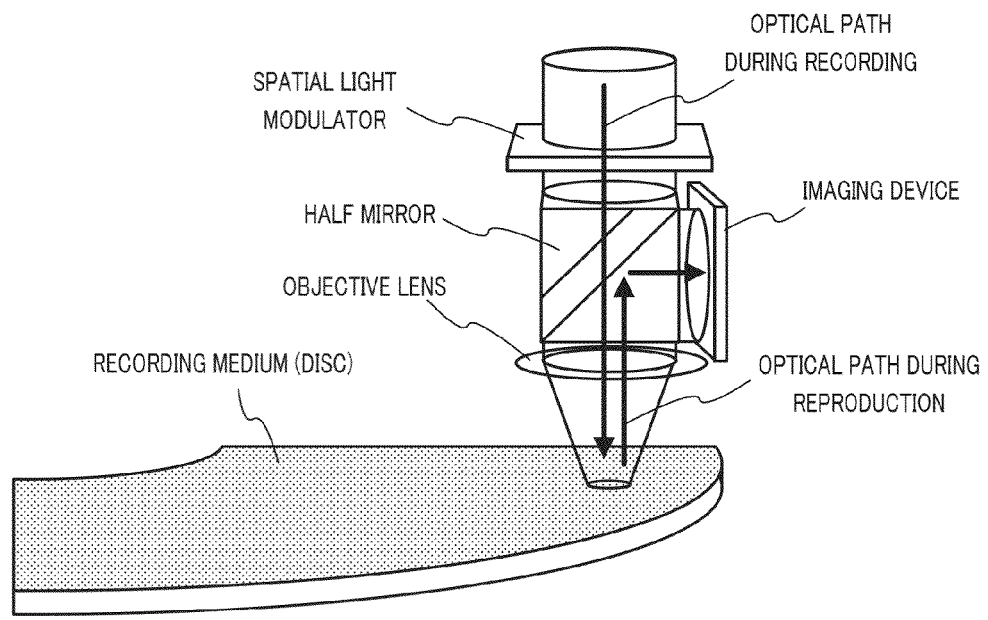
FIG. 16 is a schematic diagram illustrating a state in which recording and reproduction are performed using a collinear holography method.

As the recording method of a hologram, the two-beam interference method using light having a different angle in the signal light and the reference light is widely known. However, this method has a problem with consistency with an optical disk technique. A method in which this problem is solved, as shown in FIG. 16, includes a collinear holography method of using the central portion of the spatial light modulator (SLM) in the production of hologram signal light by disposing signal light and reference light on the same optical axis, and using the outer circumferential portion thereof in the production of a reference light pattern (Hideyoshi Horimai, Xiaodi Tan and Jun Li, "Collinear holography", Appl. Opt., Vol. 44, pp. 2575-2579 (2005)). Meanwhile, FIG. 16 shows an optical layout of a reflection-type hologram, but an optical layout of a transmission-type hologram may be used as shown in examples.

Figure 17A:
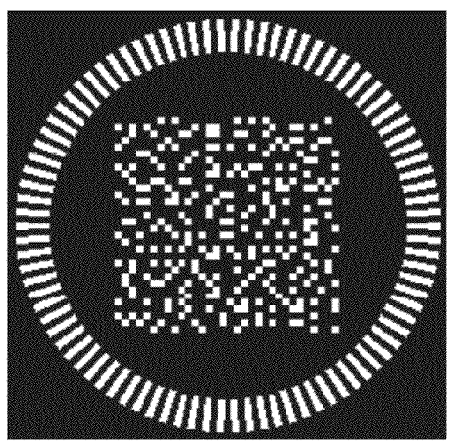
FIG. 17A is a diagram illustrating a pattern of a spatial light modulator when recording is performed using a collinear holography method.
Figure 17B:
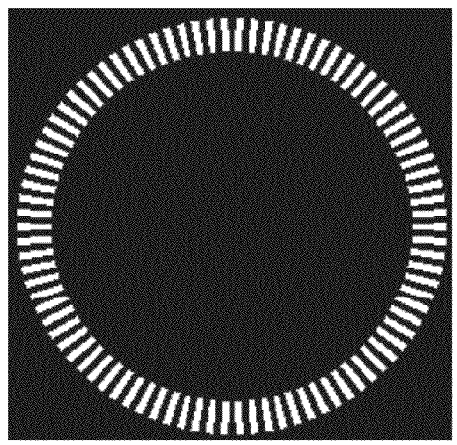
FIG. 17B is a diagram illustrating a pattern of the spatial light modulator when reproduction is performed using the collinear holography method.

FIG. 17 shows an example of a pattern of the spatial light modulator (SLM) when recording and reproduction are performed using the collinear holography method. Using a page data separated into the central portion and the outer circumferential portion at the time of recording, as shown in FIG. 17A, the central portion is used for forming the signal light, and the outer circumferential portion is used for forming the reference light. A recording medium (for example, optical disc) is convergently irradiated with the light (signal light) emitted from the central portion and the light (reference light) emitted from the outer circumferential portion using one objective lens, and the interference patterns of the both are recorded. At the time of reproduction, as shown in FIG. 17B, the recording medium is convergently irradiated with only the light (reference light) emitted from the outer circumferential portion, and recorded data is extracted from the recording medium as diffracted light. In the collinear holography method, a position of a light spot is shifted spatially slightly, thereby allowing multiplex recording to be performed (shift multiplexing).

Hereinafter, the present invention will be described in detail with reference to examples, but the present invention is not limited to these examples.

EXAMPLE

Example 1

Example 1 shows a result of a simulation in which an eight-valued spatial phase modulation signal (8-SPM) is recorded and reproduced using the holographic memory recording and reproduction apparatus of the present invention.

Figure 18:
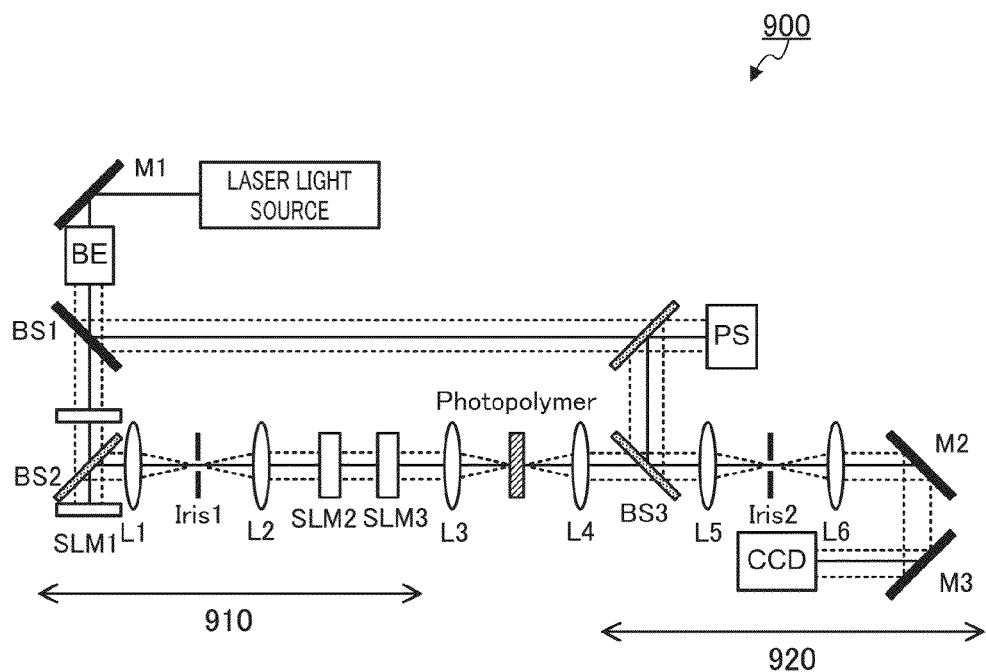
FIG. 18 is a schematic diagram illustrating a configuration of the holographic memory recording and reproduction apparatus according to the present invention used in a simulation in Examples 1 and 2.

FIG. 18 is a schematic diagram illustrating a configuration of the holographic memory recording and reproduction apparatus of the present invention which is used in a simulation. This holographic memory recording and reproduction apparatus records and reproduces a first hologram by the collinear holography method.

As shown in FIG. 18, holographic memory recording and reproduction apparatus 900 includes a laser light source (wavelength λ=532.0 nm), first mirror (M1), beam expander (BE), first beam splitter (BS1), second beam splitter (BS2), first spatial light modulator (SLM1), first lens (L1), first iris (Iris1), second lens (L2), second spatial light modulator (SLM2), third spatial light modulator (SLM3), third lens (L3), fourth lens (L4), a variable phase shifter (piezoelectric device), third beam splitter (BS3), fifth lens (L5), second iris (Iris2), sixth lens (L6), second mirror (M2), third mirror (M3) and a CCD camera. Holographic memory recording and reproduction apparatus 900 has a recording medium (Photopolymer) installed between third lens (L3) and fourth lens (L4), and performs recording and reproducing.

As shown in FIG. 18, light emitted from the laser light source is branched into two parts by first beam splitter (BS1). The light toward the lower direction of the drawing becomes signal light and first reference light for producing the first hologram. On the other hand, the light toward the right direction of the drawing becomes second reference light for producing a second hologram.

The light toward the lower direction of the drawing from first beam splitter (BS1) is incident on spatial quadrature amplitude modulation signal production section 910. In spatial quadrature amplitude modulation signal production section 910, the central portion (data page region in FIG. 17A) of a light beam is added with spatial phase modulation by phase modulation-type first spatial light modulator (SLM1), and is added with spatial amplitude modulation by intensity modulation-type second spatial light modulator (SLM2). In addition, in the collinear holography method, as shown in FIG. 17B, the outer circumferential portion of the light beam is used as reference light called a collinear ring pattern. Consequently, in spatial quadrature amplitude modulation signal production section 910, the intensity modulation-type third spatial light modulator (SLM3) produces the collinear ring pattern equivalent to the first reference light in the outer circumferential portion of the light beam.

Meanwhile, since second spatial light modulator (SLM2) uses only the central portion, and third spatial light modulator (SLM3) uses only the outer circumferential portion, these modulators may be replaced with one spatial light modulator by a combination thereof. In addition, the order of first spatial light modulator (SLM1), second spatial light modulator (SLM2) and third spatial light modulator (SLM3) may be arbitrarily changed. In addition, in FIG. 18, a reflection-type spatial light modulator is used as first spatial light modulator (SLM1), and a transmission-type spatial light modulator is used as second spatial light modulator (SLM2) and third spatial light modulator (SLM3). However, the reflection-type and transmission-type spatial light modulators may be used in any of the spatial light modulators of first spatial light modulator (SLM1), second spatial light modulator (SLM2) and third spatial light modulator (SLM3).

The spatial quadrature amplitude modulation signal and the first reference light produced in this manner becomes one beam, and the first hologram is recorded in the recording medium (photopolymer). In order to record a plurality of first holograms in the recording medium, the recording medium may preferably be moved (for example, a disc-shaped recording medium is rotated).

When the recorded data is reproduced, the central portion (data page region) of the light beam is blocked by second spatial light modulator (SLM2), and the collinear ring pattern equivalent to the first reference light is produced in the outer circumferential portion of the light beam by third spatial light modulator (SLM3). When the first hologram within the recording medium is irradiated with the first reference light produced in this manner, diffracted light of the first hologram occurs. As shown in FIG. 18, the diffracted light of the first hologram occurring from the recording medium is incident on hologram production section 920.

On the other hand, the light toward the right direction of the drawing from first beam splitter (BS1) becomes the second reference light for producing the second hologram. This light is added with a necessary phase difference by the variable phase shifter (for example, reflection-type piezoelectric device), and then is incident on hologram production section 720. In hologram production section 920, the diffracted light of the first hologram and the second reference light are mixed in third beam splitter (BS3), so that the second hologram is produced on the detection plane of the CCD camera.

Figure 19:
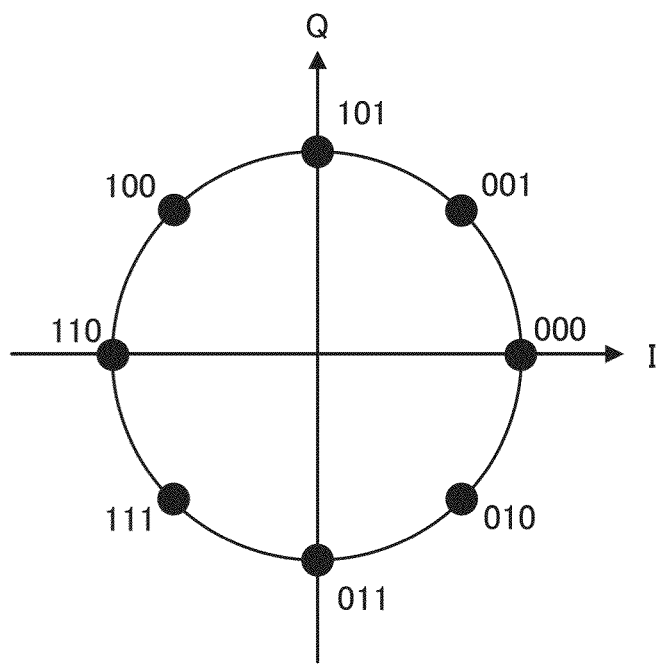
FIG. 19 is a diagram of an eight-valued spatial phase modulation signal (8-SPM) used in Example 1.

Here, the diagram of the eight-valued spatial phase modulation signal (8-SPM) is shown in FIG. 19. The horizontal axis of the drawing is referred to as a "real axis" or an "I-axis", and the vertical axis thereof is referred to as an "imaginary axis" or a "Q-axis". These axes correspond to variables I and Q of equation 1. Points plotted on the diagram are referred to as "signal points". A set of modulation codes is expressed by a plurality of signal points. In addition, the complex plane expressed by the diagram shows the amplitude and the phase of a signal with a central focus on a "0" point of both axes. The distance from the "0" point denotes an amplitude, and the angle for the "0" point denotes a phase. Therefore, a plurality of symbols which are located at equal distances from the center, but located at different angles with respect to the center are configured such that the amplitudes of signal waveforms are equal to each other, but the phases thereof are different from each other.

In the present example, a simulation was performed in which the eight-valued spatial phase modulation signal (8-SPM; see FIG. 19) were recorded and reproduced using the holographic memory recording and reproduction apparatus shown in FIG. 18. As a numerical analysis tool, a FFT-BPM (Fourier transform beam propagation method) was used (Junya Tanaka, Atsushi Okamoto and Motoki Kitano, "Development of Image-Based Stimulation for Holographic Data Storage System by Fast Fourier Transform Beam-Propagation Method", Japanese Journal of Applied Physics, Vol. 48, No. 3 (Issue 2), pp. 03A028 (1-5) (2009).). Parameters used in a numerical analysis are shown in Table 1.

TABLE 1

| | |
|---|---|
| Wavelength λ (nm) | 408 |
| Numerical aperture of lens NA | 0.65 |
| Focal length of lens f (mm) | 5.60 |
| Sampling number Nx × Ny × Nz | 256 × 256 × 100 |
| Step size Dx × Dy × Dz (μm³) | 0.22 × 0.22 × 1.00 |
| Thickness of recording medium L (μm) | 100 |
| Pixel number of signal light region of SLM $N_{sigx} \times N_{sigy}$ | 32 × 32 |
| Refractive index distribution of recording medium $n_0$ | 1.5 |
| Maximum refractive index modulation depth $n_{max}$ | 4.00E−03 |
| Recording light power $P_{in}$ (mW) | 1 |
| Exposure time t (s) | 0.1 |

Figure 20A:
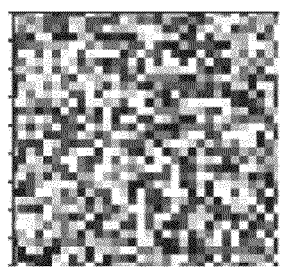
FIG. 20A is a diagram illustrating an original data page.
Figure 20A:
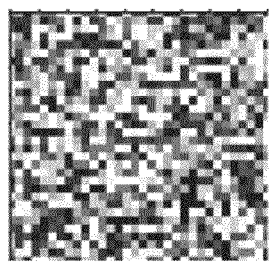
Figure 20A:
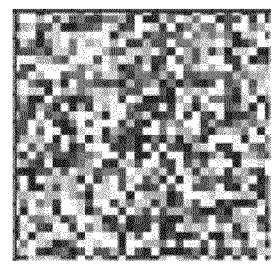

Three data pages (#1, #2, and #3) used in recording are shown in FIG. 20A. In FIG. 20A, each of the data pages has a size of 32×32 pixels. In addition, each of the pixels is modulated by eight different phase information pieces, but is depicted in grey scale for the purpose of visualization.

In the simulation in this time, assuming a photopolymer to be the recording medium, the three data pages (#1, #2, and #3) were multiply recorded at a shift pitch of 1.76 μm. The first hologram recorded was irradiated with the first reference light, and the diffracted light of the first hologram was generated. Four second holograms at α=0, π/2, π, and 3π/2 were produced by mixing the diffracted light of the first hologram with the second reference light.

Figure 21:
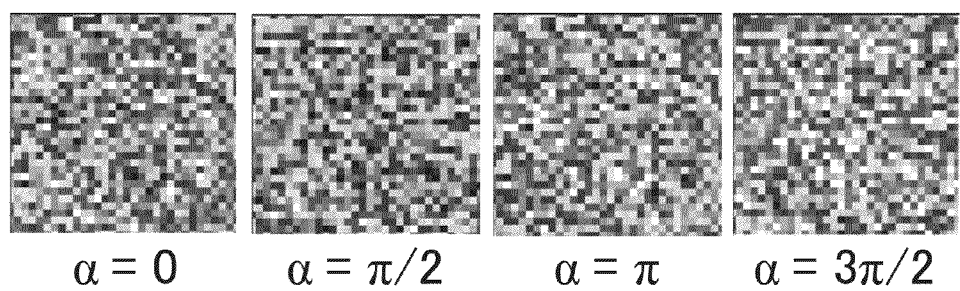
FIG. 21 is a diagram illustrating signal intensity distributions of a second hologram of data page #1.
Figure 22:
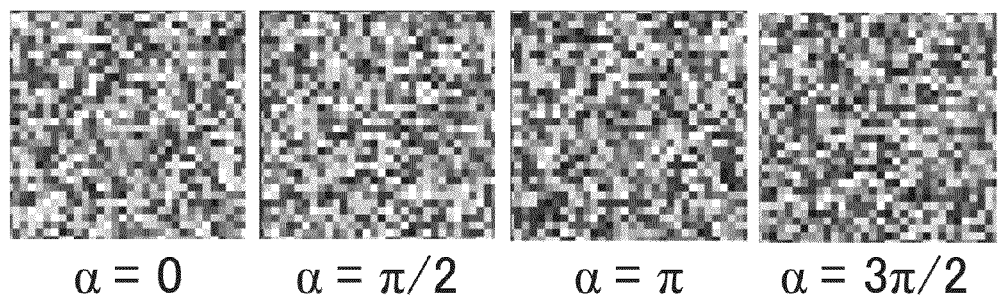
FIG. 22 is a diagram illustrating signal intensity distributions of a second hologram of data page #2.
Figure 23:
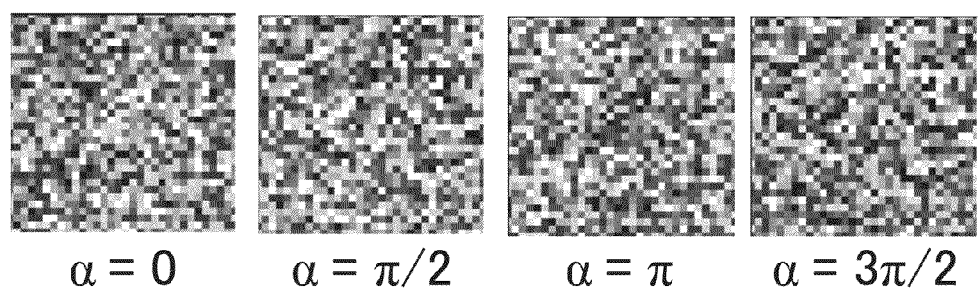
FIG. 23 is a diagram illustrating signal intensity distributions of a second hologram of data page #3.

Regarding each of the data pages (#1, #2, and #3), the signal intensity distributions obtained by photoelectrically converting four second holograms are shown in FIGS. 21 to 23. FIG. 21 is a signal intensity distribution of the second hologram of data page #1, FIG. 22 is a signal intensity distribution of the second hologram of data page #2, and FIG. 23 is a signal intensity distribution of the second hologram of data page #3.

Figure 20B:
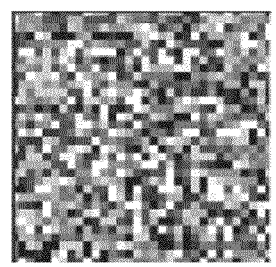
FIG. 20B is a diagram illustrating a data page after demodulation.
Figure 20B:
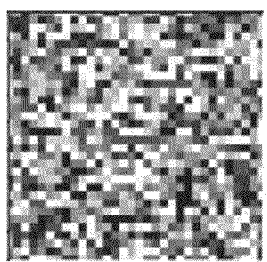
Figure 20B:
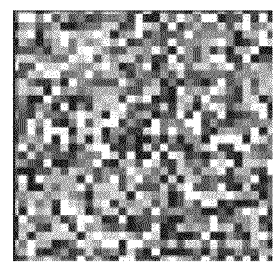
Figure 24:
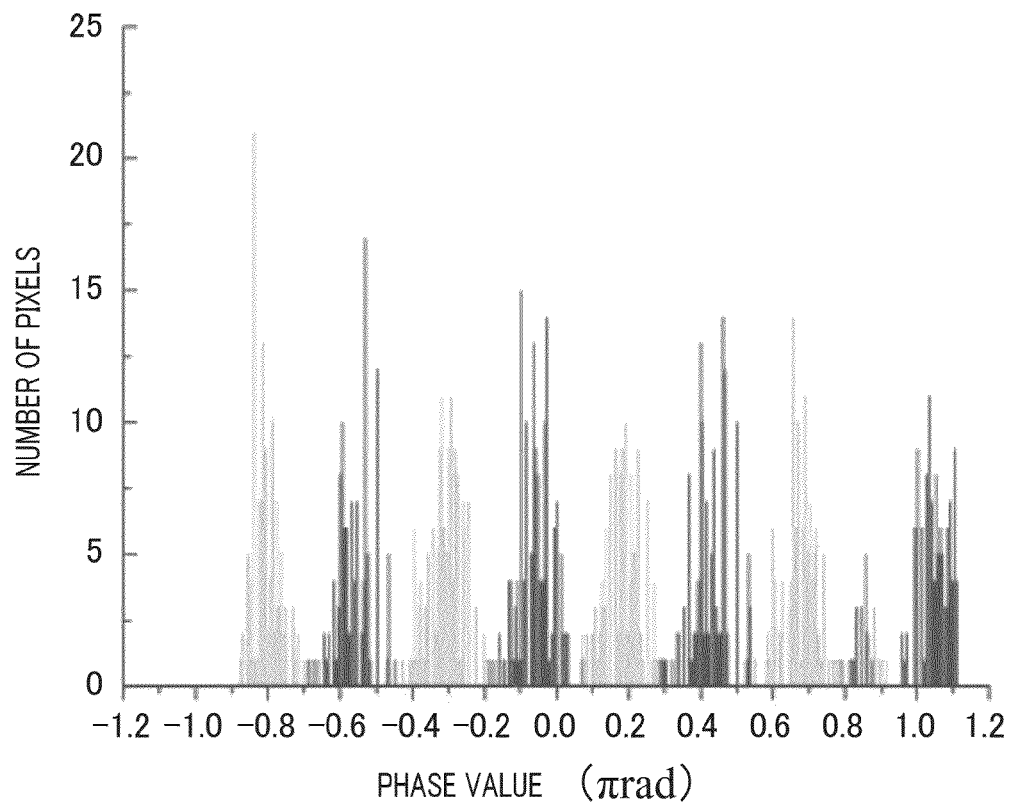
FIG. 24 is a histogram illustrating phase information having data page #1 after demodulation.

In addition, the data pages demodulated using equation 21 from the signal intensity distribution of the second hologram are shown in FIG. 20B. It is not likely to know the degree of coincidence of results even when comparing FIG. 20A (original data) with FIG. 20B (reproduced data). Therefore, regarding data page #1, a histogram representing what phase information the reproduced data has is shown in FIG. 24. From FIG. 24, it is known that the eight-valued spatial phase modulation signal is distinctly split. In the data of FIG. 24, considering that the symbol error rate when the detection accuracy of a light detector is set to 12 bits is $1.3 \times 10^{-2}$, and that an error correction capability in the current holographic memory, it may be said that there is sufficient performance in practical use.

Example 2

Example 2 shows a result of a simulation in which an eight-valued spatial quadrature amplitude modulation signal (8-SQAM) is recorded and reproduced using the holographic memory recording and reproduction apparatus of the present invention.

When more than approximately eight phase states are arranged only by lining up signal points on a circle, the signal waveforms thereof are similar to each other, and thus it is not preferable to pack the rest of many signal states only by the phase modulation. Consequently, a modulation scheme that gives a greater number of signal state by adding amplitude modulation to the phase modulation is spatial quadrature amplitude modulation (SQAM).

Figure 25:
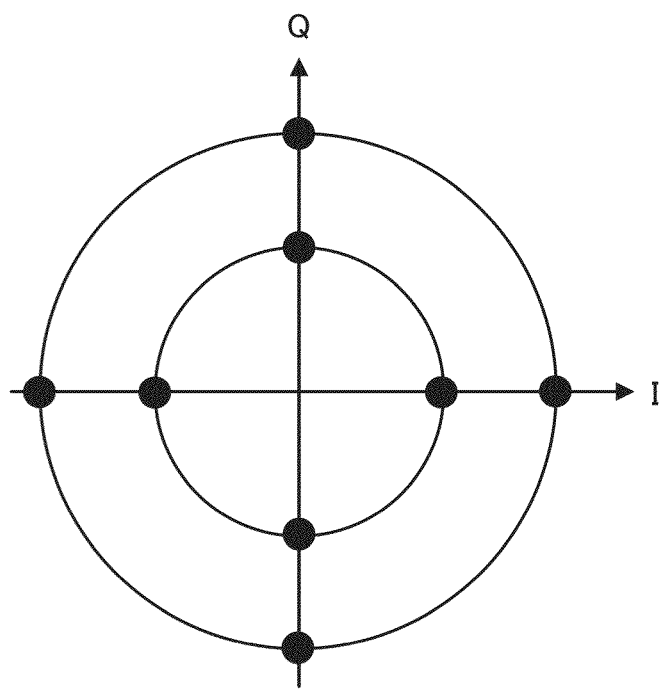
FIG. 25 is a diagram of an eight-valued spatial quadrature amplitude modulation signal (8-SQAM) used in Example 2.

A diagram of the eight-valued spatial quadrature amplitude modulation signal (8-SQAM) used in the present example is shown in FIG. 25. In each of the signal points, any of the values of a two-valued amplitude and a four-valued phase can be taken, and a total of eight values can be represented in one signal point.

In the present example, similarly to Example 1, a simulation was performed in which the eight-valued spatial quadrature amplitude modulation signal (8-SQAM) was recorded and reproduced using the holographic memory recording and reproduction apparatus shown in FIG. 18. As a numerical analysis tool, the same FFT-BPM (Fourier transform beam propagation method) as that in Example 1 was used. Parameters used in a numerical analysis are shown in Table 2.

TABLE 2

| | |
|---|---|
| Wavelength λ (nm) | 532.8 |
| Refractive index distribution of Recording medium $n_0$ | 1.5 |
| Maximum refractive index modulation depth $n_{max}$ | 4.00E−03 |
| Size of recording medium Wx × Wy × L (μm³) | 79.92 × 79.92 × 100 |
| Sampling number Nx × Ny × Nz | 256 × 256 × 100 |
| Step size Dx × Dy × Dz (μm³) | 0.31 × 0.31 × 1.00 |
| Oversampling rate $N_1$ | 4 |
| Zero padding rate $N_2$ | 1 |
| Incident light intensity ratio $I_{sig}/I_{ref}$ | 1 |
| Pixel number of SLM $N_{px} \times N_{py}$ | 64 × 64 |
| Pixel number of signal light region of SLM $N_{sigx} \times N_{sigy}$ | 8 × 8 |
| Pixel pitch of SLM 1 px × 1 py (μm²) | 40 × 40 |
| Focal length of lens f (mm) | 1.50 |
| Recording light power $P_{in}$ (mW) | 1 |
| Exposure time t (s) | 0.1 |
| Energy flow rate density $E_{sat}$ (J/cm²) | 0.307 |

Figure 26A:
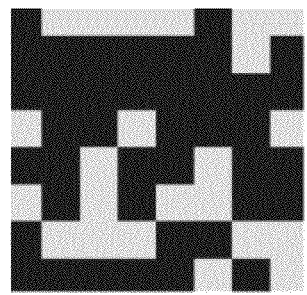
FIG. 26A is a diagram illustrating amplitude information of an original data page.
Figure 26B:
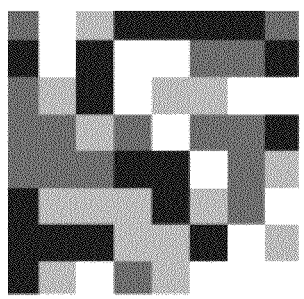
FIG. 26B is a diagram illustrating phase information of the original data page.

The data pages (spatial quadrature amplitude modulation signal) used in recording is shown in FIG. 26. As shown in FIG. 26, the data page has a size of 8×8 pixels. Each pixel of the data page has both values of amplitude information A(x, y) shown in FIG. 26A and phase information φ(x, y) shown in FIG. 26B. That is, one data page is represented by uniting amplitude information A(x, y) shown in FIG. 26A and phase information φ(x, y) shown in FIG. 26B. The amplitude ratio of the bright portion to the dark portion in FIG. 26A is 2:1, but the intensity ratio becomes 4:1. The actual recording light intensity of the bright portion is 1.37 mW, and that of the dark portion is 0.34 mW. Phase information shown in FIG. 26B is depicted in grey scale for the purpose of visualization. The four-valued phase is as follows: white color=π, light grey color=π/2, dark grey color=0, and black color=−π/2(3π/2).

In the simulation in this time, assuming a standard photopolymer to be the recording medium, recording was performed under the conditions shown in Table 2. A first hologram obtained in this manner was irradiated with first reference light to generate diffracted light of the first hologram. Four second holograms of α=0, π/2, π, and 3π/2 were produced by mixing the diffracted light of this first hologram with second reference light.

Figure 27:
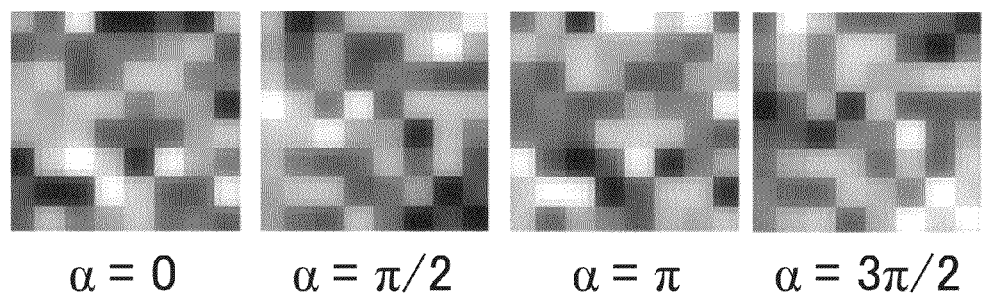
FIG. 27 is a diagram illustrating signal intensity distributions of the second hologram.

FIG. 27 is a signal intensity distribution obtained by photoelectrically converting four second holograms. In the detection using a CCD, one pixel (data pixel) within the data page was detected in a CCD pixel of 8×8. Therefore, the number of CCD pixels needed becomes 64×64 pixels. However, this is not an essential condition, but one pixel of the data page can also be detected in one CCD pixel.

Figure 28:
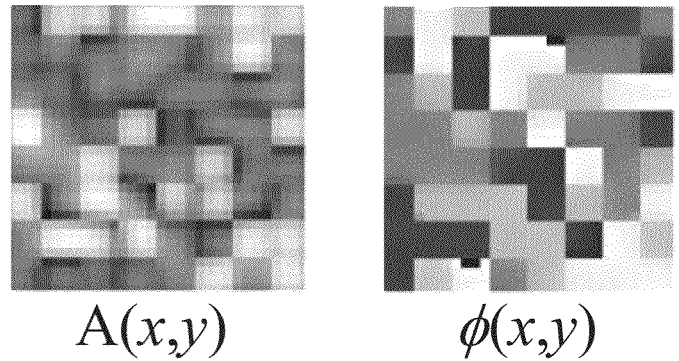
FIG. 28 is a diagram illustrating data restored in CCD pixel point units from the signal intensity distributions shown in FIG. 27.
Figure 29:
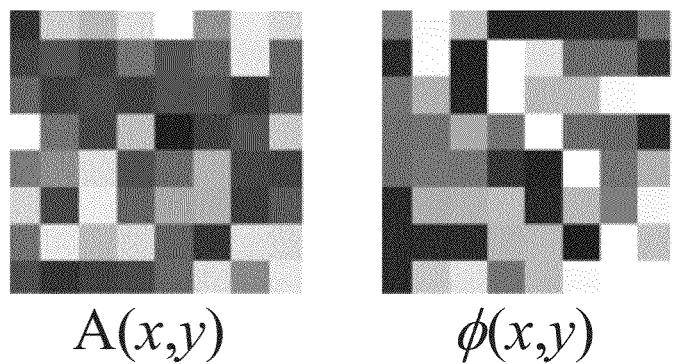
FIG. 29 is a diagram illustrating data obtained by performing averaging processing on the data shown in FIG. 28 within each data pixel.

In addition, FIG. 28 shows data restored at each CCD pixel point using equation 21 and equation 22 from the signal intensity distribution of the second hologram. Further, a result obtained by performing averaging processing on the data shown in FIG. 28 within each data pixel is shown in FIG. 29. The results obtained in the processes so far are analog data. Consequently, finally, FIG. 30 shows data demodulated into digital data of a two-valued amplitude and a four-valued phase by performing threshold processing on the data shown in FIG. 29.

Figure 30:
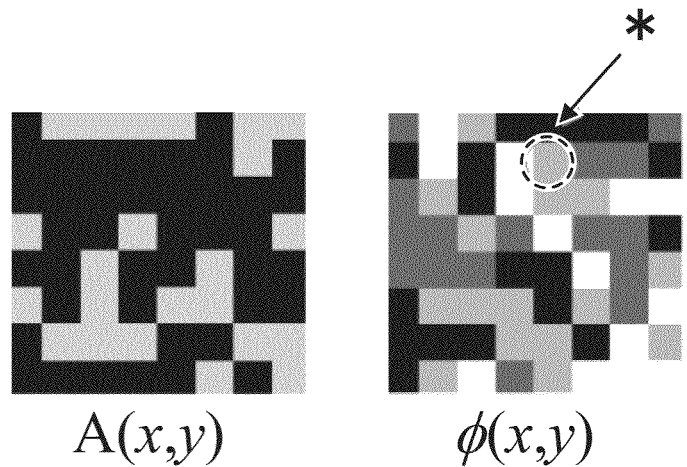
FIG. 30 is a diagram illustrating data obtained by performing threshold processing on the data shown in FIG. 29.

Comparing the original data shown in FIG. 26 with the demodulated data shown in FIG. 30, a data error in one place is generated on the phase plane (denoted by "*" in the drawing), but both the amplitude and the phase are completely demodulated in the other places, and satisfactory results are obtained.

Example 3

Example 3 shows a result in which a six-valued spatial quadrature amplitude modulation signal (6-SQAM) is actually recorded and reproduced using the holographic memory recording and reproduction apparatus (see Embodiment 1) of the present invention.

Figure 31:
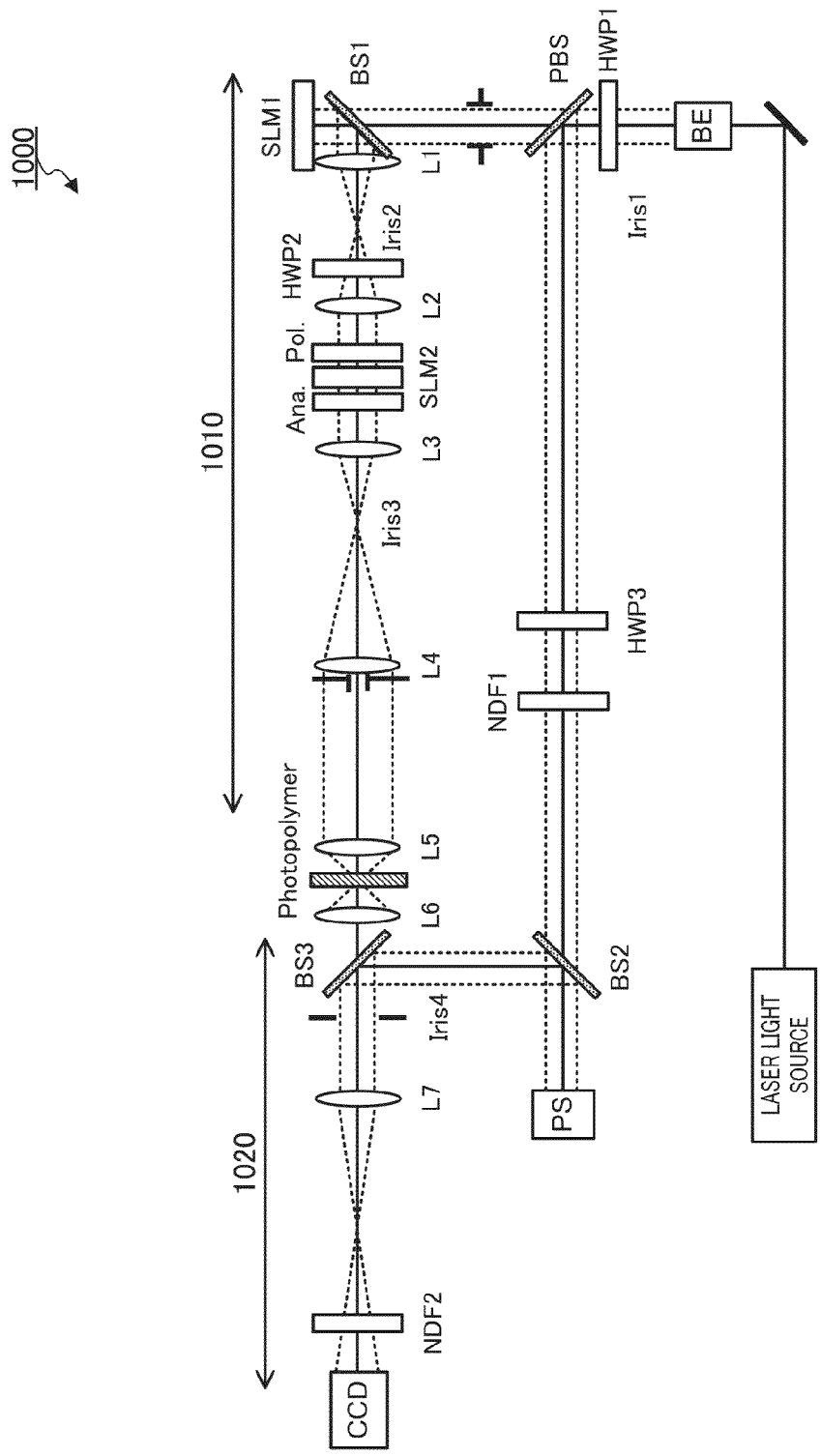
FIG. 31 is a schematic diagram illustrating a configuration of the holographic memory recording and reproduction apparatus according to the present invention used in Example 3.
Figure 32:
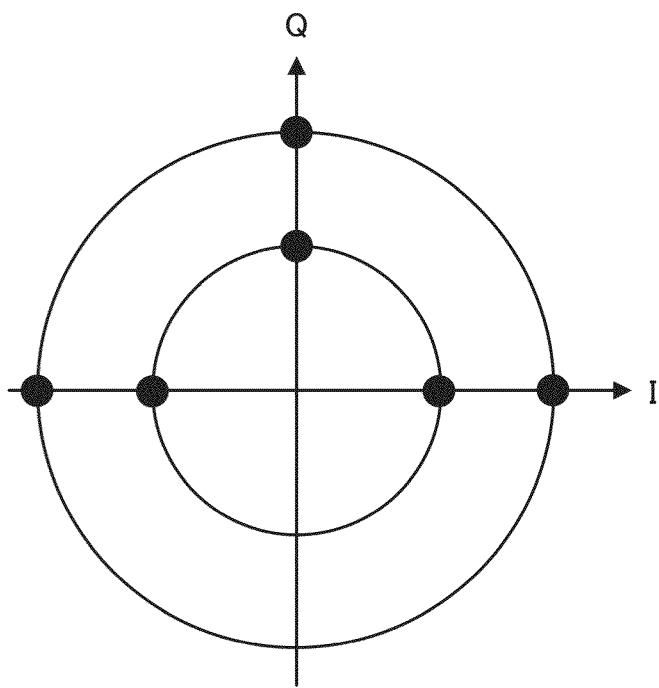
FIG. 32 is a diagram of a six-valued spatial quadrature amplitude modulation signal (6-SQAM) used in Examples 3 and 4.

In the present example, the six-valued spatial quadrature amplitude modulation signal (6-SQAM) of a two-valued intensity and a three-valued phase shown in FIG. 32 was recorded and reproduced using a holographic memory recording and reproduction apparatus shown in FIG. 31.

FIG. 31 is a schematic diagram illustrating a configuration of a holographic memory recording and reproduction apparatus according to the present invention used in an experiment. This holographic memory recording and reproduction apparatus records and reproduces a first hologram using a collinear holography method.

As shown in FIG. 31, holographic memory recording and reproduction apparatus 1000 includes a laser light source, beam expander (BE), first iris (Iris1), first half-wave plate (HWP1), polarization beam splitter (PBS), first beam splitter (BS1), first spatial light modulator (SLM1), first lens (L1), second iris (Iris2), second half-wave plate (HWP2), second lens (L2), polarizer (Pol.), second spatial light modulator (SLM2), analyzer (Ana.), third lens (L3), third iris (Iris3), fourth lens (L4), fifth lens (L5), sixth lens (L6), third half-wave plate (HWP3), first ND filter (NDF1), second beam splitter (BS2), variable phase shifter (piezoelectric device), third beam splitter (BS3), fourth iris (Iris4), seventh lens (L7), second ND filter (NDF2) and CCD camera. Holographic memory recording and reproduction apparatus 1000 has a recording medium (Photopolymer) installed between fifth lens (L5) and sixth lens (L6), and performs recording and reproduction.

As shown in FIG. 31, light (wavelength of 532 nm) emitted from the laser light source is branched into two parts by polarization beam splitter (PBS). The light toward the upper direction (first beam splitter BS1 side) of the drawing becomes signal light and first reference light for producing the first hologram. On the other hand, the light toward the left direction (second beam splitter BS2 side) of the drawing becomes second reference light for producing a second hologram. A photopolymer was used in the recording medium, and the irradiation time of laser light was set to one minute.

The light toward the upper direction (first beam splitter BS1 side) of the drawing from polarization beam splitter (PBS) is incident on spatial quadrature amplitude modulation signal production section 1010. In spatial quadrature amplitude modulation signal production section 1010, the central portion of a light beam is added with spatial phase modulation by phase modulation-type first spatial light modulator (SLM1), and is added with spatial amplitude modulation by intensity modulation-type second spatial light modulator (SLM2).

Figure 33A:
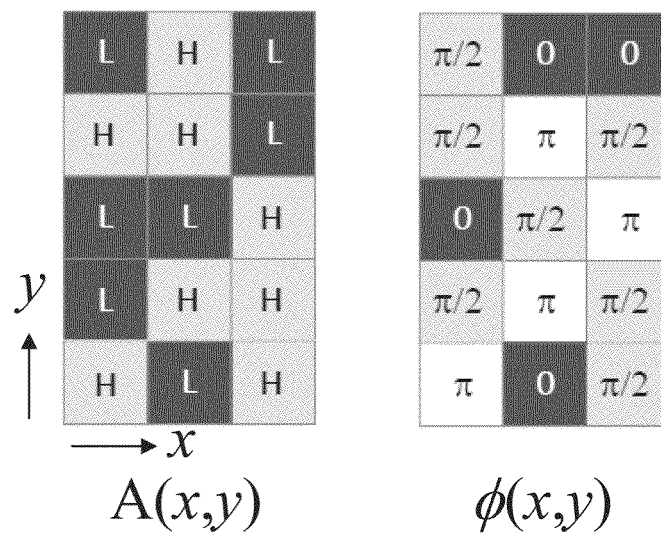
FIG. 33A is a diagram illustrating logical values of an original data page.
Figure 33B:
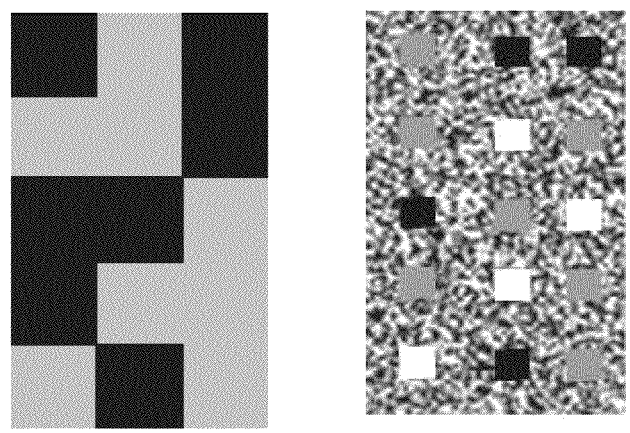
FIG. 33B is a diagram illustrating physical values of the original data page.

Logical values of a data page (spatial quadrature amplitude modulation signal) used in recording are shown in FIG. 33A, and physical values thereof are shown in FIG. 33B. As shown in FIG. 33, the data page has a size of 3×5 pixels. Each pixel of the data page has both values of amplitude information A(x, y) shown in the left side of FIG. 33 and phase information φ(x, y) shown in the right side of FIG. 33. That is, one data page is represented by uniting amplitude information A(x, y) shown in left side of FIG. 33 and phase information φ(x, y) shown in right side of FIG. 33. In FIG. 33, the intensity ratio of the bright portion to the dark portion was set to approximately 3:1. Phase information shown in FIG. 33 is depicted in grey scale for the purpose of visualization. A three-valued phase is as follows: white color=π, gray color=π/2, and black color=0. In the present example, the reason for not using the lower half-plane of the diagram shown in FIG. 32 is because the phase variable range of first spatial light modulator (SLM1) used in an experiment is limited to 0 to π.

In FIG. 33B, the signal pixel of a phase pattern is set to be smaller than the signal pixel of an intensity pattern. The peripheral portion of the signal pixel of the phase pattern is set to be a fine random pattern of 0 and π. There are two reasons. The first reason is to secure a margin for a shift of matching at the time of performing pixel matching of an intensity and a phase. The second reason is to expand the spatial frequency distribution by putting the random phase pattern into the periphery of the signal pixel to thereby improve the quality of a reproduction light beam.

Figure 34:
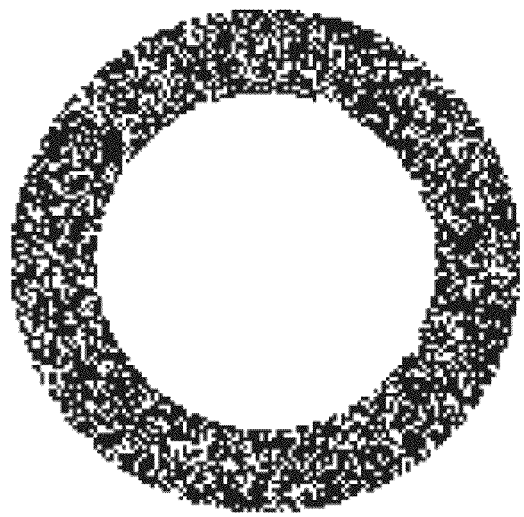
FIG. 34 is a diagram illustrating a collinear ring pattern.

In addition, in the collinear holography method, as shown in FIG. 34, the outer circumferential portion of the light beam is used as reference light called a collinear ring pattern. Consequently, in spatial quadrature amplitude modulation signal production section 1010, intensity modulation-type second spatial light modulator (SLM2) produces the collinear ring pattern equivalent to the first reference light in the outer circumferential portion of the light beam.

The spatial quadrature amplitude modulation signal and the first reference light which are produced in this manner becomes one beam, and the first hologram is recorded in the photopolymer (recording medium).

When the recorded data is reproduced, the central portion (data page region) of the light beam is blocked by second spatial light modulator (SLM2), and the collinear ring pattern equivalent to the first reference light is produced in the outer circumferential portion of the light beam. When the first hologram within the recording medium is irradiated with the first reference light produced in this manner, the diffracted light of the first hologram occurs. As shown in FIG. 31, the diffracted light of the first hologram arising from the recording medium is incident on hologram production section 1020.

On the other hand, the light toward the left direction (second beam splitter BS2 side) of the drawing from polarization beam splitter (PBS) becomes second reference light for producing the second hologram. This light causes a phase to be changed to 0, π/2, π, and 3π/2 by a variable phase shifter (reflection-type piezoelectric device), and then is incident on hologram production section 820. In hologram production section 820, the diffracted light of the first hologram and the second reference light are mixed by third beam splitter (BS3), so that the second hologram is produced on the detection plane of a CCD.

Figure 35:
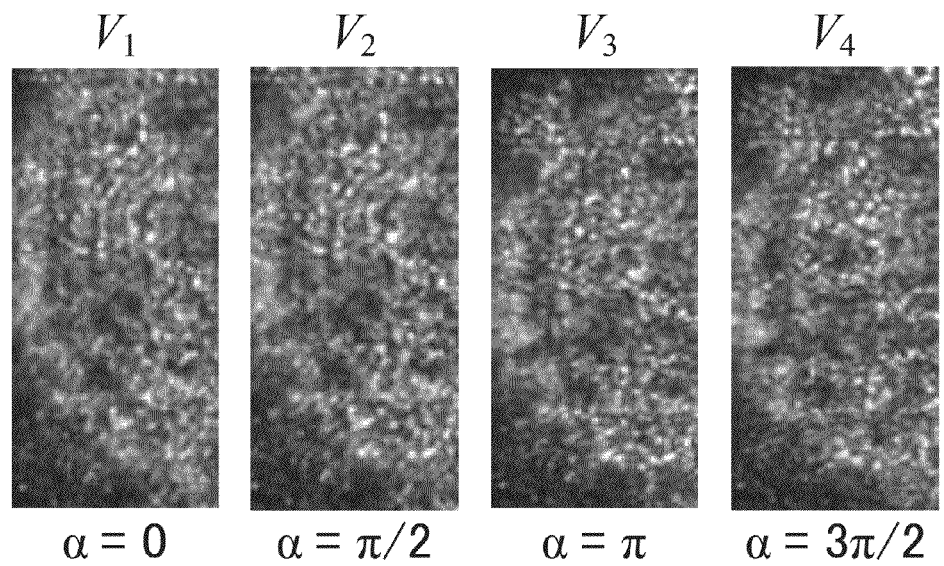
FIG. 35 is a diagram illustrating signal intensity distributions of the second hologram.

FIG. 35 is a signal intensity distribution obtained by photoelectrically converting four second holograms. In addition, FIG. 36 shows data demodulated into digital data of a two-valued amplitude and a three-valued phase by restoring data at each CCD pixel point and performing averaging processing and threshold processing on the data, using equation 21 and equation 22 from the signal intensity distribution of the second hologram.

Figure 36:
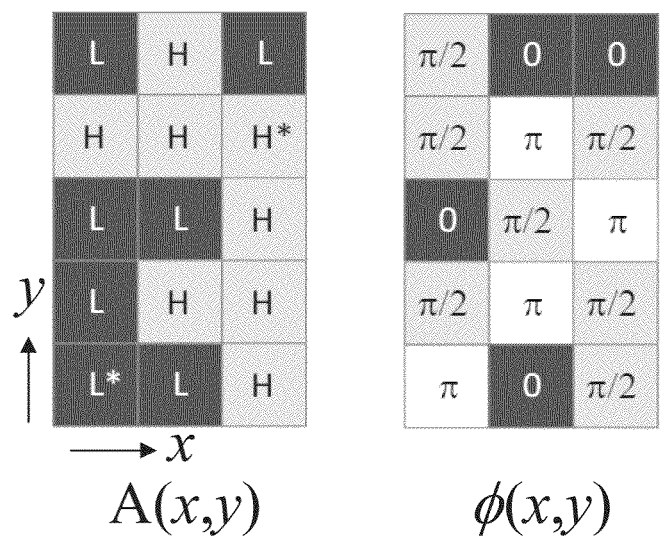
FIG. 36 is a diagram illustrating a data page demodulated from the signal intensity distributions shown in FIG. 35.

Comparing the original data shown in FIG. 33A with the demodulated data shown in FIG. 36, data errors in two place are generated on the amplitude plane (denoted by "*" in the drawing), but both the amplitude and the phase are completely demodulated in other places, and satisfactory results are obtained.

Example 4

Example 4 shows a result in which a six-valued spatial quadrature amplitude modulation signal (6-SQAM) is actually demodulated using a demodulation apparatus (see Embodiment 4) of the present invention.

Figure 37:
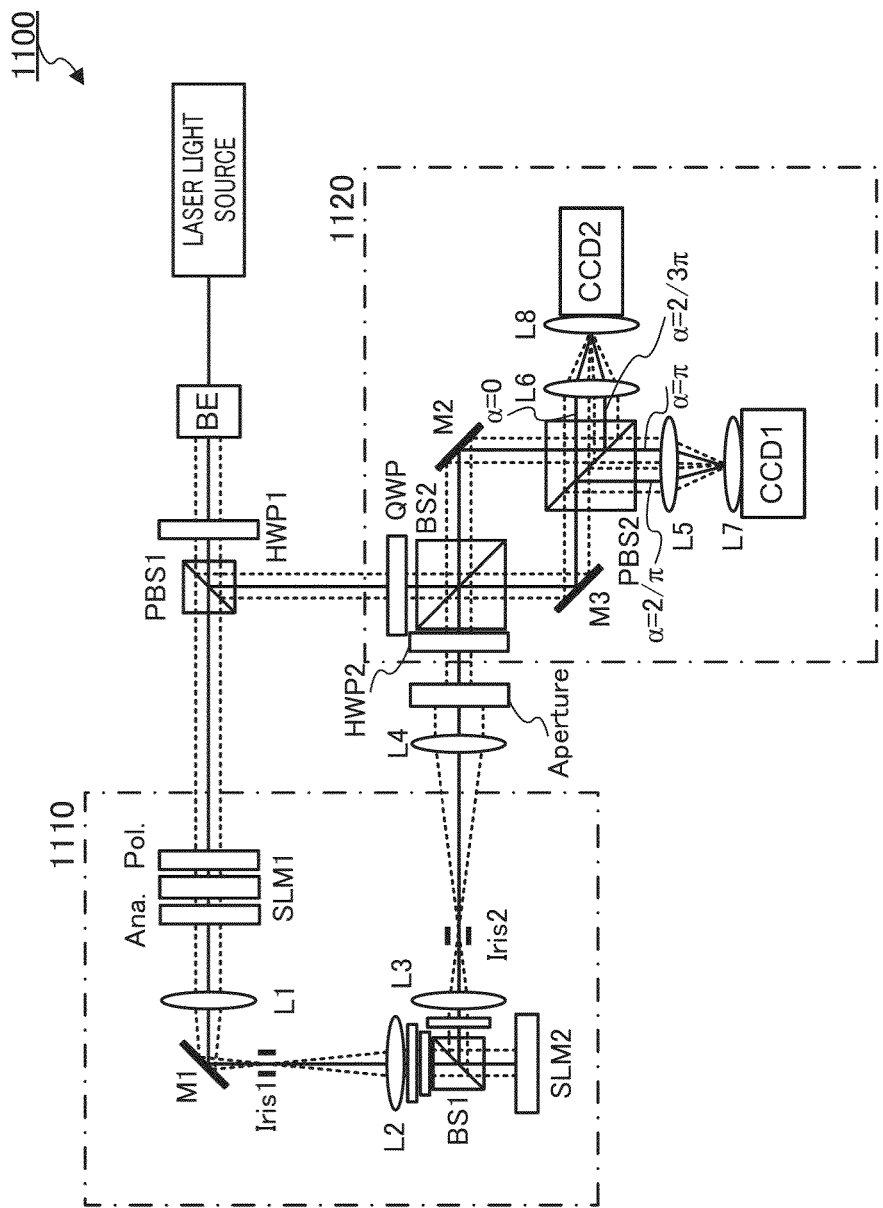
FIG. 37 is a schematic diagram illustrating a configuration of a demodulation apparatus according to the present invention used in Example 4.

In the present example, the six-valued spatial quadrature amplitude modulation signal (6-SQAM) of a two-valued intensity and a three-valued phase shown in FIG. 32 was demodulated using a demodulation apparatus shown in FIG. 37. As mentioned above, the reason for not using the lower half-plane of the diagram shown in FIG. 32 is because the phase variable range of second spatial light modulator (SLM2) used in an experiment is limited to 0 to π.

FIG. 37 is a schematic diagram illustrating a configuration of a demodulation apparatus according to the present invention used in an experiment. In demodulation apparatus 1100, the six-valued spatial quadrature amplitude modulation signal (6-SQAM) was produced in spatial quadrature amplitude modulation signal light production section 1110, and the six-valued spatial quadrature amplitude modulation signal (6-SQAM) was demodulated in hologram production section 1120. The configuration of hologram production section 1120 shown in FIG. 37 is the same as the configuration of the hologram production section and the detection section shown in FIG. 9.

As shown in FIG. 37, demodulation apparatus 1100 includes a laser light source, beam expander (BE), first half-wave plate (HWP1), first polarization beam splitter (PBS1), polarizer (Pol.), first spatial light modulator (SLM1), analyzer (Ana.), first lens (L1), first mirror (M1), first iris (Iris1), second lens (L2), first beam splitter (BS1), second spatial light modulator (SLM2), third lens (L3), second iris (Iris2), fourth lens (L4), aperture diaphragm (Aperture), second half-wave plate (HWP2), λ/4 wavelength plate (QWP), second beam splitter (BS2), second mirror (M2), third mirror (M3), second polarization beam splitter (PBS2), fifth lens (L5), sixth lens (L6), seventh lens (L7), eighth lens (L8), first CCD camera (CCD1) and second CCD camera (CCD2).

As shown in FIG. 37, light (wavelength of 532 nm) emitted from the laser light source is branched into two parts by first polarization beam splitter (PBS1). The light toward the left direction (first spatial light modulator SLM1 side) of the drawing becomes signal light. On the other hand, the light toward the lower direction (second beam splitter BS2 side) of the drawing becomes reference light (second reference light) for producing a hologram (second hologram).

The light toward the left direction (first spatial light modulator SLM1 side) of the drawing from the first polarization beam splitter (PBS1) is incident on spatial quadrature amplitude modulation signal production section 1110. In spatial quadrature amplitude modulation signal production section 1110, the central portion of a light beam is added with spatial amplitude modulation by intensity modulation-type first spatial light modulator (SLM1), and is added with spatial phase modulation by phase modulation-type second spatial light modulator (SLM2).

Figure 38:
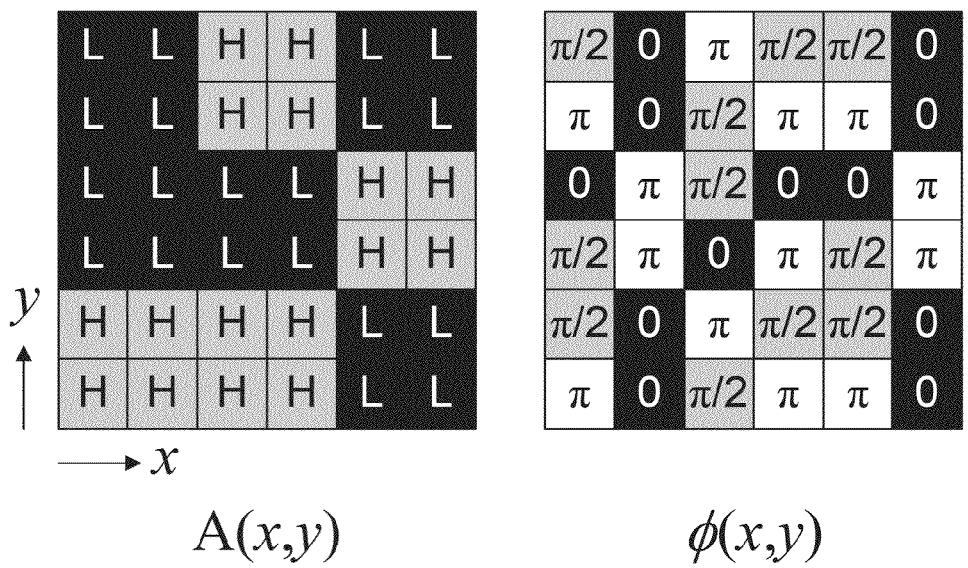
FIG. 38 is a diagram illustrating logical values of an original data page.

Logical values of a data page (spatial quadrature amplitude modulation signal) used in modulation are shown in FIG. 38. As shown in FIG. 38, the data page has a size of 6×6 pixels. Each pixel of the data page has both values of amplitude information A(x, y) shown in the left side of FIG. 38 and phase information φ(x, y) shown in the right side of FIG. 38. That is, one data page is represented by uniting amplitude information A(x, y) shown in the left side of FIG. 38 and phase information φ(x, y) shown in the right side of FIG. 38. In FIG. 38, the intensity ratio of the bright portion to the dark portion was set to approximately 3:1. Phase information shown in FIG. 38 is depicted in grey scale for the purpose of visualization. A three-valued phase is as follows: white color=π, gray color=π/2, and black color=0.

When the modulated data is demodulated, the signal light and the reference light are caused to interfere with each other in hologram production section 1120. The signal light produced in spatial quadrature amplitude modulation signal light production section 1110 passes through second half-wave plate (HWP2) and is adjusted to linearly polarized light of 45 degrees. On the other hand, the reference light toward the lower direction (second beam splitter BS2 side) of the drawing from first polarization beam splitter (PBS1) passes through λ/4 wavelength plate (QWP) and is converted into circularly polarized light. An interference fringe of which the phases are shifted by π with each other is produced by causing the signal light and the reference light to be incident on second beam splitter (BS2). Further, an interference fringe of which the phases are shifted by π/2 is produced by causing emission light from second beam splitter (BS2) to be incident on second polarization beam splitter (PBS2).

Through the above processes, two second holograms of α=π/2 and π=π are simultaneously produced in each different region of the detection plane of first CCD camera (CCD1). In addition, two second holograms of α=3π/2 and α=0 are simultaneously produced in each different region of the detection plane of second CCD camera (CCD2). The six-valued spatial quadrature amplitude modulation signal (6-SQAM) was demodulated from the signal intensity distribution obtained by photoelectrically converting the four second holograms.

Figure 39:
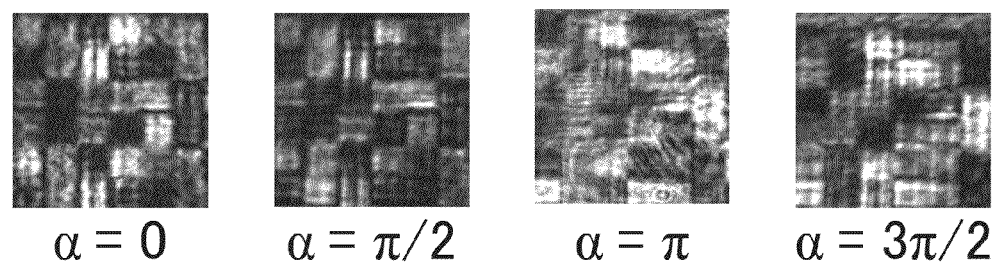
FIG. 39 is a diagram illustrating signal intensity distributions of the second hologram.
Figure 40A:
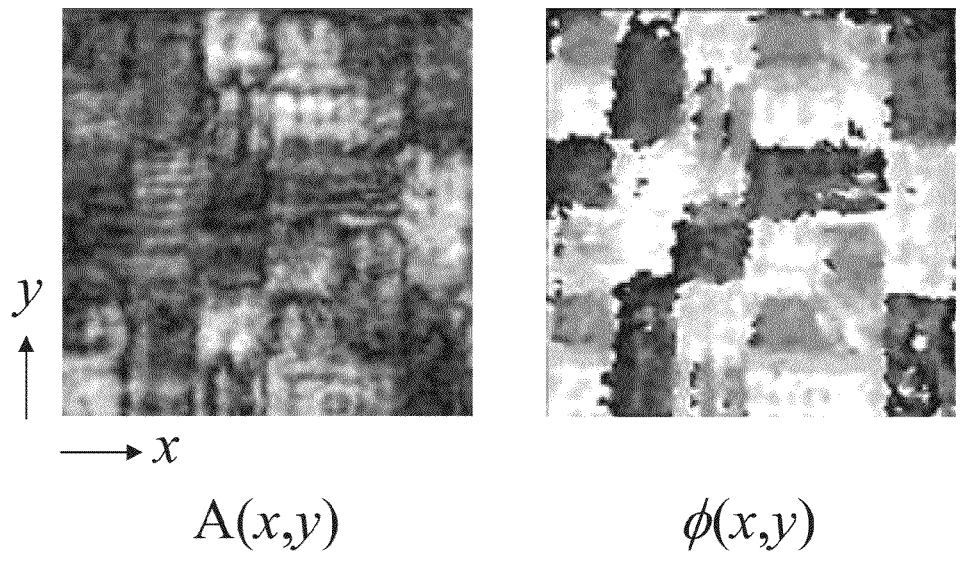
FIG. 40A is a diagram illustrating data restored in CCD pixel point units from the signal intensity distributions shown in FIG. 39.

FIG. 39 is a signal intensity distribution obtained by photoelectrically converting four second holograms. In addition, FIG. 40A shows data restored at each CCD pixel point using equation 21 and equation 22 from the signal intensity distribution of the second hologram, and FIG. 40B shows data demodulated into digital data of a two-valued amplitude and a three-valued phase by further performing averaging processing and threshold processing.

Figure 40B:
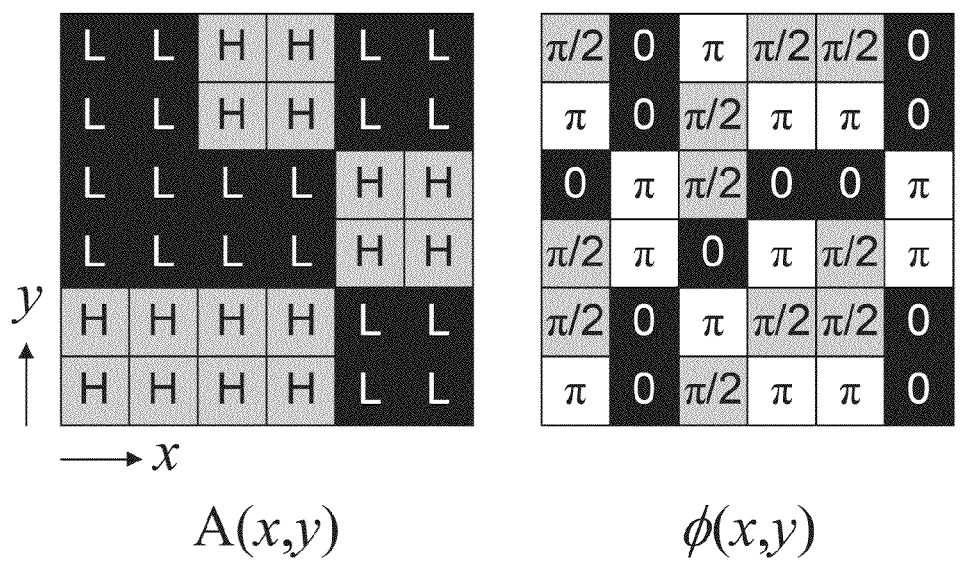
FIG. 40B is a diagram illustrating data obtained by performing averaging processing and threshold processing on the data shown in FIG. 39A.

Comparing the original data shown in FIG. 38 with demodulated data shown in FIG. 40B, both the amplitude and the phase are completely demodulated, and satisfactory results are obtained.

Meanwhile, in the configuration shown in FIG. 37, third lens (L3), fourth lens (L4), fifth lens (L5), sixth lens (L6), seventh lens (L7) and eighth lens (L8) may not be included. When these lenses are not included, intensity information and phase information included in the spatial quadrature amplitude modulation signal are influenced by the Fresnel diffraction. In this case, after a signal is demodulated using the signal intensity distribution of the second hologram, the influence of the Fresnel diffraction is deducted by a numerical calculation, thereby allowing original intensity information and phase information included in the spatial quadrature amplitude modulation signal to be obtained.

Example 5

Example 5 shows a result obtained by performing a biological observation using the observation apparatus (see Embodiment 4) of the present invention. In the present example, hind limbs of *Daphnia pulex* and *Apis mellifera* were observed using an observation apparatus shown in FIG. 41.

Figure 41:
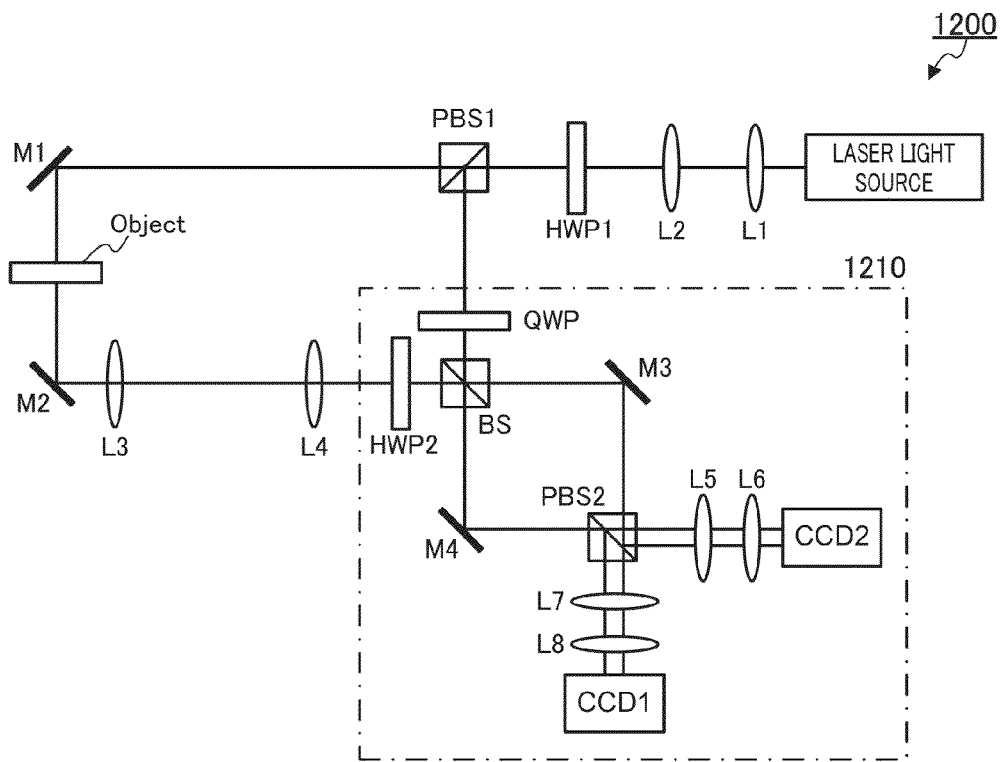
FIG. 41 is a schematic diagram illustrating a configuration of an observation apparatus according to the present invention used in Example 5.

FIG. 41 is a schematic diagram illustrating a configuration of an observation apparatus according to the present invention used in an experiment. The configuration of hologram production section 1210 shown in FIG. 41 is the same configuration as the hologram production section and the detection section shown in FIG. 9.

As shown in FIG. 41, observation apparatus 1200 includes a laser light source, first lens (L1), second lens (L2), first half-wave plate (HWP1), first polarization beam splitter (PBS1), first mirror (M1), second mirror (M2), third lens (L3), fourth lens (L4), second half-wave plate (HWP2), λ/4 wavelength plate (QWP), beam splitter (BS), third mirror (M3), fourth mirror (M4), second polarization beam splitter (PBS2), fifth lens (L5), sixth lens (L6), seventh lens (L7), eighth lens (L8), first CCD camera (CCD1) and second CCD camera (CCD2). Observation apparatus 1200 has a biological sample (Object) installed between first mirror (M1) and second mirror (M2), and performs an observation.

As shown in FIG. 41, light (wavelength of 532 nm) emitted from the laser light source is branched into two parts by first polarization beam splitter (PBS1). The light toward the left direction (first mirror M1 side) of the drawing becomes signal light (transmitted light or reflected light from an object to be observed). On the other hand, the light toward the lower direction (λ/4 wavelength plate QWP side) of the drawing becomes reference light (second reference light) for producing a hologram (second hologram).

The light toward the left direction (first mirror M1 side) of the drawing from first polarization beam splitter (PBS1) is incident on the biological sample (Object). The light passes through biological sample (Object) or the light is reflected in the biological sample (Object), so that a spatial quadrature amplitude modulation signal corresponding to an amplitude characteristic and a phase characteristic of the biological sample (Object) is produced. The subsequent processes are the same processes described in Embodiment 4 and Example 4. Finally, the intensity distribution and the phase distribution included in the spatial quadrature amplitude modulation signal are demodulated. These distributions are equivalent to the transmitted light intensity distribution and the transmitted light phase distribution (or the reflected light intensity distribution and the reflected light phase distribution) of the biological sample (Object), respectively.

Figure 42:
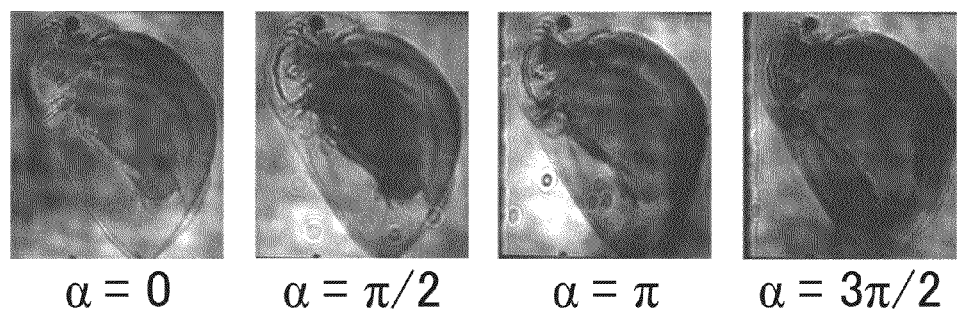
FIG. 42 is a diagram illustrating signal intensity distributions of the second hologram.
Figure 43:
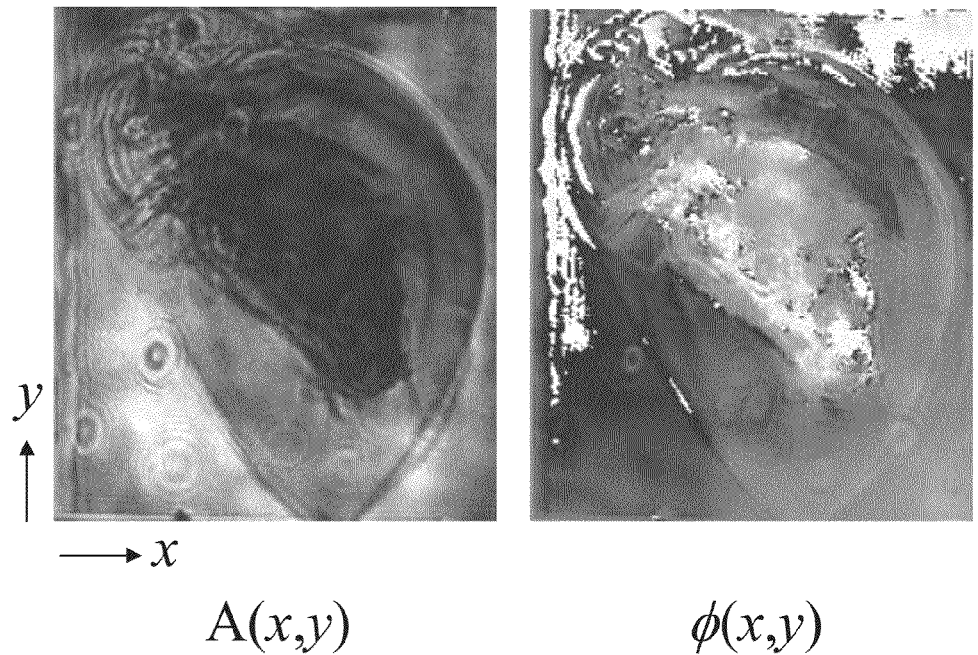
FIG. 43 is a diagram illustrating data restored in CCD pixel point units from the signal intensity distributions shown in FIG. 42.

FIGS. 42 and 43 show observation results of *Daphnia pulex*. FIG. 42 is a signal intensity distribution obtained by photoelectrically converting four second holograms. In addition, FIG. 43 is a result obtained by calculating a transmitted light intensity and a transmitted light phase at each CCD pixel point using equation 21 and equation 22 from the signal intensity distribution of the second hologram shown in FIG. 42.

Figure 44:
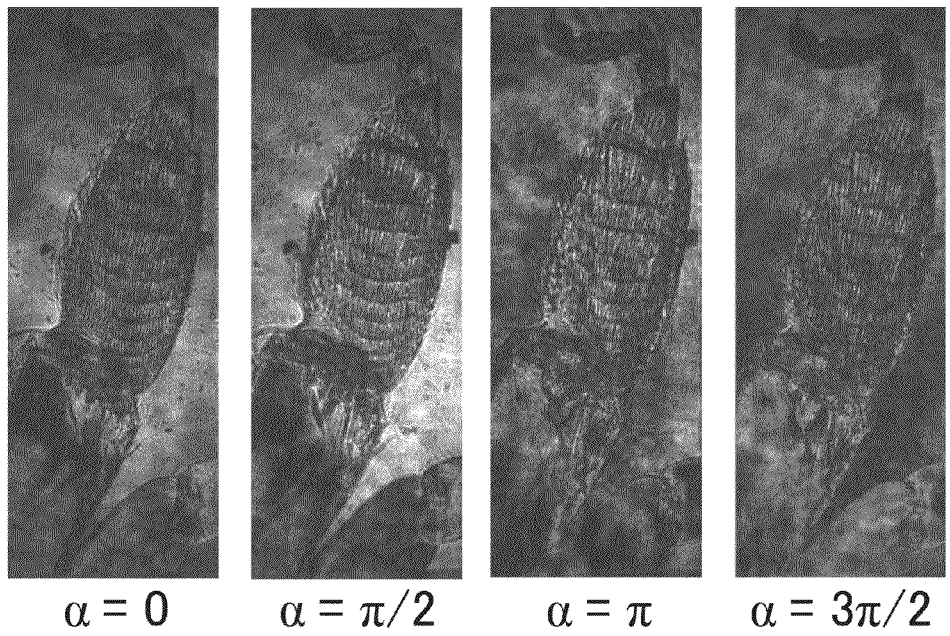
FIG. 44 is a diagram illustrating signal intensity distributions of the second hologram.
Figure 45:
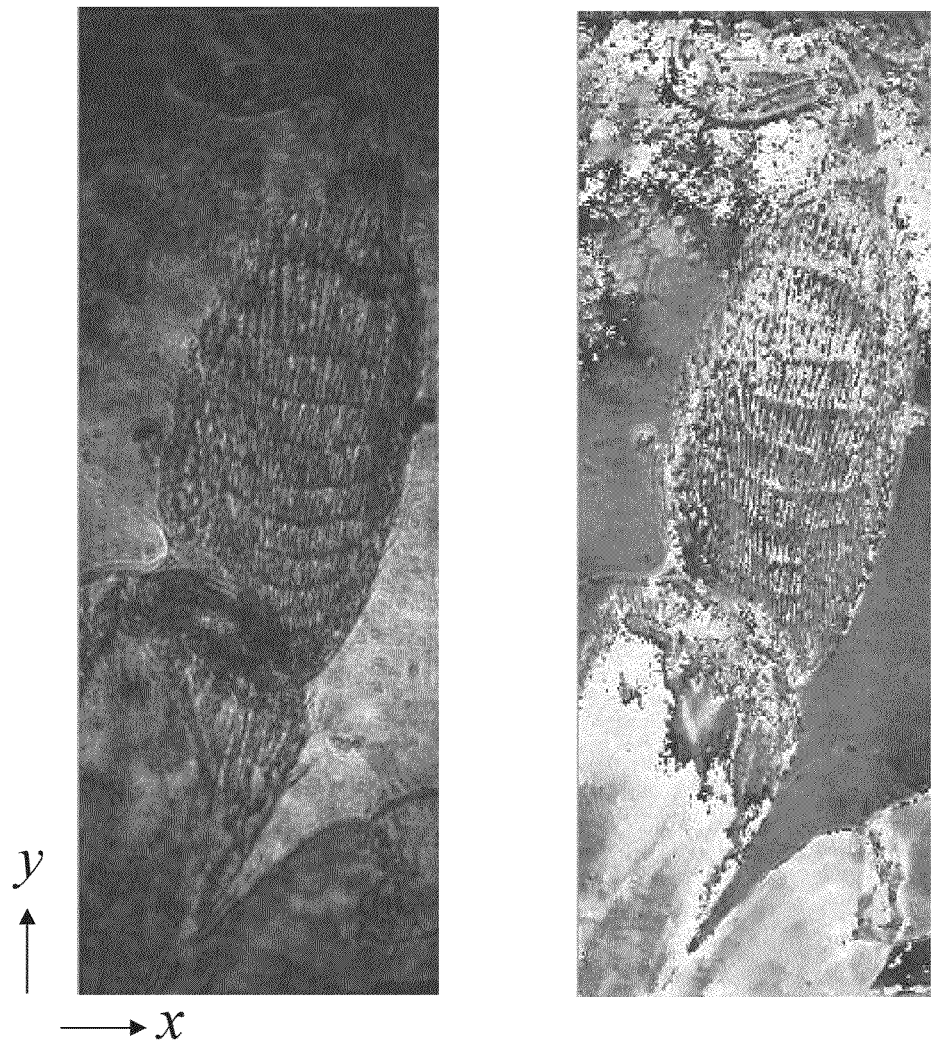
FIG. 45 is a diagram illustrating data restored in CCD pixel point units from the signal intensity distributions shown in FIG. 44.

FIGS. 44 and 45 show observation results of a hind limb of *Apis mellifera*. FIG. 44 is a signal intensity distribution obtained by photoelectrically converting four second holograms. In addition, FIG. 45 is a result obtained by calculating a transmitted light intensity and a transmitted light phase at each CCD pixel point using equation 21 and equation 22 from the signal intensity distribution of the second hologram shown in FIG. 44.

From the results of FIGS. 43 and 45, it is known that the transmitted light intensity distribution and the transmitted light phase distribution (or the reflected light intensity distribution and the reflected light phase distribution) of the biological sample can be observed by the observation apparatus of the present invention.

Meanwhile, in the configuration shown in FIG. 41, third lens (L3), fourth lens (L4), fifth lens (L5), sixth lens (L6), seventh lens (L7) and eighth lens (L8) may not be included. When these lenses are not included, the intensity information and the phase information included in the spatial quadrature amplitude modulation signal through the biological sample are influenced by the Fresnel diffraction. In this case, after a signal is demodulated using the signal intensity distribution of the second hologram, the influence of the Fresnel diffraction is deducted by a numerical calculation, thereby allowing original intensity information and phase information included in the spatial quadrature amplitude modulation signal through the biological sample to be obtained.

Example 6

Example 6 shows a result obtained by performing a polarization observation using the observation apparatus (see Embodiment 4) of the present invention. In the present example, a thin piece of crystalline limestone was observed using an observation apparatus shown in FIG. 46.

Figure 46:
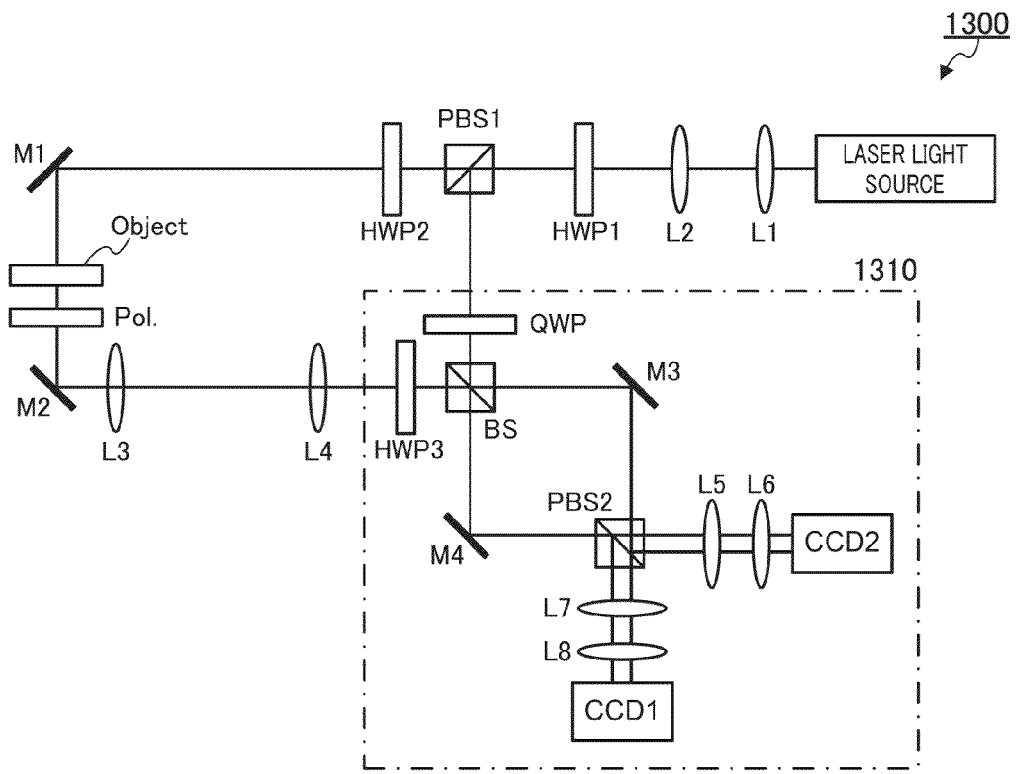
FIG. 46 is a schematic diagram illustrating a configuration of the observation apparatus according to the present invention used in Example 6.

FIG. 46 is a schematic diagram illustrating a configuration of an observation apparatus according to the present invention used in an experiment. The configuration of hologram production section 1310 shown in FIG. 46 is the same configuration as the hologram production section and the detection section shown in FIG. 9.

As shown in FIG. 46, observation apparatus 1300 includes a laser light source, first lens (L1), second lens (L2), first half-wave plate (HWP1), first polarization beam splitter (PBS1), second half-wave plate (HWP2), first mirror (M1), polarizer (Pol.), second mirror (M2), third lens (L3), fourth lens (L4), third half-wave plate (HWP3), λ/4 wavelength plate (QWP), beam splitter (BS), third mirror (M3), fourth mirror (M4), second polarization beam splitter (PBS2), fifth lens (L5), sixth lens (L6), seventh lens (L7), eighth lens (L8), first CCD camera (CCD1) and second CCD camera (CCD2). Observation apparatus 1300 has a sample (Object) installed between first mirror (M1) and polarizer (Pol.), and performs an observation.

As shown in FIG. 46, light (wavelength of 532 nm) emitted from the laser light source is branched into two parts by first polarization beam splitter (PBS1). The light toward the left direction (second half-wave plate HWP2 side) of the drawing becomes signal light (observation light). On the other hand, the light toward the lower direction (λ/4 wavelength plate QWP side) of the drawing becomes reference light (second reference light) for producing a hologram (second hologram).

The light toward the left direction (second half-wave plate HWP2 side) of the drawing from first polarization beam splitter (PBS1) is horizontally polarized light (polarized light parallel to the in-plane direction of the drawing). Second half-wave plate (HWP2) rotates the polarization angle of this horizontally polarized light by 45 degrees. The 45-degree linearly polarized light is incident on the sample (Object). The light passes through the sample (Object) or the light is reflected in the sample (Object), so that the light receiving amplitude modulation and phase modulation dependent on the polarization property of the sample (Object) is produced as a spatial quadrature amplitude modulation signal (light complex amplitude). The spatial quadrature amplitude modulation signal is incident on the polarizer (Pol.). It is possible to select which polarization component (horizontally polarized light (P-polarized light) or vertically polarized light (S-polarized light)) of the spatial quadrature amplitude modulation signal is observed based on the angle of polarizer (Pol.) at this time. It is possible to observe an arbitrary polarization component by adjusting the angle of the polarizer (Pol.).

The subsequent processes are the same processes described in Embodiment 4. Finally, the intensity distribution and the phase distribution, included in the spatial quadrature amplitude modulation signal, for the selected polarization component are demodulated. These distributions are equivalent to the transmitted light intensity distribution and the transmitted light phase distribution (or the reflected light intensity distribution and the reflected light phase distribution) of the sample (Object) for the selected polarization component, respectively.

Figure 47:
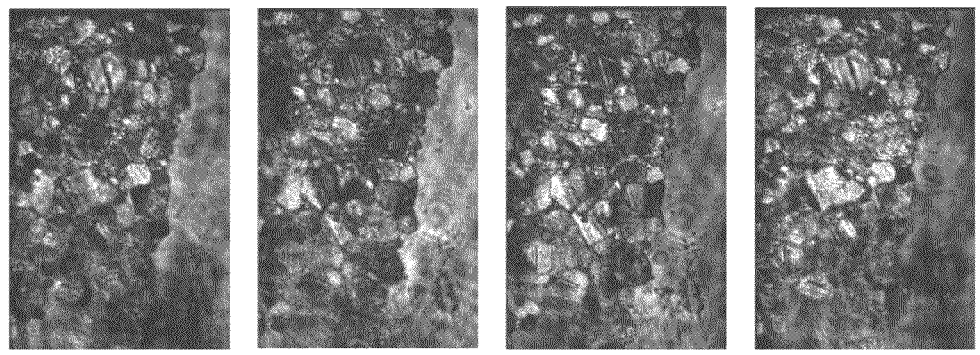
FIG. 47 is a diagram illustrating signal intensity distributions of the second hologram.
Figure 48:
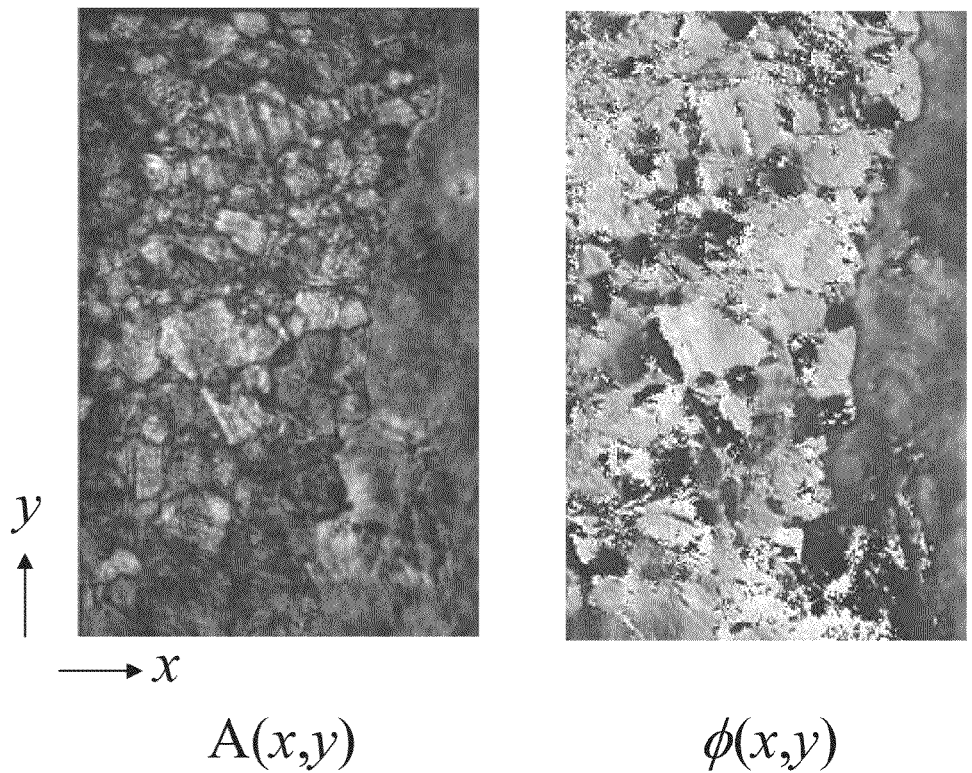
FIG. 48 is a diagram illustrating data restored in CCD pixel point units from the signal intensity distributions shown in FIG. 47.

FIGS. 47 and 48 show observation results of the horizontally polarized light (P-polarized light) component. FIG. 47 is a signal intensity distribution obtained by photoelectrically converting four second holograms. In addition, FIG. 48 is a result obtained by calculating the transmitted light intensity and the transmitted light phase at each CCD pixel point using equation 21 and equation 22 from the signal intensity distribution of the second hologram shown in FIG. 47.

Figure 49:
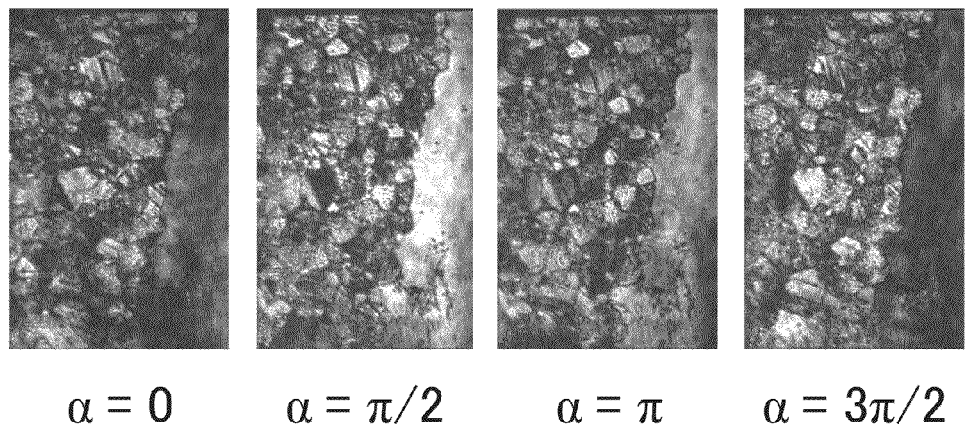
FIG. 49 is a diagram illustrating signal intensity distributions of the second hologram.
Figure 50:
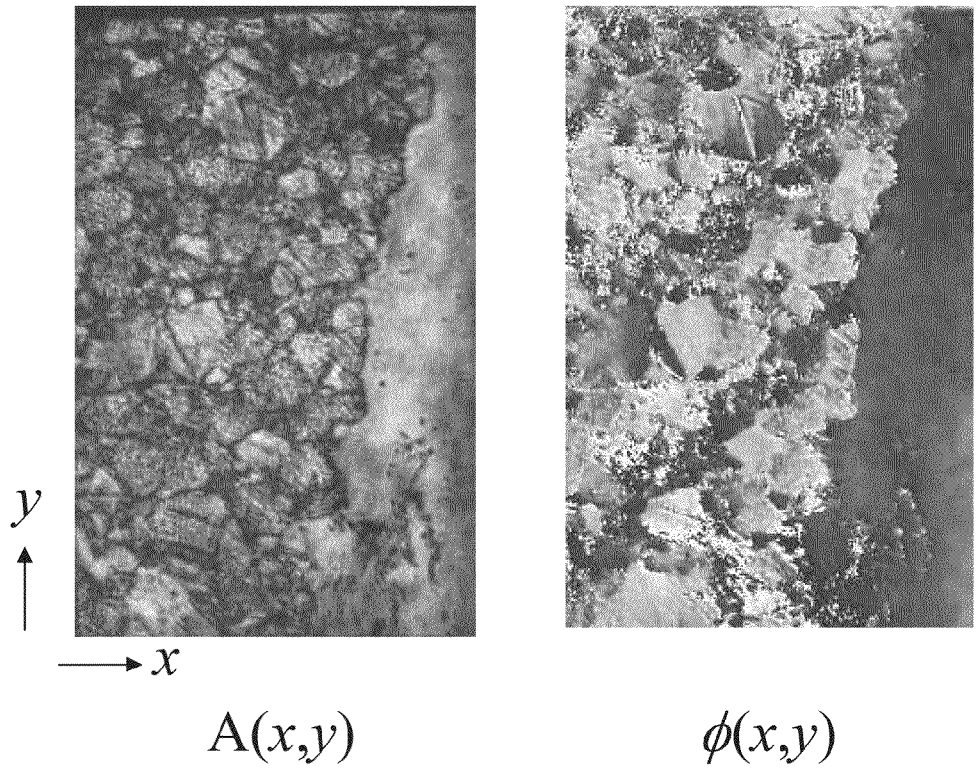
FIG. 50 is a diagram illustrating data restored in CCD pixel point units from the signal intensity distributions shown in FIG. 49.

FIGS. 49 and 50 show observation results of the vertically polarized light (S-polarized light) component. FIG. 49 is a signal intensity distribution obtained by photoelectrically converting four second holograms. In addition, FIG. 50 is a result obtained by calculating the transmitted light intensity and the transmitted light phase at each CCD pixel point using equation 21 and equation 22 from the signal intensity distribution of the second hologram shown in FIG. 49.

From the results of FIGS. 48 and 50, it is known that light transmission characteristics vary by changing the angle of a polarizer. In this manner, the birefringent property of a crystal can be confirmed by the observation apparatus of the present invention.

Meanwhile, in the configuration shown in FIG. 46, third lens (L3), fourth lens (L4), fifth lens (L5), sixth lens (L6), seventh lens (L7) and eighth lens (L8) may not be included. When these lenses are not included, intensity information and phase information included in the spatial quadrature amplitude modulation signal through crystalline limestone are influenced by the Fresnel diffraction. In this case, after a signal is demodulated using the signal intensity distribution of the second hologram, the influence of the Fresnel diffraction is deducted by a numerical calculation, thereby allowing original intensity information and phase information included in the spatial quadrature amplitude modulation signal through the crystalline limestone to be obtained.

Example 7

Example 7 shows a result obtained by performing a polarization observation using the observation apparatus (see Embodiments 4 and 6) of the present invention. In the present example, a segment of *Branchiostoma belcheri* was observed using an observation apparatus shown in FIG. 41.

Figure 51:
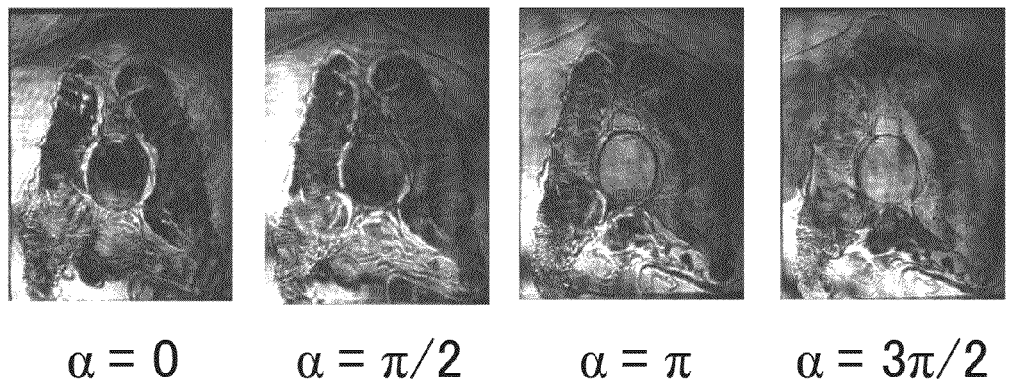
FIG. 51 is a diagram illustrating signal intensity distributions of the second hologram.
Figure 52:
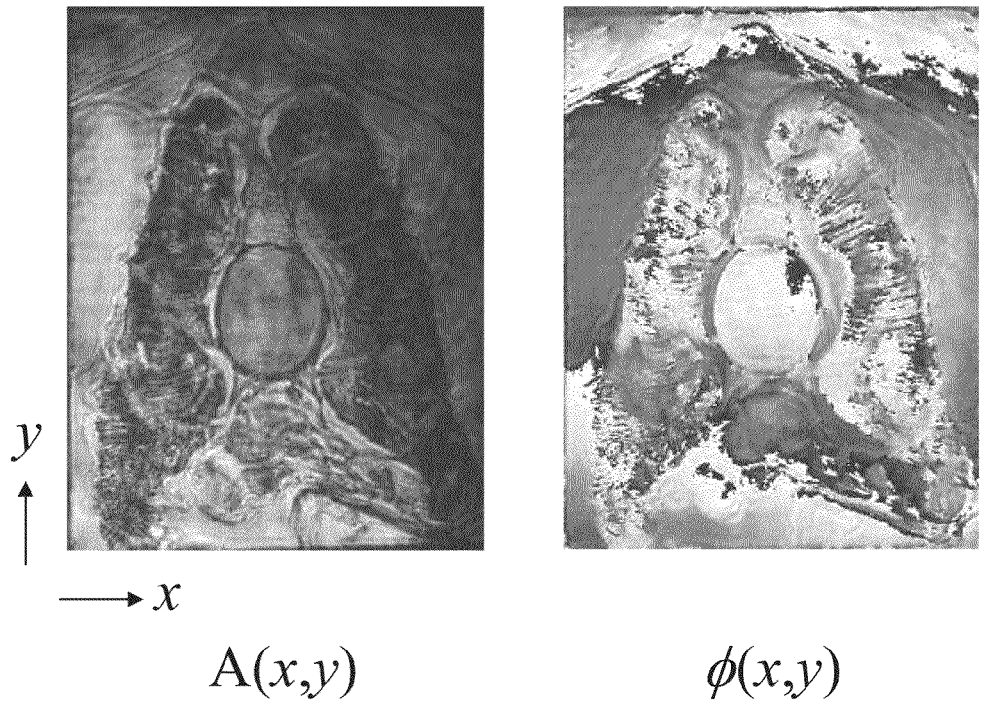
FIG. 52 is a diagram illustrating data restored in CCD pixel point units from four signal intensity distributions shown in FIG. 51.

FIGS. 51 and 52 show observation results based on a procedure of Embodiment 4 in which four second holograms ($\alpha=0$, $\alpha=\pi/4$, $\alpha=\pi/2$, and $\alpha=3\pi/4$) are produced. FIG. 51 is a signal intensity distribution obtained by photoelectrically converting four second holograms. In addition, FIG. 52 is a result obtained by calculating the transmitted light intensity and the transmitted light phase at each CCD pixel point using equation 21 and equation 22 from the signal intensity distribution of the second hologram shown in FIG. 51.

Figure 53:
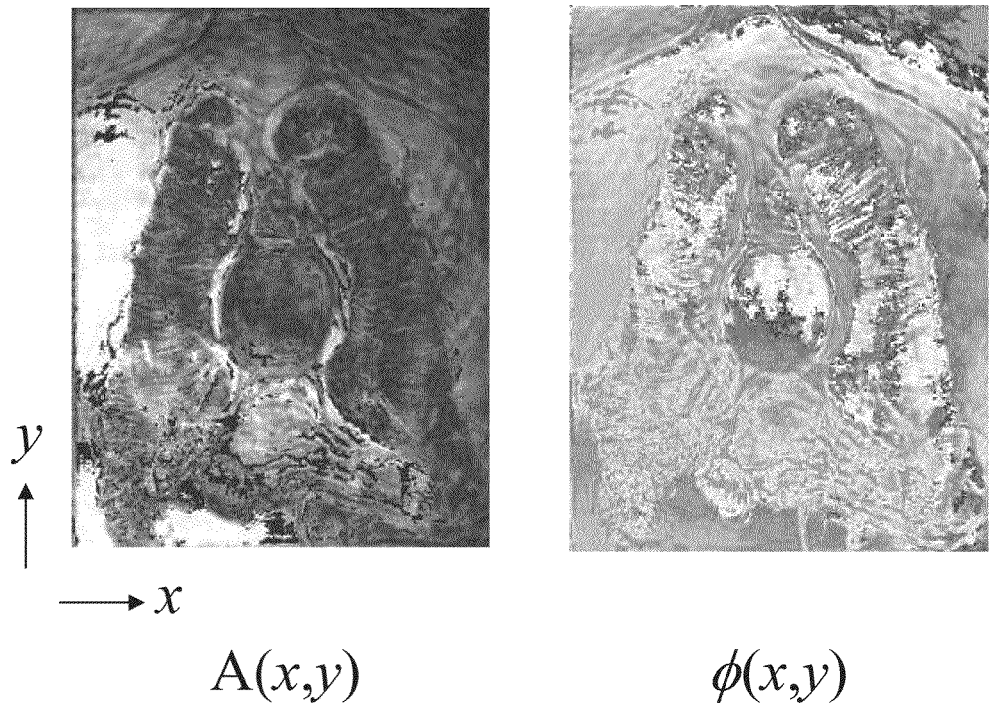
FIG. 53 is a diagram illustrating data restored in CCD pixel point units from two signal intensity distributions shown in FIG. 52.

FIG. 53 shows an observation result based on a procedure of Embodiment 6 in which two second holograms ($\alpha=0$ and $\alpha=\pi/2$) are produced. FIG. 53 is a result obtained by calculating the transmitted light intensity and the transmitted light phase at each CCD pixel point from the signal intensity distribution of two second holograms.

From the results of FIGS. 52 and 53, it is known that the light complex amplitude can be measured using a simple apparatus.

This application claims the priority benefit of Japanese Patent Application No. 2010-234640, filed on Oct. 19, 2010. The disclosure of which is incorporated herein by reference in its entirety.

INDUSTRIAL APPLICABILITY

A holographic memory of the present invention is useful in not only AV applications for consumers, but also various applications such as archival applications (in which data can be stored for a long period of time) in broadcasting and medical fields, and optical disc systems (of which power consumption is approximately ⅙ of that of a HDD) of data centers or the like.

REFERENCE SIGNS LIST

- 100 holographic memory recording and reproduction apparatus
- 105 laser light source
- 110 first beam splitter
- 115 spatial quadrature amplitude modulation signal light production section
- 120 first lens
- 125 first mirror
- 130 second beam splitter
- 135 optical shutter
- 140 second lens
- 145 variable phase shifter
- 150 second mirror
- 155 third beam splitter
- 160 CCD
- 165 holographic memory
- 210 spatial quadrature amplitude modulation signal light
- 220 first reference light
- 230 second reference light
- 240 diffracted light of first hologram
- 250 second hologram
- 305 first beam splitter
- 310 second beam splitter
- 315 third beam splitter
- 320 fourth beam splitter
- 325 phase shifter
- 330 first CCD
- 335 second CCD
- 340 third CCD
- 345 fourth CCD
- 405 half-wave plate
- 410 variable phase shifter
- 415 λ/4 wavelength plate
- 420 beam splitter
- 425 first polarization beam splitter
- 430 second polarization beam splitter
- 435 first CCD
- 440 second CCD
- 445 third CCD
- 450 fourth CCD
- 505 half-wave plate
- 510 variable phase shifter
- 515 λ/4 wavelength plate
- 520 beam splitter
- 525 first mirror
- 530 second mirror
- 535 polarization beam splitter
- 540 first CCD
- 545 second CCD
- 550 second polarization beam splitter
- 555 third polarization beam splitter
- 560 second beam splitter
- 565 third mirror
- 605 half-wave plate
- 610 variable phase shifter
- 615 λ/4 wavelength plate
- 620 first beam splitter
- 625 first mirror
- 630 second mirror
- 635 first polarization beam splitter
- 640 second polarization beam splitter
- 645 third polarization beam splitter
- 650 fourth polarization beam splitter
- 655 second beam splitter
- 660 CCD
- 665 third beam splitter
- 670 fourth beam splitter
- 675 phase shifter
- 705 half-wave plate
- 710 λ/4 wavelength plate
- 715 beam splitter
- 720 polarization beam splitter
- 725 first CCD
- 730 second CCD
- 805 half-wave plate
- 810 λ/4 wavelength plate
- 815 polarization beam splitter
- 820 first mirror
- 825 second mirror
- 830 beam splitter
- 835 CCD
- 900, 1000 holographic memory recording and reproduction apparatus
- 910, 1010, 1110 spatial quadrature amplitude modulation signal light production section
- 920, 1020, 1120, 1210, 1310 hologram production section
- 1100 demodulation apparatus
- 1200, 1300 observation apparatus

The invention claimed is:

1. A reproduction apparatus of a holographic memory in which a first hologram produced from reference light and signal light including a spatial phase modulation signal or a spatial quadrature amplitude modulation signal is recorded, the reproduction apparatus comprising:

a hologram diffracted light production section that produces diffracted light of the first hologram by irradiating the holographic memory with first reference light;

a hologram production section that changes a phase of second reference light capable of interfering with the diffracted light of the first hologram, and simultaneously produces a plurality of second holograms from the diffracted light of the first hologram and the second reference light of which the phase is changed;

a detection section that detects an intensity distribution of each of the plurality of second holograms; and a processing section that demodulates the spatial phase modulation signal or the spatial quadrature amplitude modulation signal on the basis of the plurality of intensity distributions.

2. The holographic memory reproduction apparatus according to claim 1, further comprising:

a laser light source that emits laser light; and a laser light splitting section that splits the laser light emitted from the laser light source into the first reference light and the second reference light.

3. The holographic memory reproduction apparatus according to claim 1, wherein:

the hologram production section includes a variable phase shifter that changes the phase of the second reference light, and a beam splitter that has a first surface on which the diffracted light of the first hologram is incident and a second surface on which the second reference light having a phase changed by the variable phase shifter is incident.

4. The holographic memory reproduction apparatus according to claim 2, wherein:

the laser light source emits laser light of linearly polarized light; and the hologram production section includes a half-wave plate that rotates a polarization angle of the diffracted light of the first hologram by 45 degrees, a λ/4 wavelength plate that converts a polarization state of the second reference light into circularly polarized light, a beam splitter that has a first surface on which the diffracted light of the first hologram having a polarization angle changed by the half-wave plate is incident, and a second surface on which the second reference light having a polarization state changed by the λ/4 wavelength plate is incident, a first polarization beam splitter, on which a light beam of a portion of the diffracted light of the first hologram reflected from the beam splitter and a light beam of a portion of the second reference light passing through the beam splitter are incident, and which transmits one of horizontally polarized light components and vertically polarized light components of the incident light beams and reflects the other thereof, and a second polarization beam splitter, on which a light beam of a portion of the diffracted light of the first hologram passing through the beam splitter and a light beam of a portion of the second reference light reflected from the beam splitter are incident, and which transmits one of horizontally polarized light components and vertically polarized light components of the incident light beams and reflects the other thereof.

5. The holographic memory reproduction apparatus according to claim 2, wherein:

the laser light source emits laser light of linearly polarized light; and the hologram production section includes a half-wave plate that rotates a polarization angle of the diffracted light of the first hologram by 45 degrees, a λ/4 wavelength plate that converts a polarization state of the second reference light into circularly polarized light, a beam splitter that has a first surface on which the diffracted light of the first hologram having a polarization angle changed by the half-wave plate is incident, and a second surface on which the second reference light having a polarization state changed by the λ/4 wavelength plate is incident, a polarization beam splitter that has a first surface on which a light beam of a portion of the diffracted light of the first hologram reflected from the beam splitter and a light beam of a portion of the second reference light passing through the beam splitter are incident, and a second surface on which a light beam of a portion of the diffracted light of the first hologram passing through the beam splitter and a light beam of a portion of the second reference light reflected from the beam splitter are incident, transmits one of horizontally polarized light components and vertically polarized light components of the incident light beams, and reflects the other thereof.

6. The holographic memory reproduction apparatus according to claim 2, wherein:

the laser light source emits laser light of linearly polarized light; and the hologram production section includes a half-wave plate that rotates a polarization angle of the diffracted light of the first hologram by 45 degrees, a λ/4 wavelength plate that converts a polarization state of the second reference light into circularly polarized light, a first beam splitter that has a first surface on which the diffracted light of the first hologram having a polarization angle changed by the half-wave plate is incident, and a second surface on which the second reference light having a polarization state changed by the λ/4 wavelength plate is incident, a first polarization beam splitter that transmits one of horizontally polarized light components and vertically polarized light components of a light beam of a portion of the diffracted light of the first hologram reflected from the first beam splitter and a light beam of a portion of the second reference light passing through the first beam splitter, and reflects the other thereof, a second polarization beam splitter that transmits one of horizontally polarized light components and vertically polarized light components of a light beam of a portion of the diffracted light of the first hologram passing through the first beam splitter and a light beam of a portion of the second reference light reflected from the first beam splitter, and reflects the other thereof, and a second beam splitter that has a first surface on which a light beam of a portion of the diffracted light of the first hologram reflected from the first polarization beam splitter and a light beam of a portion of the second reference light, and a light beam of a portion of the diffracted light of the first hologram passing through the first polarization beam splitter and a light beam of a portion of the second reference light are incident, and a second surface on which a light beam of a portion of the diffracted light of the first hologram reflected from the second polarization beam splitter and a light beam of a portion of the second reference light, and a light beam of a portion of the diffracted light of the first hologram passing through the second polarization beam splitter and a light beam of a portion of the second reference light are incident.

7. The holographic memory reproduction apparatus according to claim 2, wherein:
the laser light source emits laser light of linearly polarized light; and
the hologram production section includes
a half-wave plate that rotates a polarization angle of the diffracted light of the first hologram by 45 degrees,
a λ/4 wavelength plate that converts a polarization state of the second reference light into circularly polarized light,
a beam splitter that has a first surface on which the diffracted light of the first hologram having a polarization angle changed by the half-wave plate is incident, and a second surface on which the second reference light having a polarization state changed by the λ/4 wavelength plate is incident, and
a polarization beam splitter, on which the diffracted light of the first hologram reflected from the beam splitter and the second reference light passing through the beam splitter are incident, and which transmits one of horizontally polarized light components and vertically polarized light components of the incident light beams and reflects the other thereof.

8. The holographic memory reproduction apparatus according to claim 1, further comprising:
a spatial quadrature amplitude modulation signal light production section that performs spatial quadrature amplitude modulation on laser light and produces signal light including a spatial quadrature amplitude modulation signal; and
a recording section that records a first hologram produced from the signal light and reference light in a holographic memory.

9. The holographic memory reproduction apparatus according to claim 8, wherein:
the spatial quadrature amplitude modulation signal light production section includes a beam splitter on which the laser light is incident, a reflection-type first spatial light modulator that modulates an amplitude of the laser light reflected from the beam splitter, and a reflection-type second spatial light modulator that modulates an amplitude of the laser light passing through the beam splitter, and
an optical path length LI between the beam splitter and the first spatial light modulator and an optical path length LQ between the beam splitter and the second spatial light modulator satisfy the following equation 1

$$L_I - L_Q = \frac{\lambda}{4}$$ [Equation 1]

(where λ is a wavelength of the laser light).

10. A reproduction method of a holographic memory in which a first hologram produced from reference light and signal light including a spatial phase modulation signal or a spatial quadrature amplitude modulation signal is recorded, the reproduction method comprising:
producing diffracted light of the first hologram by irradiating the holographic memory with first reference light;
changing a phase of second reference light capable of interfering with the diffracted light of the first hologram, and simultaneously producing a plurality of second holograms from the diffracted light of the first hologram and the second reference light of which the phase is changed;
detecting an intensity distribution of each of the plurality of second holograms; and
demodulating the spatial phase modulation signal or the spatial quadrature amplitude modulation signal on the basis of the plurality of intensity distributions.

11. The reproduction method of a holographic memory according to claim 10, further comprising splitting laser light emitted from a laser light source into the first reference light and the second reference light.

12. A demodulation apparatus of a spatial phase modulation signal or a spatial quadrature amplitude modulation signal, comprising:
an input section that receives signal light including a spatial phase modulation signal or a spatial quadrature amplitude modulation signal;
a laser light source that emits laser light capable of interfering with the signal light;
a hologram production section that changes a phase of the laser light, and simultaneously produces a plurality of holograms from the signal light and the laser light of which the phase is changed;
a detection section that detects an intensity distribution of each of the plurality of holograms;
a processing section that demodulates the spatial phase modulation signal or the spatial quadrature amplitude modulation signal on the basis of the plurality of intensity distributions.

13. A demodulation method of a spatial phase modulation signal or a spatial quadrature amplitude modulation signal, comprising:
receiving signal light including a spatial phase modulation signal or a spatial quadrature amplitude modulation signal;
emitting laser light capable of interfering with the signal light;
changing a phase of the laser light, and simultaneously producing a plurality of holograms from the signal light and the laser light of which the phase is changed;
detecting an intensity distribution of each of the plurality of holograms; and
demodulating the spatial phase modulation signal or the spatial quadrature amplitude modulation signal on the basis of the plurality of intensity distributions.

14. An observation apparatus of a light intensity distribution and a light phase distribution, comprising:
an input section that inputs transmitted light or reflected light from an object to be observed;
a laser light source that emits laser light capable of interfering with the transmitted light or the reflected light;
a hologram production section that changes a phase of the laser light, and simultaneously produces a plurality of holograms from the transmitted light or the reflected light and the laser light of which the phase is changed;
a detection section that detects an intensity distribution of each of the plurality of holograms; and
a processing section that calculates a light intensity distribution and a light phase distribution in the transmitted light or the reflected light on the basis of the plurality of intensity distributions.

15. An observation method of a light intensity distribution and a light phase distribution, comprising:
inputting transmitted light or reflected light from an object to be observed;

emitting laser light capable of interfering with the transmitted light or the reflected light;
changing a phase of the laser light, and simultaneously producing a plurality of holograms from the transmitted light or the reflected light and the laser light of which the phase is changed;
detecting an intensity distribution of each of the plurality of holograms; and
calculating a light intensity distribution and a light phase distribution in the transmitted light or the reflected light on the basis of the plurality of intensity distributions.

* * * * *